United States Patent
Gottschalk et al.

(10) Patent No.: US 12,425,294 B2
(45) Date of Patent: Sep. 23, 2025

(54) DEVICES AND METHODS FOR NETWORK INTEGRATION OF AN HVAC DEVICE

(71) Applicant: Tyco Fire & Security GmbH, Neuhausen am Rheinfall (CH)

(72) Inventors: Donald A. Gottschalk, Wauwatosa, WI (US); Michael R. Brownie, Milwaukee, WI (US); Gary A. Romanowich, Slinger, WI (US); Robert K. Alexander, Jackson, WI (US); Nathan J. Vandermause, Milwaukee, WI (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 17/889,311

(22) Filed: Aug. 16, 2022

(65) Prior Publication Data
US 2023/0066138 A1    Mar. 2, 2023

Related U.S. Application Data

(63) Continuation of application No. 16/712,784, filed on Dec. 12, 2019, now abandoned, which is a
(Continued)

(51) Int. Cl.
*H04L 12/28* (2006.01)
*H04L 41/0803* (2022.01)

(52) U.S. Cl.
CPC ...... *H04L 41/0803* (2013.01); *H04L 12/2803* (2013.01); *H04L 12/2807* (2013.01);
(Continued)

(58) Field of Classification Search
CPC . H04L 12/66; H04L 12/2807; H04L 12/2809; H04L 12/2823; H04L 12/2803; H04L 12/2816
See application file for complete search history.

(56) References Cited

U.S. PATENT DOCUMENTS 5,071,199 A    12/1991    Spadafora et al.
5,337,013 A    8/1994    Langer et al.
(Continued)

FOREIGN PATENT DOCUMENTS

CN    101192971 A    6/2008
CN    102682639 A    9/2012
CN    103039039 A    4/2013

OTHER PUBLICATIONS

Object Modeling a Physical BACNET, Thomas, George Contemporary Control Systems Device , pp. 1-4 https://www.ccontrols.com/pdf/Extv8n5.pdf retrieved from internet Jun. 28, 2023 (Year: 2007).*

(Continued)

*Primary Examiner* — Tom Y Chang
(74) *Attorney, Agent, or Firm* — Foley & Lardner LLP

(57) ABSTRACT

A system on a chip for enabling communication between a building management system (BMS) device and a BMS network. The system on a chip includes a device interface, a network interface, and a processing circuit. The device interface is configured to connect the system on a chip to the BMS device via a serial communication link. The network interface configured to connect the system on a chip to the BMS network. The processing circuit is configured to identify and update an attribute of an equipment object associated with the BMS device that corresponds to a command received from the BMS network via the network interface and transmit a message to the BMS device via the device interface using the updated attribute of the equipment object.

18 Claims, 32 Drawing Sheets

Related U.S. Application Data continuation of application No. 15/207,431, filed on Jul. 11, 2016, now abandoned.

(60) Provisional application No. 62/331,875, filed on May 4, 2016, provisional application No. 62/321,729, filed on Apr. 12, 2016.

(52) U.S. Cl.
CPC ...... *H04L 12/2809* (2013.01); *H04L 12/2816* (2013.01); *G05B 2219/25011* (2013.01); *G05B 2219/2614* (2013.01)

(56) References Cited

U.S. PATENT DOCUMENTS

| | | | |
|---|---|---|---|
| 8,825,185 B2 | 9/2014 | Salsbury | |
| 9,465,370 B2 | 10/2016 | Alexander et al. | |
| 9,518,862 B2 | 12/2016 | Toohey | |
| 9,574,646 B1 | 2/2017 | Edsinger et al. | |
| 9,641,122 B2 | 5/2017 | Romanowich et al. | |
| 9,746,199 B1 | 8/2017 | Drees et al. | |
| 2004/0059814 A1* | 3/2004 | Komiya | G06F 16/258 700/276 |
| 2006/0036402 A1 | 2/2006 | Deller et al. | |
| 2006/0067209 A1* | 3/2006 | Sheehan | H04L 41/22 370/216 |
| 2007/0043476 A1 | 2/2007 | Richards et al. | |
| 2008/0084173 A1 | 4/2008 | Grabinger et al. | |
| 2008/0143489 A1 | 6/2008 | Castaldo et al. | |
| 2009/0271001 A1 | 10/2009 | Westphal et al. | |
| 2009/0287736 A1* | 11/2009 | Shike | H04L 12/417 709/224 |
| 2010/0004763 A1 | 1/2010 | Murakami et al. | |
| 2010/0106319 A1 | 4/2010 | Grohman et al. | |
| 2010/0123421 A1 | 5/2010 | Grabinger et al. | |
| 2010/0179696 A1 | 7/2010 | Grohman et al. | |
| 2010/0286937 A1* | 11/2010 | Hedley | G06Q 50/06 702/60 |
| 2010/0324962 A1 | 12/2010 | Nesler et al. | |
| 2011/0161992 A1 | 6/2011 | Gutha et al. | |
| 2012/0143378 A1 | 6/2012 | Spears et al. | |
| 2012/0272146 A1* | 10/2012 | D'Souza | G06F 9/453 715/705 |
| 2013/0308674 A1 | 11/2013 | Kramer et al. | |
| 2014/0156087 A1 | 6/2014 | Amundson | |
| 2014/0277764 A1 | 9/2014 | Burt | |
| 2014/0282458 A1* | 9/2014 | Gupta | G06F 8/65 717/168 |
| 2014/0371878 A1* | 12/2014 | Lee | H04L 41/022 700/19 |
| 2015/0039752 A1 | 2/2015 | Hague | |
| 2015/0106447 A1 | 4/2015 | Hague | |
| 2015/0213379 A1* | 7/2015 | Nair | G06Q 10/06 705/345 |
| 2015/0227870 A1 | 8/2015 | Noboa et al. | |
| 2015/0260425 A1 | 9/2015 | Romanowich et al. | |
| 2015/0269641 A1 | 9/2015 | Roy | |
| 2015/0333669 A1 | 11/2015 | Alexander et al. | |
| 2015/0373149 A1* | 12/2015 | Lyons | H04L 12/2829 709/203 |
| 2016/0061480 A1 | 3/2016 | Alexander | |
| 2016/0156299 A1 | 6/2016 | Romanowich et al. | |
| 2016/0234186 A1* | 8/2016 | Leblond | H04L 67/34 |
| 2017/0003150 A1 | 1/2017 | Noboa et al. | |
| 2017/0093915 A1* | 3/2017 | Ellis | H04L 63/20 |
| 2017/0295058 A1 | 10/2017 | Gottschalk et al. | |
| 2017/0364527 A1 | 12/2017 | Adler et al. | |
| 2018/0046164 A1 | 2/2018 | Drees | |
| 2018/0119972 A1 | 5/2018 | Trikha et al. | |
| 2018/0238463 A1 | 8/2018 | Thuillard et al. | |

OTHER PUBLICATIONS

CN Notice of Re-Examination on CN Appl. Ser. No. 201780036650 dated Aug. 24, 2022 (55 pages).
A Comprehensive Look at the Belimo Energy Valave, URL: https://blog.belimo.com/Blog/bid/59956/A-Comprehensive-Look-at-the-Belimo-Energy-Valve, 2019 (4 pages).
CN First Office Action on CN Appl. Ser. No. CN 201780036650.3 dated Aug. 31, 2020, with translation (17 pages).
CN Office Action on CN Appl. Ser. No. 201780036650.3 dated Dec. 19, 2021, with translation. (10 pages).
CN Second Office Action on CN Appl. Ser. No. 201780036650.3 dated Jun. 1, 2021, with translation (16 pages).
Energy Design Resources, Design Brief: Economizers, Aug. 28, 2011 (28 pages).
International Preliminary Report on Patentability on Appl. Ser. No. PCT/US2017/027240 dated Oct. 25, 2018 (13 pages).
International Search Report and Written Opinion on Appl. Ser. No. PCT/US2017/027240 dated Oct. 17, 2017 (21 pages).

\* cited by examiner

DEVICES AND METHODS FOR NETWORK INTEGRATION OF AN HVAC DEVICE

CROSS-REFERENCE TO RELATED APPLICATIONS

This application is a continuation of U.S. patent application Ser. No. 16/712,784 filed Dec. 12, 2019, which is a continuation of U.S. patent application Ser. No. 15/207,431 filed Jul. 11, 2016, which claims the benefit of and priority to U.S. Provisional Patent Application No. 62/331,875 filed May 4, 2016, and U.S. Provisional Patent Application No. 62/321,729 filed Apr. 12, 2016, all of which are incorporated herein by reference in their entireties.

BACKGROUND

The present disclosure relates generally to building management systems and associated devices. The present disclosure relates more particularly to devices, systems and methods for integrating non-networked building management devices onto an existing network to allow for integration of the building management device into the building management system.

A building management system (BMS) is, in general, a system of devices configured to control, monitor, and manage equipment in or around a building or building area. A BMS can include a heating, ventilation, and air conditioning (HVAC) system, a security system, a lighting system, a fire alerting system, another system that is capable of managing building functions or devices, or any combination thereof. BMS devices can be installed in any environment (e.g., an indoor area or an outdoor area) and the environment can include any number of buildings, spaces, zones, rooms, or areas. A BMS can include a variety of devices (e.g., HVAC devices, controllers, chillers, fans, sensors, etc.) configured to facilitate monitoring and controlling the building space. Throughout this disclosure, such devices are referred to as BMS devices or building equipment.

In some existing systems, third party supplied devices can use standalone systems that do not have the means for communicating on the larger BMS network. Either a separate network is provided for the standalone systems, or a user may have to directly interface with the standalone system. For example, common BMS devices such as valves and actuators may not contain the necessary hardware to communicate over the BMS network. Further, larger devices and systems, such as boilers and/or chillers, may contain proprietary communication protocols and networks and not interface with a BMS network. Thus, it would be desirable to be able to provide an interface to allow for a standalone system to be integrated into an existing BMS network.

SUMMARY

One implementation of the present disclosure is a communication circuit for an actuator. The communication circuit includes a device interface and a network interface. The device interface is configured to provide a serial communication link between the communication circuit and a processing circuit of the actuator. The network interface is in electronic communication with the device interface, and configured to communicate with an external network. The device interface is configured to receive data values from the actuator via the serial communication link. The device interface is further configured by the processing circuit to populate one or more attributes of an equipment object stored in the device interface with the received data values. The network interface is further configured to map the attributes of the equipment object with individual networking objects, and write the attributes to the mapped individual networking objects. The network interface further configured to communicate the individual networking objects to the external network.

Another implementation of the present disclosure is a communication circuit for providing network communications to an actuator. The communication circuit includes a processing circuit. The processing circuit includes a processor and a memory. The processor is configured to communicate with the actuator and configured to receive data values from the actuator. The memory is in communication with the processor and includes an equipment object. The equipment object includes one or more attributes associated with the actuator. The processing circuit is configured to map the received data values to the one or more attributes of the equipment object. The communication circuit further includes a network transceiver, the network transceiver configured to transmit the mapped values in the equipment object to a network using a communication interface.

A further implementation of the present disclosure is a method of communicating HVAC device attributes to a network. The method includes receiving one or more data values associated with the HVAC device at a communication circuit via a communication link. The method further includes writing one or more data values to an equipment object, the equipment object mapping the data values to an associated of the equipment object. The method also includes mapping the attributes of the equipment object to one or more standard networking objects. The method further includes transmitting the standard networking object to a network.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIGS. 27-29 are exemplary user interface screens for a configuration wizard user interface, according to some embodiments.

DETAILED DESCRIPTION

Referring generally to the FIGURES, systems, devices and methods for integrating BMS devices into a BMS network are described, according to various exemplary embodiments. The devices, systems and methods described herein may be used to integrate one or more network devices onto a BMS network such as BACnet. A communication circuit may be used to provide the communication with the BMS device. The communication circuit can include a device interface for interfacing with the BMS device and a network interface for interfacing with a network. The communication circuit may communicate with the host device via a communication interface, such as a universal asynchronous receiver/transmitter. The device interface may have an equipment object which can include all of the desired parameters from the BMS device. Data associated with the BMS device may be provided to the equipment object via the communication interface. The equipment object may allow for the network interface to map standard network objects to the attributes in the equipment object.

Building Management System and HVAC System

Figure 1:
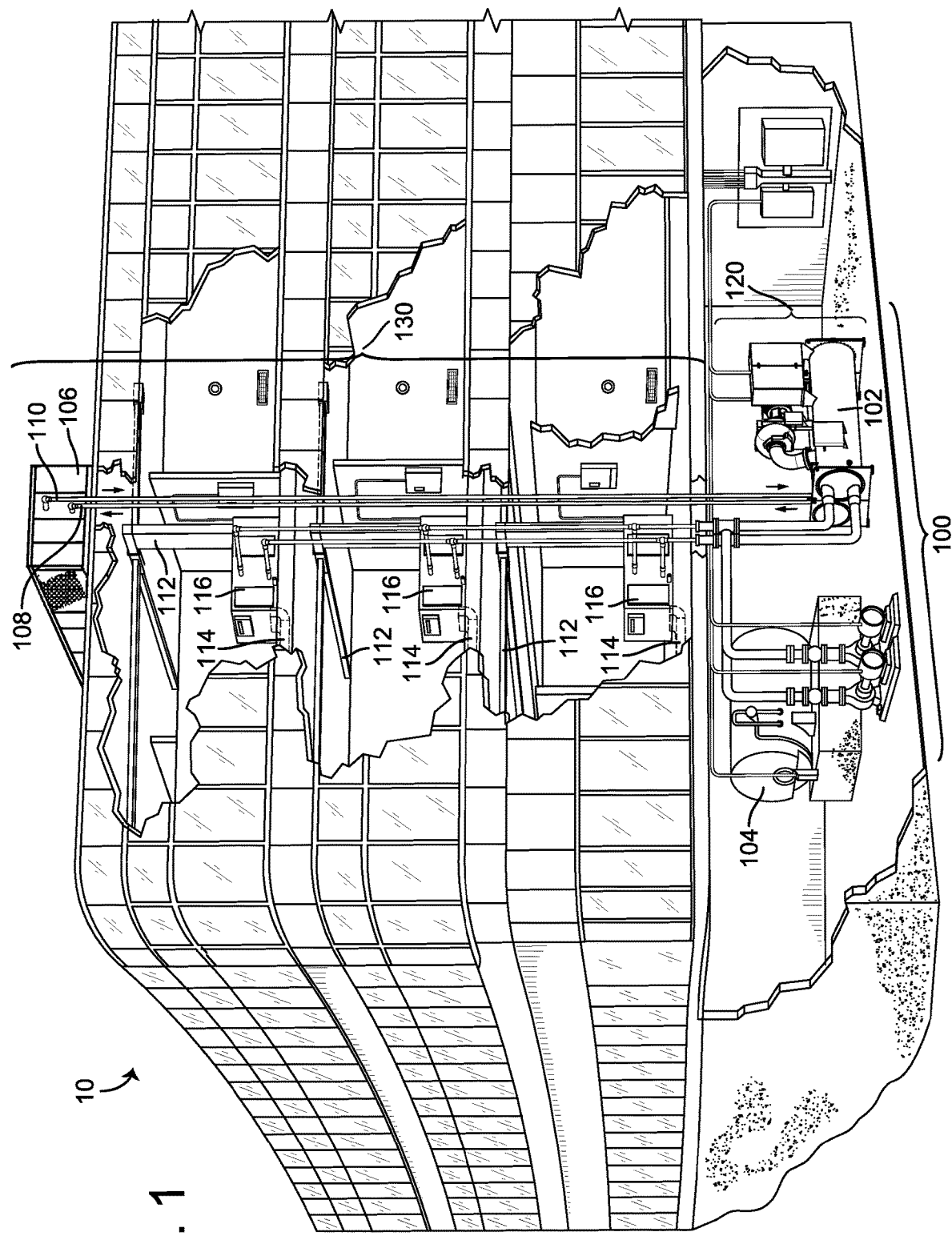
FIG. 1 is a drawing of a building equipped with a HVAC system, according to an exemplary embodiment.

Referring now to FIGS. 1-4, an exemplary building management system (BMS) and HVAC system in which the systems and methods of the present invention may be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, an HVAC system, a security system, a lighting system, a fire alerting system, or any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils).

The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
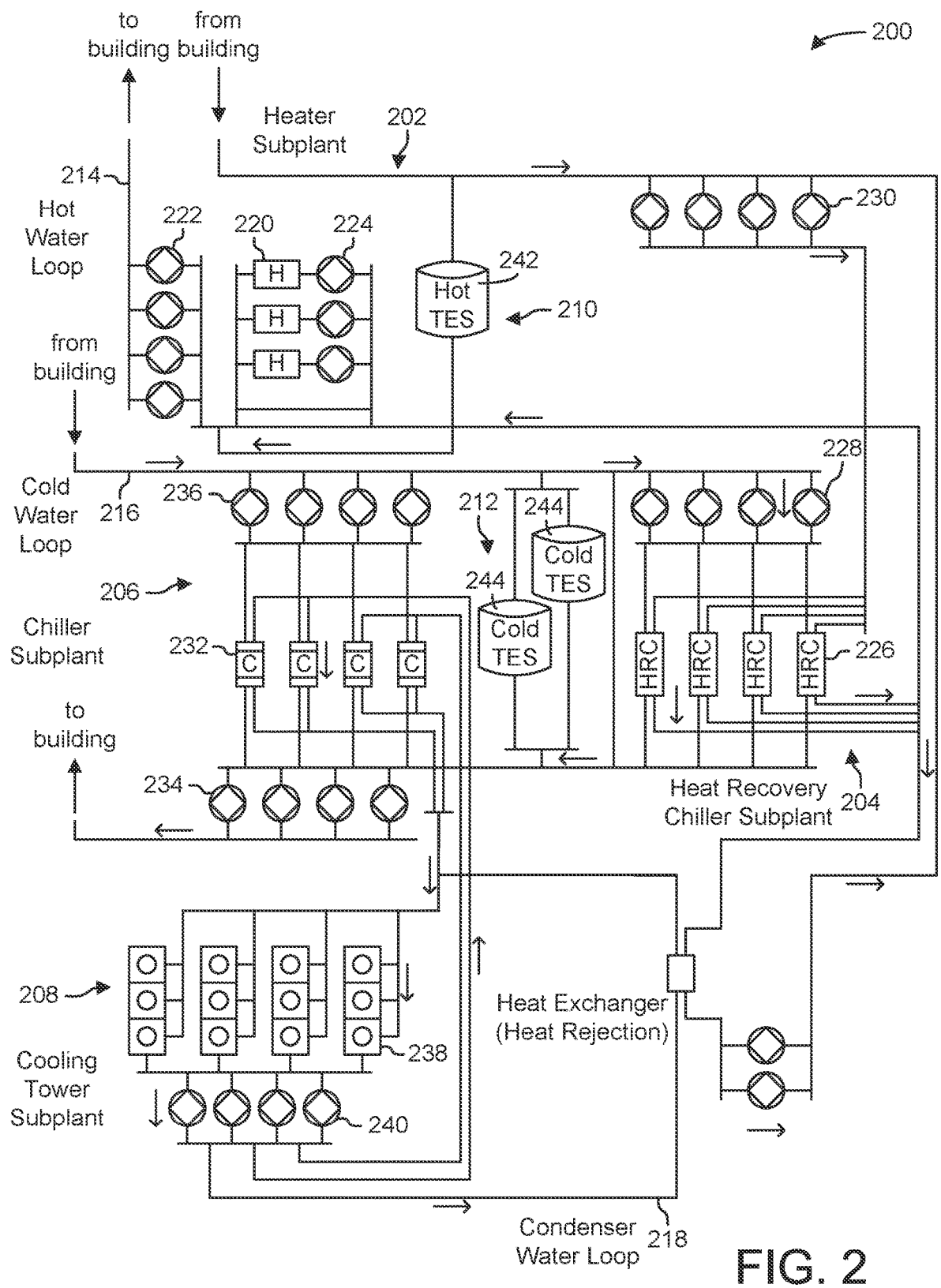
FIG. 2 is a block diagram of a waterside system that may be used in conjunction with the building of FIG. 1, according to an exemplary embodiment.

Referring now to FIG. 2, a block diagram of a waterside system 200 is shown, according to some embodiments. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between the chiller subplant 206 and the building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
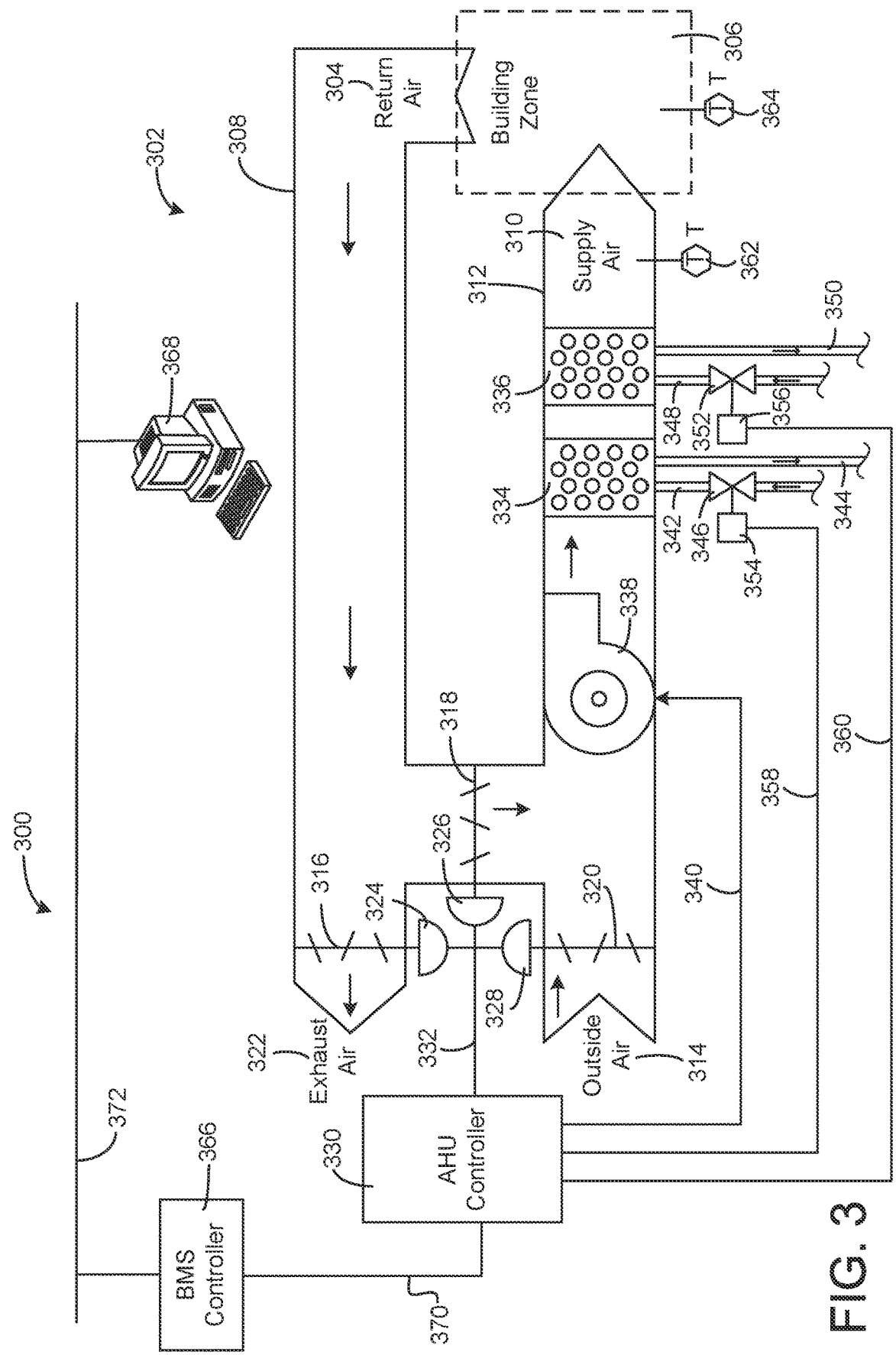
FIG. 3 is a block diagram of an airside system that may be used in conjunction with the building of FIG. 1, according to an exemplary embodiment.

Referring now to FIG. 3, a block diagram of an airside system 300 is shown, according to an exemplary embodiment. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
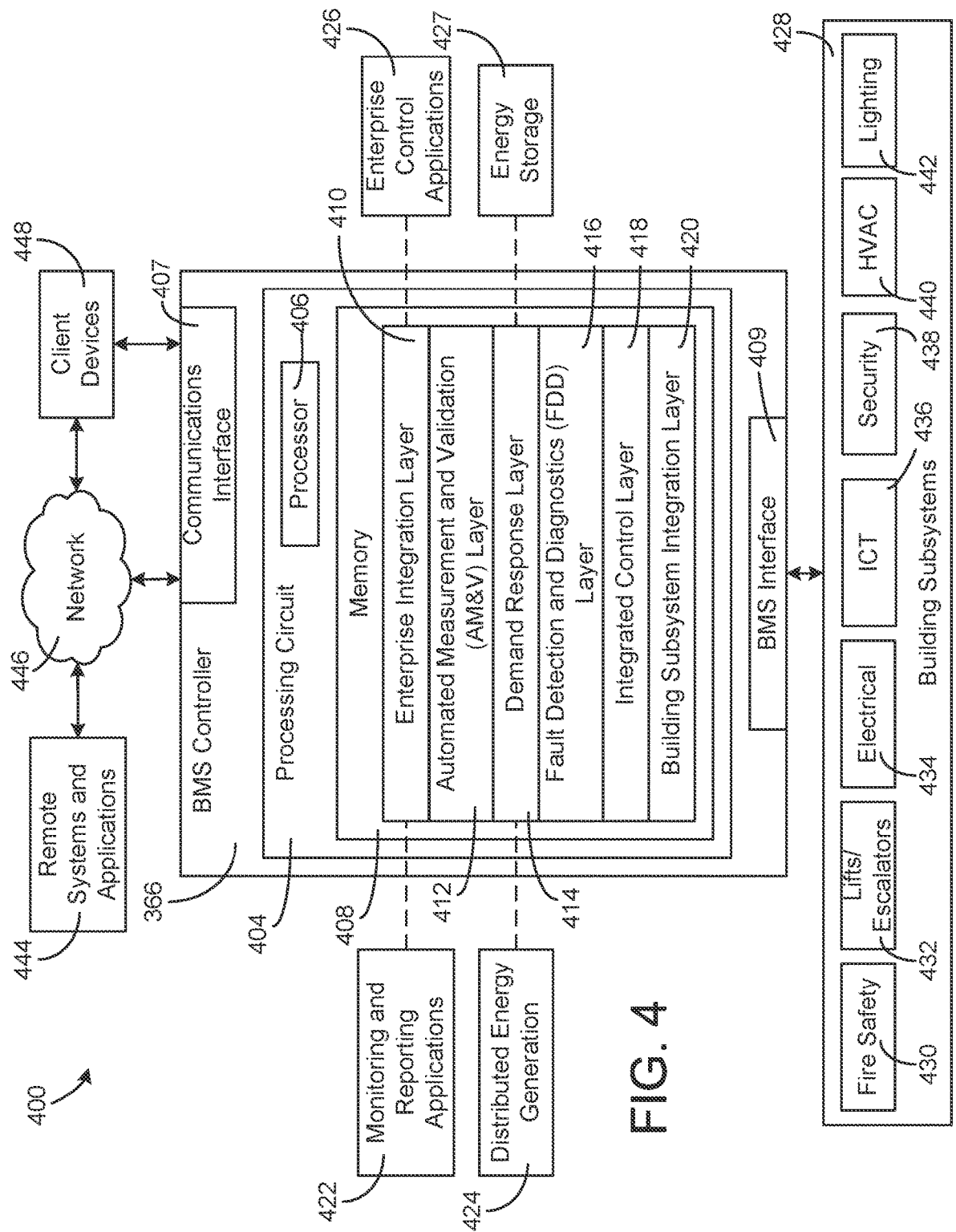
FIG. 4 is a block diagram of a building management system (BMS) that may be used to monitor and/or control the building of FIG. 1, according to an exemplary embodiment.

Referring now to FIG. 4, a block diagram of a building management system (BMS) 400 is shown, according to an exemplary embodiment. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 may be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 may be or include volatile memory or non-volatile memory. Memory 408 may include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 may be distributed across multiple servers or computers (e.g., that can exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions can specify which equipment may be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 may be configured to provide calculated inputs (e.g., aggregations) to these higher levels based on outputs from more than one building subsystem.

Automated measurement and validation (AM&V) layer 412 may be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) may shut-down systems or direct control activities around faulty devices or systems to reduce energy waste, extend equipment life, or assure proper control response.

FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Communications Circuit

Figure 5A:
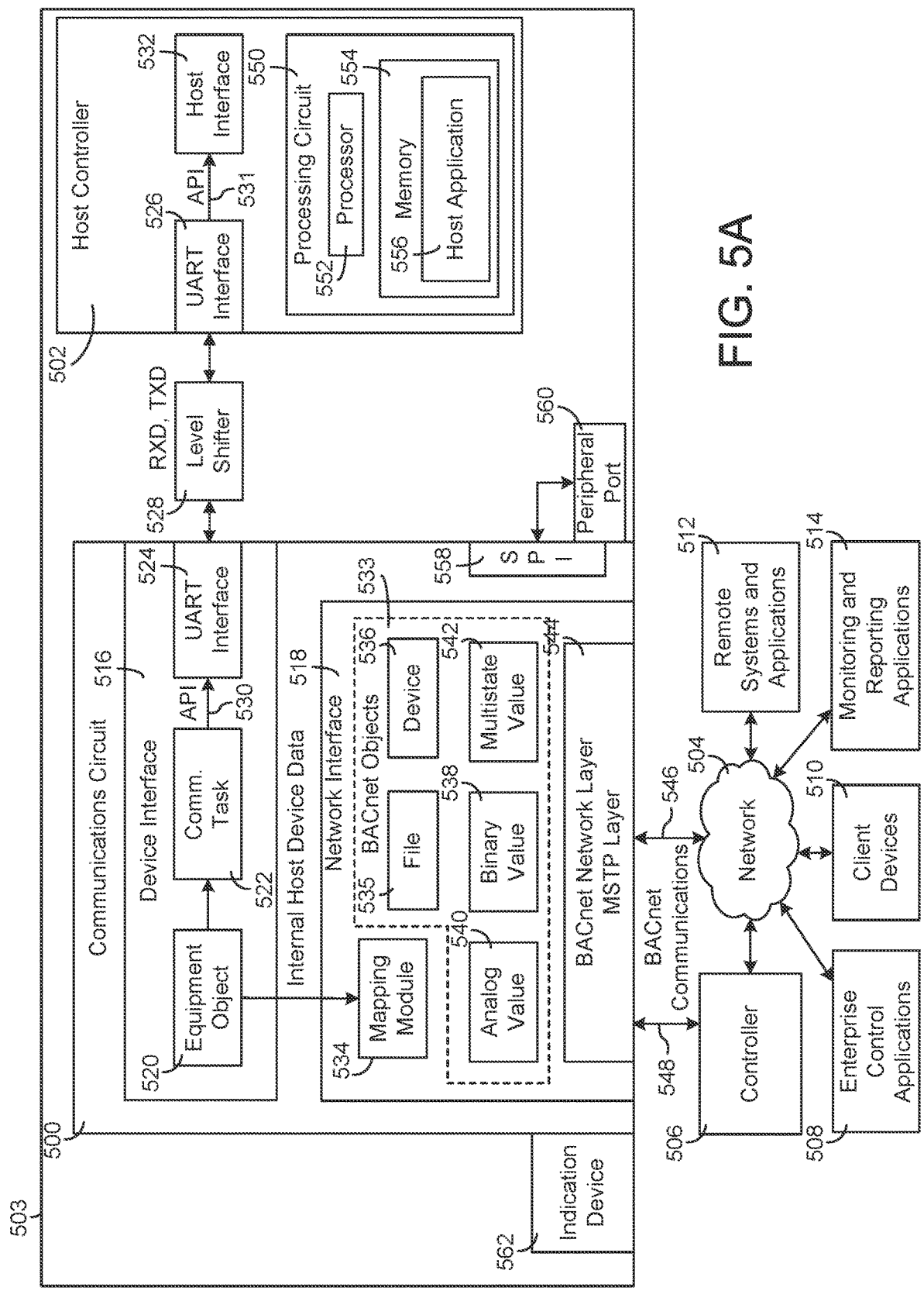
FIG. 5A is a block diagram illustrating a communication circuit in communication with a host device, according to some embodiments.

Referring now to FIG. 5A, a block diagram illustrating a communications circuit 500 in communication with a host controller 502 is shown, according to some embodiments. In one embodiment, the host controller 502 and the communications circuit 500 are contained within a BMS device 503. The BMS device 503 can be any number of devices, including any of the BMS devices listed above. In one embodiment, the BMS device 503 is an HVAC device, such as a chiller, an actuator, a valve, an AHU, an RTU, a boiler, etc. The host controller 502 may be a proprietary device specific to the BMS device 503, and used to control the BMS device 503. As shown in FIG. 5A, both the communications circuit 500 and the host controller 502 are located within the BMS device 503. In some embodiments, the communications circuit 500 is an integrated circuit, chip, or microcontroller unit (MCU) separate from a processing circuit of the host controller 502, and configured to bridge communications between the host controller 502 and other external systems or devices. In other embodiments, the communications circuit 500 is a separate circuit board (daughter board) containing the required circuitry, located within the BMS device 503, and in communication with the host controller 502. In a further embodiment, the communications circuit 500 is a separate device coupled to the BMS device 503, and in communication with the host controller 502. This may allow for a communications circuit 500 to be installed on a BMS device 503 to allow for a BMS device 503 without network connectivity to be easily converted to communicate via a BMS network, such as BACnet.

The communications circuit 500 can be configured to support a variety of data communications between the host controller 502 and other external systems or devices via a network 504. As illustrated in FIG. 5A, other systems or devices can include controllers 506, enterprise control applications 508, client devices 510, remote systems and applications 512 and/or monitoring and reporting applications 514. The communications circuit 500 can be a wired or wireless communication link and may use any of a variety of disparate communications protocols (e.g., BACnet, LON, WiFi, Bluetooth, TCP/IP, etc.) to communicate with the network 504 and/or directly to other external systems or devices. In some embodiments, the communications circuit 500 is the Johnson Controls BACnet on a Chip (JBOC) product. For example, the communications circuit 500 can be a pre-certified BACnet communication circuit capable of communicating on a building automation and controls network (BACnet) using a master/slave token passing (MSTP) protocol. The communications circuit 500 can be added to any existing host device with a communication interface to enable BACnet communication with minimal software and hardware design effort. In other words, communications circuit 500 provides a provides a BACnet interface for the host controller 502.

The communications circuit 500 is shown to include a device interface 516 and a network interface 518. In one embodiment, the network interface 518 is a BACnet interface. The device interface 516 can include an equipment object 520, a communications task (e.g., a JBOC task) 522, and a universal asynchronous receiver/transmitter (UART) interface 524. The UART interface 524 can be configured to communicate with a corresponding host UART interface 526 of the host controller 502 using a UART protocol. In other examples, the UART interfaces 524, 526 can be replaced with serial peripheral interfaces (SPI) or inter-integrated circuit (I2C) interfaces. In some embodiments, a level shifter 528 device may be required to ensure that the signal levels from the host controller 502 are compatible with the UART 524 of the device interface 516, and vice versa. In one example, the level shifter 528 can be a TCA9406DCTR from Texas Instruments; however, other level shifting devices are contemplated.

The communication task module 522 can be connected to the UART interface 524 via an application-program interface (API) 530 and can be configured to populate the equipment object 520 with values received from the processing circuit 550 via the UART interfaces 524, 526. The communications task module 522 can also read values of the equipment object 520 populated by the network interface 518 and can provide the values to the host controller 502. Similarly, the host UART interface 526 can be connected to a host interface 532 via an API 531 and can be configured to communicate with a host application. In one embodiment, the host controller 502 sets the baud rate to be used for communication between the host controller 502 and the communications circuit 500 using the UART interfaces 524, 526. In a further embodiment, the UART interfaces 524, 526 are configured to operate in a half-duplex mode. When the UART interfaces 524, 526 are configured in a half-duplex mode, one device will be responsible for initiating all commands. In one embodiment, the host controller 502 is configured to communicate using a half-duplex mode wherein the host controller 502 will transmit all commands, and the communications circuit 500 will only transmit a command in response to a command transmitted by the host controller 502. This configuration provides the host controller 502 with total control of the flow of data between the host controller 502 and the communications circuit 500. In other examples, the UART interfaces 524, 526 can be configured to operate in full-duplex mode.

The equipment object 520 can be a proprietary equipment object configured to expose host controller 502 data to the network interface 518 as a single object with one or more associated attributes. In one embodiment, the equipment object 520 maps the data received from the host controller 502 into an associated attribute within the equipment object 520. Attributes of the equipment object 520 can be defined by a user (e.g., using a data definition tool) to expose any type of internal host controller 502 data to the network interface 518. In one embodiment, the host controller 502 instructs the communication circuit 500 which attributes within the equipment object are to be exposed to the network interface 518. For example, the host controller 502 may provide a master list of attributes to the equipment object 520 during an initial setup. The host controller 502 may then instruct the communication circuit 500 to only expose a subset of attributes of the equipment object 520 from the master list of attributes to the network interface 518. In some embodiments, a user may select which attributes are to be exposed to the network interface 518 during the initial configuration of the BMS device 503. For example, the user may indicate which attributes are to be exposed to the network interface 18 using a configuration tool, as described in more detail below. In other embodiments, the host controller 502 may automatically determine which attributes are to be exposed to the network interface 518 based on the data type. For example, the host controller 502 may instruct the communication circuit 500 not to expose "static" data of the BMS device 503, as described in more detail below.

The network interface 518 may read the attributes of the equipment object 520 and map the attributes of the equipment object 520 to network objects, such as BACnet objects 533 via a mapping module 534. In some embodiments, the network interface 518 may only map those attributes that are selected to be exposed to the network objects 533 by the host controller 502. Example BACnet objects may include: a file data object 535, including read and/or write file services; a device data object 536 (i.e. BACnet device object data); a binary value data object 538 (e.g. relay output states, switch positions, on/off device status); an analog value data object 540 (e.g. speed, temperature, flow, pressure, etc.), which can include analog value objects with or without priority; and a multistate value data object 542, which can include multistate value objects with or without priority. Additionally, other BACnet objects 533 may include a structured view, a char string and an integer. In one embodiment, the network interface 518 can be configured to write the values of the BACnet objects 533 to attributes of the equipment object 520. The attribute values of the equipment object 520 can be communicated to the host controller 502 via the UART interfaces 524,526 and be used to operate the host controller 502.

Figure 6A:
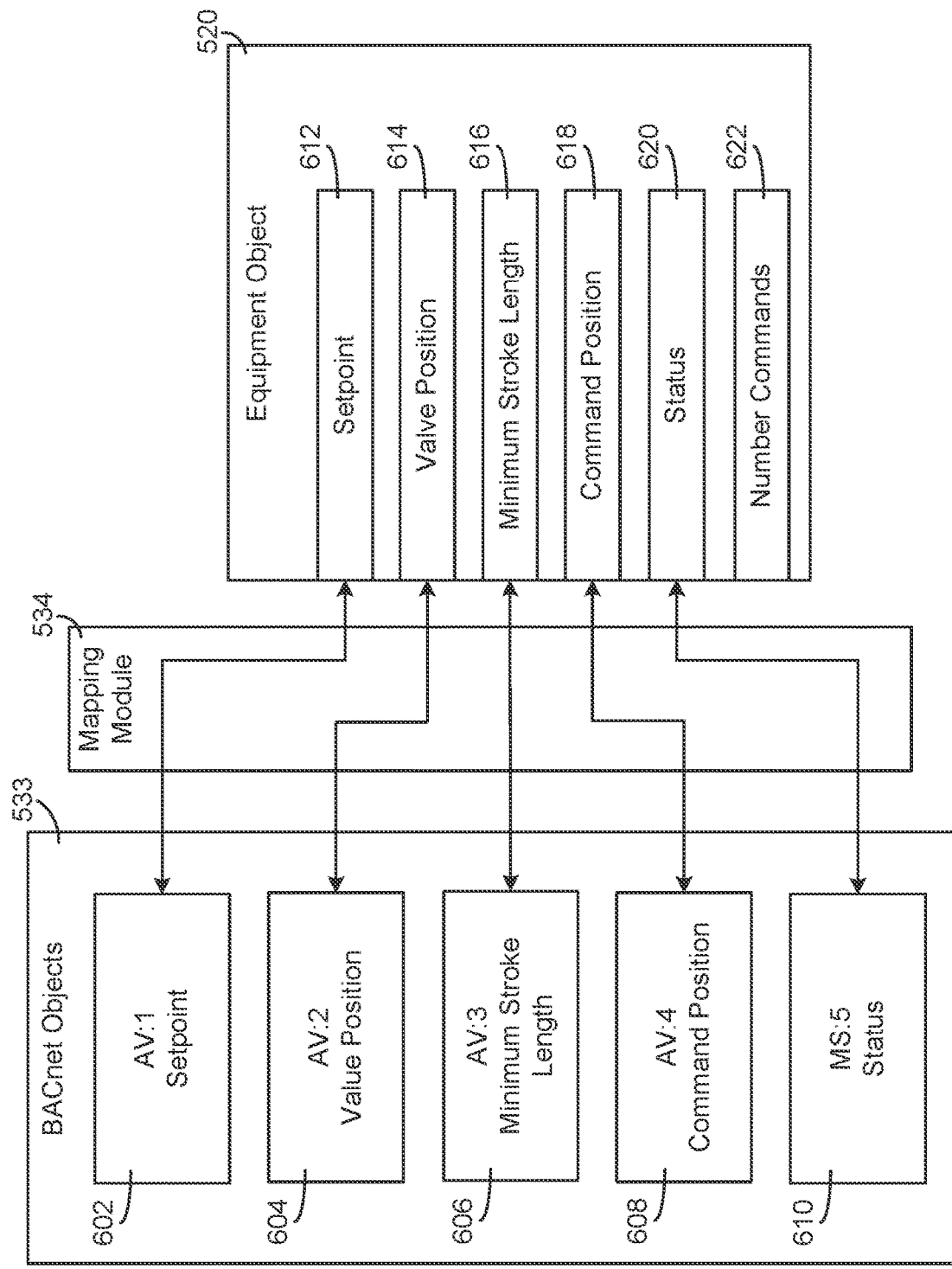
FIG. 6A is a block diagram illustrating a mapping between attributes of an equipment objects and a number of standard BACnet point objects, according to some embodiments.

Turning now to FIG. 6A, a block diagram illustrating a mapping between attributes of the equipment object 520, and a number BACnet objects 533 is shown, according to some embodiments. In one example, the equipment object 600 and the BACnet objects 533 can be associated with a BMS device, such as a valve. However, the BACnet objects 533 can be associated with any other BMS device type, as described above. As shown in FIG. 6A, the BACnet objects 533 include five standard BACnet point objects, including a setpoint object 602, a valve position object 604, a minimum stroke length object 606, a command position object 608, and a status object 610. The setpoint object 602, the valve position object 604, the minimum stroke object 606, and the command position object 608 are shown as analog data objects. The status object 610 is shown as a multistate value data object. The attributes of the equipment object 520 can be defined by a user (e.g., using a data definition tool) and mapped to various types of internal BMS device data. Additionally, the user can define which of the attributes of the equipment object 520 to expose to the network interface 518. As shown in FIG. 6A, the equipment object 520 is shown to include a setpoint attribute 612, a valve position attribute 614, a minimum stroke attribute 616, a command position attribute 618, a status attribute 620 and a number commands attribute 622. As further shown in FIG. 6A, the equipment object 600 is configured to expose the setpoint attribute 612, the valve position attribute 614, the minimum stroke attribute 616, the command position attribute 618, and the status attribute 620 to the respective BACnet objects 533. Further, the equipment model 600 is configured to not expose the number commands attribute to a corresponding BACnet object. An equipment object 600 attribute may not be exposed to keep certain attributes and/or data proprietary. For example, diagnostic data may be kept proprietary and only be allowed to be accessed via authorized commissioning tools. Alternatively, an equipment object attribute 600 may not be exposed where the data is static, as described above. The mapping module 534 may read the attributes of the equipment object 520, and map them to the appropriate BACnet objects 533.

Returning to FIG. 5A, the host controller 502 can be configured to interface with the attributes of the equipment object 520 in a more concise fashion than the standard BACnet point objects. For example, the host controller 502 can read and write various items of internal host controller data to the equipment object 520 as attribute values of the equipment object 520. The equipment object 520 can then expose the values of the attributes to the network interface 518, as described above. The mapping module 534 may then map the values of the exposed attributes to one or more of the BACnet objects 533. In one embodiment, the mapping module 534 evaluates parameters of the attributes of the equipment object 520, such as data type, attribute ID, whether the attribute is modifiable, etc. The mapping module 534 may then map the exposed attribute values of the equipment object 520 to the appropriate BACnet object 533 based on the evaluated parameters. In one embodiment, the mapping module 534 may continuously evaluate the attribute values in the equipment object 520, and thereby continuously map the attribute values to the BACnet objects 533. Alternatively, the equipment object 520 may provide an interrupt signal to the mapping module when an attribute value has been modified. The mapping module 534, receiving the interrupt, may then proceed to evaluate the attribute values in the equipment object 520, and map the attribute values to the BACnet objects 533. In further examples, the mapping module 534 may evaluate the exposed attribute values at predetermined intervals. For example, the mapping module 534 may evaluate the exposed attribute values in one second intervals. However, predetermined intervals of more than one second or less than one second are also contemplated. In some embodiments, the mapping module 534 may further be able to instruct the network interface 518 to generate one or more BACnet objects 533 for one or more exposed attributes within the equipment object 520. For example, once the equipment object 520 has been configured by a user, as described above, the mapping module 534 may read the exposed attributes via the network interface 518. For example, the mapping module 534 may read parameters associated with the exposed attributes such as attribute ID's, data types, whether the data is modifiable, object names, etc. The mapping module 534 may then instruct the network interface 518 to generate one or more BACnet attributes of the required type (e.g. analog, binary, multistate, etc.) to receive the values associated with the exposed equipment object 520 attributes.

Once the attributes of the equipment object 520 have been exposed to the network interface 518, a BACnet/MSTP layer 544 may read the BACnet objects 533. The BACnet/MSTP layer 544 can be configured to facilitate BACnet communications using the MSTP master protocol. For example, the BACnet/MSTP layer 544 can be configured to transmit and receive segmented messages. In some embodiments, the BACnet/MSTP layer 544 may only transmit segmented messages to devices that subscribe to the BMS device 503 via a BACnet Subscription Service. In other embodiments, the BACnet/MSTP layer 544 may make the data values contained in the BACnet objects 533 available to other devices or systems via the network 504. The BACnet/MSTP layer 544 can further be configured to automatically determine a baud rate. In other example, the baud rate can be manually specified in the BACnet/MSTP layer 544. In one embodiment, the BACnet/MSTP layer 544 is capable of operating at the following baud rates: 9600, 19200, 38400, and 76800. The BACnet/MSTP layer 544 may further support duplicate address avoidance by keeping a second device with a duplicate address from interfering with existing traffic. In one embodiment, the BACnet/MSTP layer 544 supports the maximum MSTP Application Protocol Data Unit (APDU) size of 480 bytes. The BACnet/MSTP layer 544 may allow for the transmission/reception of change of value (COV) command flags. In one embodiment, the BACnet/MSTP layer 544 can accept and/or generate data packets bundling multiple COV's into a single message. While FIG. 5 illustrates a BACnet/MSTP layer, it is contemplated that other communication layers may be used in the network interface 518.

In one embodiment the BACnet/MSTP layer 544 reads the BACnet objects 533, and transmits the values associated with the BACnet objects 533 to the network 504, via a communication link 546 using BACnet communication protocols. The communication link 546 may be a wireless interface. In one embodiment, the communication link 546 is a Wi-Fi (802.11x) interface. Other wireless interfaces such as Bluetooth, Near Field Communication (NFC), LoRa RF, Cellular (3G, 4G, LTE, CDMA, etc.), Zigbee, etc. may also be used as the network interface 518. In other examples, the network interface 518 may be a wired interface, such as an Ethernet connections (CAT5, CAT6, etc.), a serial connection (RS-232, RS-485), or other applicable wired communication interfaces.

In one embodiment, the network 504 is a cloud-based (i.e. hosted) server. The cloud-based server may allow for devices to access the network via an internet connection. For example, one or more of the controller 506, the enterprise control applications 508, the client devices 510, the remote systems and applications 512, and the monitoring and reporting applications may access the network 504 via an internet connection. In other embodiments, the network 504 can be an internal BMS network, such as a BACnet network, wherein the network 504 can provide communication between BMS devices in the BMS system. The network 504 can be a closed network in some instances, thereby only allowing access to the network 504 from within the BMS system. Alternatively, the network 504 may be an open network, thereby allowing access from a user outside of the BMS network.

In one embodiment, the communications circuit 500 communicates directly with the controller 506 via a controller communication interface 548 using the BACnet MSTP layer 544. The controller communication interface 548 may be an isolated RS-485 serial connection. In other examples, the controller communication interface 548 may be a serial connection such as RS-232, a wireless connection such as Wi-Fi (802.11x), Bluetooth, NFC, Zigbee, LoRa RF, cellular (3G, 4G, LTE, CDMA, etc.), or other communication system, as applicable. Further, the controller communication interface 548 may be a wired connection such as an Ethernet connection (CAT5, CAT6), a local area network (LAN), or other wired connection, as applicable. In one embodiment, the controller 506 is a BMS controller as described above in regards to FIGS. 1-4, described above. In some embodiments, the controller 506 receives data from the host controller 502 via the communications circuit 500 as described above, and then communicates the data to the network 504. Alternatively, the controller 506 may directly communicate the data to other devices, such as the enterprise control applications 508, the client devices 510, the remote systems and applications 512 and/or the monitoring and reporting applications 514. In some embodiments, both the controller 506 and the network 504 may receive data from the communications circuit 500. In one example, the controller 506 can monitor a specific value, such as an analog value exposed to the analog value object 540. Further, the BMS controller may monitor any of the BACnet objects as required or desired by the user.

The host controller 502 may include a processing circuit 550. The processing circuit may include a processor 552 and a memory 554. The processor 552 may be a general purpose or specific purpose processor, an application specific integrated circuit (ASIC), one or more field programmable gate arrays (FPGAs), a group of processing components, or other suitable processing components. The processor 552 is configured to execute computer code or instructions stored in the memory 554 or received from other computer readable media (e.g., CDROM, network storage, a remote server, etc.).

The memory 554 may include one or more devices (e.g., memory units, memory devices, storage devices, etc.) for storing data and/or computer code for completing and/or facilitating the various processes described in the present disclosure. The memory 554 may include random access memory (RAM), read-only memory (ROM), hard drive storage, temporary storage, non-volatile memory, flash memory, optical memory, or any other suitable memory for storing software objects and/or computer instructions. The memory 554 may include database components, object code components, script components, or any other type of information structure for supporting the various activities and information structures described in the present disclosure. The memory 554 may be communicably connected to the processor 552 via the processing circuit 550 and may include computer code for executing (e.g., by the processor) one or more processes described herein. When the processor 552 executes instructions stored in the memory 554, the processor 552 generally configures the host controller 502 (and more particularly the processing circuit 550) to complete such activities.

In one embodiment, the memory stores a host application 556. The host application 556 can include the required application for operating the host device. In one embodiment, the host application 556 can generate updated values for the attributes of the equipment object 520, which can be communicated to the device interface 516 via the UART interfaces 524, 526, as described above. The host application 556 can include software to read and store data received by the host controller 502. For example, the host controller 502 may include sensors for detecting various attributes of the host controller 502. Example sensors can include voltage sensors, current sensors, temperature sensors, position sensors, pressure sensors, or other applicable sensors. The host application may read and/or store the data from these sensors within the memory 554. Further, the host controller 502 may include other data such as setpoints, position commands, diagnostic data, etc., which the host application 556 can further read and store in the memory 554.

The host application 556 can further receive data and/or commands for controlling the host controller 502. In one embodiment, the host interface 532 may receive data via the UART interface 526, and communicate the data to the host application 556. For example, the controller 506 may communicate with the communications circuit 500 and change a setpoint within the analog value BACnet object 540. The network interface 518 can then modify the corresponding attribute in the equipment object 520, which can then be communicated to the host device via the UART interfaces 524, 526. The host interface 532 can then receive the data via the host API 531. The host interface 532 may be configured to convert the received data (e.g. the setpoint change) into a format compatible with the host application 556. The host application 556, receiving the data (setpoint change) can then implement the setpoint change on the host controller 502. In some embodiments, the host application 556 may receive inputs or commands directly from a user interface (not shown) of the host controller 502. The host application can then update any changes provided via the user interface in the equipment object 520 by communicating the changes to the host interface 532. The host interface 532 may then communicate the changes to the equipment object 520 via the UART interfaces 524, 526.

The communications circuit 500 may further include a serial peripheral interface (SPI) bus driver 558. The SPI bus driver 558 can be used to drive a peripheral port 560 on the communication circuit. In one embodiment, the peripheral port 560 is a serial flash interface, such as a USB port, an SD or micro SD port, a compact flash (CF) port, etc. The peripheral port 560 may further be a serial interface (RS-232, RS-485) for direct wired connection to a hardware device, such as a commissioning tool or a programming tool. The peripheral port 560 can be used to allow for communication directly with the communications circuit 500. In some examples, the peripheral port 560 can be used to provide a software (SW) and/or a firmware (FW) update directly to the communications circuit 500. Further, the peripheral port 560 may be configured as a programming port, thereby allowing a user to directly program the communication circuit. For example, a user may access the communications circuit 500 via the peripheral port 560 to program the attributes of the equipment object 520 that are to be exposed to the network interface 518. In some examples, the peripheral port 560 can be used to provide additional memory, such as flash memory (SD, CF, etc.). The additional memory may be used to store data associated with the host controller 502, such as historical data, alarm history, data logs, etc.

The communications circuit 500 may further include an indication device 562. In one embodiment, the indication device 562 can include one or more illumination devices, such as LEDs. However, the indication device 562 can further include other illumination devices, auditory indication devices (speakers, buzzers), or a combination thereof. In one embodiment, the indication device 562 provides a visual indication that the communication circuit is communicating with the network 504 and/or the controller 506. Alternatively, the indication device 562 can provide an indication that the communications circuit 500 is communicating with the host controller 502. In a further embodiment, the indication device 562 can provide an indication of a status of the communications circuit 500. For example, the indication device 562 may present one color (e.g. green) when the communications circuit 500 is functioning properly, and a second color (e.g. red) when the communications circuit 500 is not functioning properly. Further, the indication device 562 may provide an indication of a status of the host controller 502 instead of, or in addition to the communications circuit 500. In still further examples, the indication device 562 may provide a series of visual and/or audible outputs in a repeating pattern that may represent a certain fault currently experienced by the communications circuit 500 and/or the host controller 502.

Figure 5B:
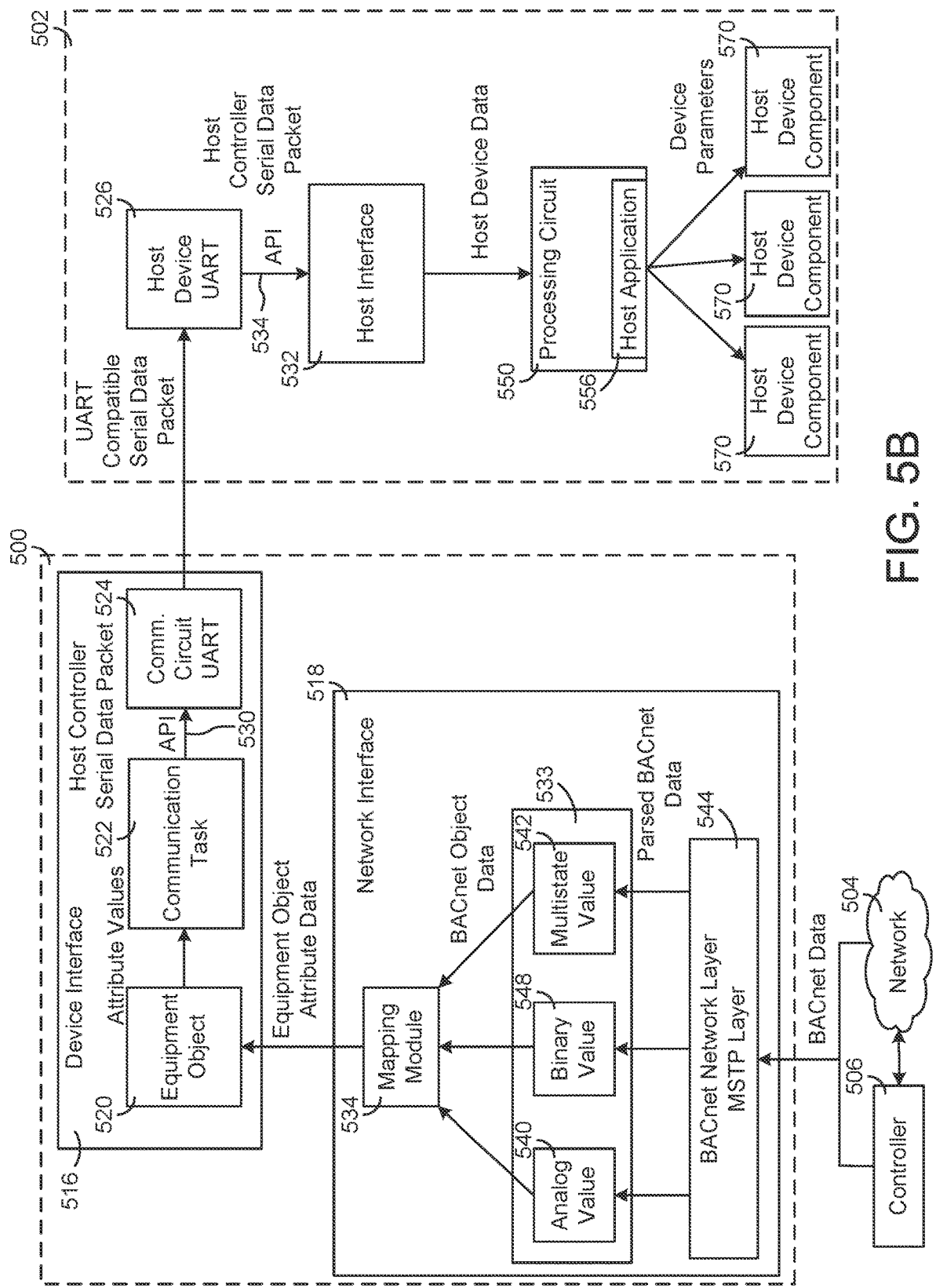
FIG. 5B is a block diagram illustrating the flow of data from an external network to the communication circuit of FIG. 5A, according to some embodiments.

Turning now to FIG. 5B, a block diagram illustrating the flow of data from the network 504 and/or the controller 506 to the communications circuit 500 is shown, according to some embodiments. As shown in FIG. 5B, network 504 is a BACnet network; however, other networks are contemplated. The network 504 and/or the controller 506 may provide BACnet data to the communications circuit 500. The BACnet data may be received by the BACnet/MSTP layer 544. The BACnet/MSTP layer 544 may parse the received BACnet data. In one example, the BACnet/MSTP layer 544 may parse the received BACnet data to isolated data associated with one or more BACnet Objects 533. For example, the BACnet/MSTP layer 544 may first parse the data based on data type (analog, binary, multistate, etc.). The BACnet/MSTP layer 544 may then evaluate an ID associated with the BACnet data to determine what BACnet object is associated with the received BACnet data. The BACnet/MSTP layer 544 may then transmit the parsed BACnet data to one or more BACnet objects 533 via the network interface. For example, the BACnet/MSTP layer 544 may transmit parsed analog BACnet data to the analog BACnet object 540, parsed binary BACnet data to the binary BACnet object 538, and parsed multistate BACnet data to the multistate BACnet object 542. This is exemplary only, as there may be more BACnet object types available as described above. Further, multiples of each BACnet object type may further be provided. In one embodiment, the BACnet/MSTP layer 544 can instruct the network interface to generate new BACnet objects when BACnet data is received that is not associated with an existing BACnet object 533. The BACnet objects 533 may then provide the associated BACnet Object data to the mapping module 534. The mapping module 534 may then receive the BACnet Object data by querying each of the BACnet objects to determine if a value had been updated. Alternatively, the BACnet objects may provide an interrupt, or other signal, to the mapping module 534 to instruct the mapping module 534 to read a new BACnet object 533 value. The mapping module 534 may then evaluate the received BACnet object data to determine which attribute of the equipment object 520 the received BACnet object data is associated with and transmit the data to the equipment object 520 as equipment object attribute data via the network interface 518. In one embodiment, the mapping module 534 transmits equipment object attribute data for each of the one or more BACnet objects 533 to the equipment object 520 where the equipment object attributes associated with the one or more BACnet objects are exposed to the network interface 518. Similarly, the mapping module 534 may only transmit equipment object attribute data to the equipment object 520 where the associated equipment object attribute is a writeable attribute. As will be described later, a user, via a configuration tool, can configure equipment object attributes that are exposed and/or writable.

The equipment object 520 may then transmit attribute values to the communication task module 522. The attribute values may contain the attribute ID, as well as the data type and value. Alternatively, the attribute values may only contain the value associated with the attribute. In some embodiments, the communication task module 522 reads the attribute values for the equipment object attributes, and determines if any values have been changed. The communication task module 522, receiving the equipment object attribute values, may then convert the attribute values into one or more host controller serial data packets. The host controller serial data packets may be configured such that the data packets are readable by the host device. The host controller data packets may then be read by the UART 524 and converted into a UART compatible serial data packet. In one example, the API 530, as described above, may be used to convert the host control serial data packets into UART compatible serial data packets. In other examples, the UART 524 may convert the attribute values into UART compatible serial data packets itself. The UART 524 may then transmit the UART compatible serial data packet containing the attribute values to the host controller 502. The UART 526 can receive the UART compatible serial data packet and convert the data into host controller serial data packets, readable by the host controller. In one embodiment, the UART 526 can perform the conversion. In other embodiments, the API 531 can convert the UART compatible serial data packet into a host controller serial data packet. The host controller serial data packet may then be received by the host interface 532. The host interface 532 may then convert the host controller serial data packet into host device data to be processed by the processing circuit 550. The host device data may be a proprietary data format used by the processing circuit 550 of the host controller 502. In other examples, the host device data may be a standard data type used by the particular processing circuit 550.

The processing circuit 550 can then read the host device data via the host application 556. The host application 556 allows the data to be parsed and executed. In some embodiment, the host application may output device parameters to one or more host device components 570. The host device components may be any components in communication with the processing circuit 550. For example, the host device components 570 may include switches, motor controllers, sensors, relays, indicators, or any other components within the BMS device 503 which is used by the BMS device 503 to operate. For example, a host device component 570 may be a motor starter relay. The host application 556, via the processing circuit 550 may output a logic 1 to the motor starter relay to close, thereby turning on a motor. In a more complex example, the host device component 570 may be a variable frequency motor controller. In this example, the host application 556 via the processing circuit 550 may output a motor speed command. Thus, a command or request may be generated by the network 504 and/or the controller 506 and executed at a component level of the BMS device 503 using the above embodiment.

Figure 5C:
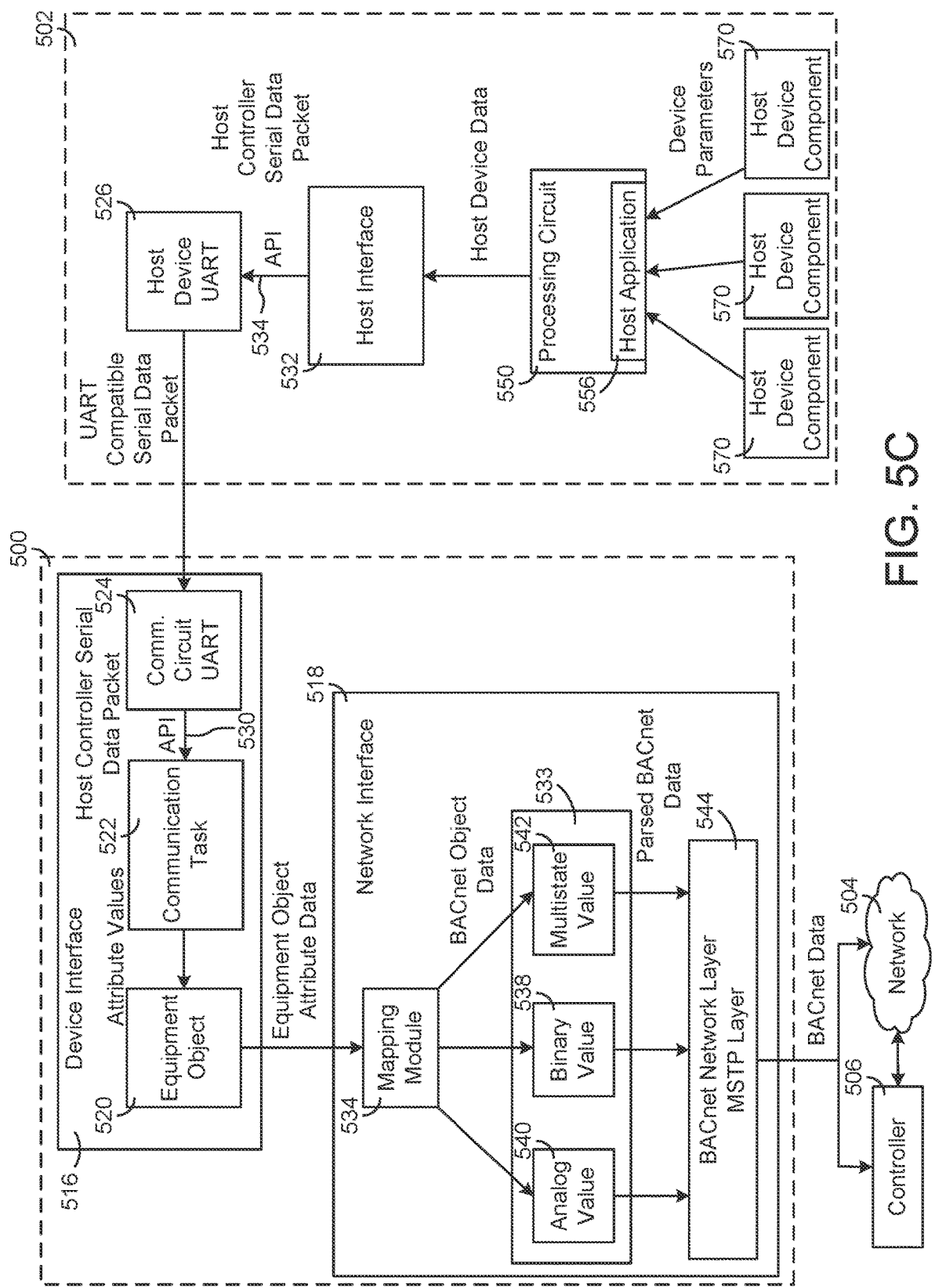
FIG. 5C is a block diagram illustrating the flow of data from the communication circuit of FIG. 5A to an external network, according to some embodiments.

Turning now to FIG. 5C a block diagram illustrating the flow of data from the host controller 502 to the network 504 and/or the controller 506 is shown, according to some embodiments. Within the BMS device 503, one or more of the host device components 570 may provide device parameters associated with one or more parameters of the host device component 570 to the processing circuit 550. Device parameters can include parameters related to motor speed, temperature, positions, or any other device parameters associated with the host device components 570 within the BMS device 503. The device parameters can be processed by the host application 556 within the processing circuit 550. In some embodiments the processing circuit 550 may determine that the received device parameters may need to be provided to the network 504 and/or the controller 506. For example, the processing circuit 550 may be configured to provide all updated parameters to the network 504 and/or the controller 506. In other examples, the processing circuit 550 may be configured to provide device parameters to the network 504 and/or the controller 506 when the device parameters exceed a certain value. In still further examples, the processing circuit 550 may provide the device parameters to the network 504 and/or the controller 506 at predetermined intervals or at predetermined times of the day. For example, the processing circuit 550 may be configured to provide the device parameters to the network 504 and/or the controller 506 at 6 A.M., Noon, 6 P.M. and Midnight. However, the predetermined intervals or times may be any predetermined intervals or times provided by a user. Additionally, the processing circuit 550 may be configured to provide the device parameters to the network 504 and/or controller 506 upon receiving an instruction to do so from the network 504 and/or the controller 506. This may be in conjunction with any of the other configurations described above. Further, the processing circuit 550 may also provide additional data associated with the processing circuit 550 itself, such as alarms, data logs, etc.

The processing circuit 550 may provide host device data containing data relating to the BMS device 503 (e.g. the processing circuit 550 and/or the host device components 570) to the host interface 532. The host interface 532 may be configured to receive the host device data and convert the host device data received from the processing circuit into one or more host controller serial data packets for transmission to the communications circuit 500. The host controller serial data packet may then be provided to the UART 526, which may convert the host controller serial data packet into a UART compatible serial data packet. In one embodiment, UART 526 may convert the host controller serial data packet into the UART compatible serial data packet. Alternatively, the API 531 may be used to convert the host controller serial data packet into the UART compatible serial data packet. The UART serial data packet may then be transmitted to the UART 524 of the communications circuit 500. The UART 524 may then convert the UART serial data packet back into the host controller serial data packet. In one embodiment the UART 524 converts the UART serial data packet into the host controller serial data packet. In other embodiments, the API 530 converts the UART serial data packet into the host controller serial data packet.

The host controller serial data packet may then be received by the communication task module 522. The communication task module can read the host controller serial data packet and parse the host controller serial data packet to extract one or more attribute values. In one embodiment, the attribute values are values associated with the BMS device 503, such as the device parameters of the host device components 570, or values associated with the processing circuit. The communication task module 522 may then output the attribute values to the respective attributes within the equipment object 520. In one embodiment, the communication task module 522 may determine which parsed values are associated with a given attribute of the equipment object by reading an identifier associated with each portion of the received data, and map that to a corresponding attribute within the attribute value. In one example, a user can configure the equipment object attributes to relate to data received from the host device by assigning certain data identifiers contained within the host controller serial data packet to a given equipment object attribute. As will be discussed in more detail below, the equipment object 520 can be configured using a configuration device.

The attribute values stored within the attributes of the equipment object 520 can be read by the mapping module 534. The mapping module 534 may determine if an attribute value has changed by constantly monitoring the equipment object 520. In other embodiments, the equipment object 520 may provide an interrupt signal to the mapping module 534, indicating that an attribute value has been updated. The mapping module 534 may then read the equipment object attribute data from the equipment object 520 and convert the equipment object attribute data in to BACnet object data. The mapping module 534 may further be configured to then transmit the updated BACnet Object Data to the appropriate BACnet object 533. In some instances, a BACnet object may not current exist that is associated with a particular equipment object attribute. The mapping module 534 may then generate a new BACnet object via the network interface 518. In one embodiment, the mapping module 534 may already be configured to associate a given BACnet object 533 with an equipment object 520 attribute. In one embodiment, the mapping module 534 may read an attribute ID for each received equipment object attribute data to determine which BACnet object to map the received data to. In some embodiments, the equipment object 520 may be configured to not expose certain attributes to the mapping module 534. In those instances, the received attribute values are stored in the equipment object 520, but are not provided to the mapping module 534.

Once the BACnet objects 533 receive the BACnet object data, the BACnet/MSTP layer 544 can read the BACnet objects 533 to determine if any values have been modified. In one embodiment, the BACnet/MSTP layer 544 may constantly read all of the BACnet objects 533 to determine if any values have been changed. In other embodiment, one or more of the BACnet objects 533 may provide an interrupt signal to the BACnet/MSTP layer 544 to indicate a value has changed. The BACnet/MSTP layer 544 may then read one or more of the BACnet objects 533 to receive parsed BACnet object data from the BACnet objects 533. For example, if binary BACnet object 538 contained updated information, the BACnet/MSTP layer 544 may request and receive data only from the Binary BACnet object 538. The BACnet/MSTP layer 544 receiving the parsed BACnet object data may then convert the parsed BACnet object data into standard BACnet data, and transmit the BACnet data containing the data from the BMS device 503 to the network 504. As described above, the BACnet/MSTP layer 544 may, in some examples, only transmit the BACnet data to the network 504 when one or more external devices are subscribed to receive data from the host device via a BACnet subscription service. In other embodiments, the BACnet/MSTP layer 544 may make the BACnet data available to be read by one or more external devices or systems via the network 504.

Figure 6B:
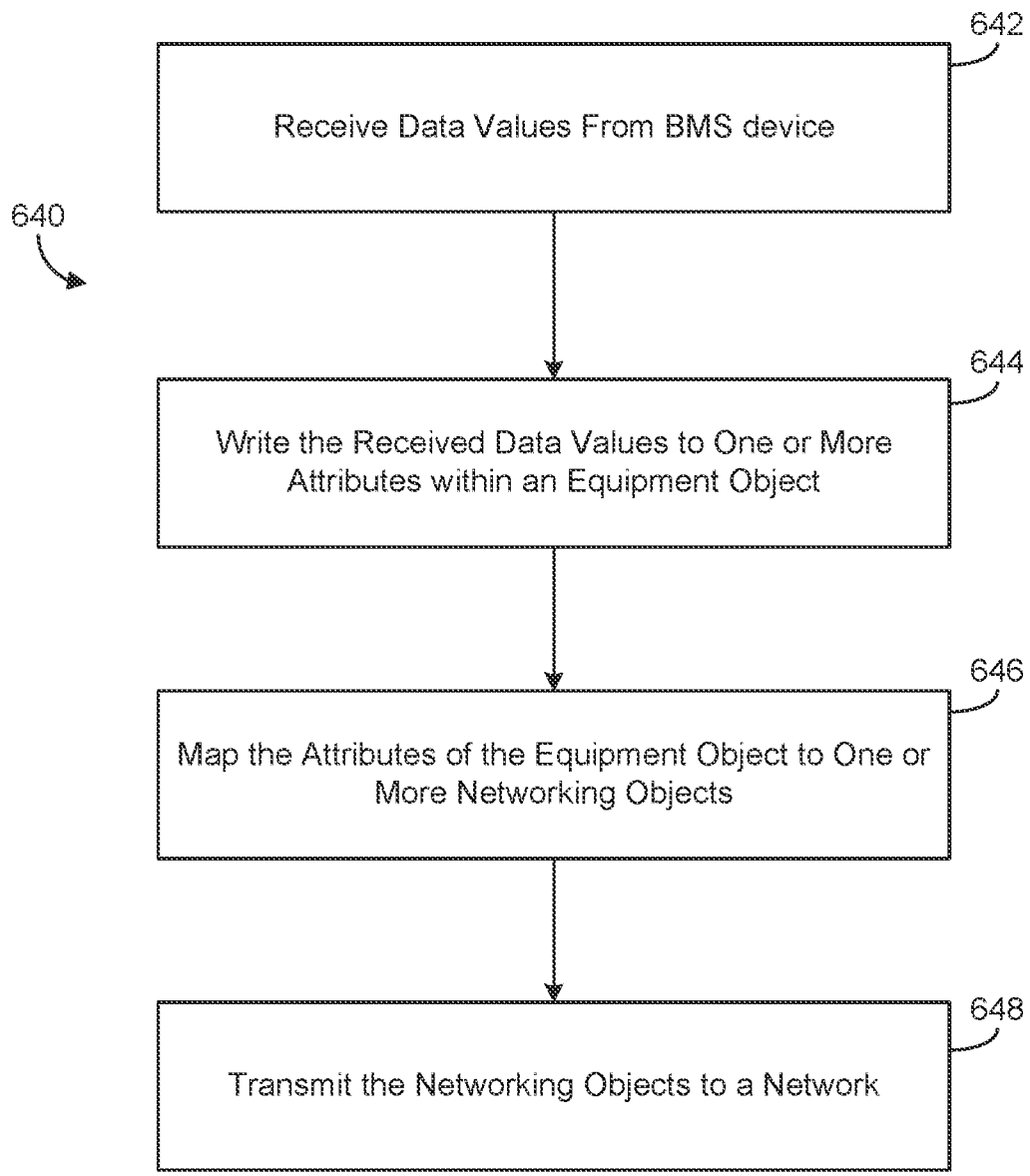
FIG. 6B is a flow chart illustrating a process for communicating with a BMS device over a network using the communication circuit of FIG. 5A.

Turning now to FIG. 6B, a flow chart illustrating a process 640 for communicating data from a BMS device to an external network as described in FIG. 5B using the system of FIG. 5A, is shown, according to some embodiments. At process block 642, one or more data values may be received from the BMS device 503 via the host controller 502. The data values may be associated with BMS device 503. The data values may be received by the communications circuit 500 via the UART interfaces 524, 526. At process block 644, the received data values may be written to one or more attributes within the equipment object 520. In one embodiment, the communication task module 522 writes the values into the associated equipment object attributes within the equipment object 520. At process block 646, the one or more equipment object attributes stored within the equipment object 520 are mapped to one or more network objects. In one embodiment, the network objects are the BACnet objects 533 described in FIG. 5A. Further, the equipment object attributes may be mapped to the one or more network objects by the mapping module 534, as described above in FIG. 5B. Finally, at process block 648, the network objects may be exposed to the network 504. In one embodiment, the BACnet/MSTP layer 544 transmits the network objects to the network 504 as described above in FIGS. 5A and 5B where one or more external devices have subscribed to the BMS device 503 via a BACnet Subscription Service.

Figure 6C:
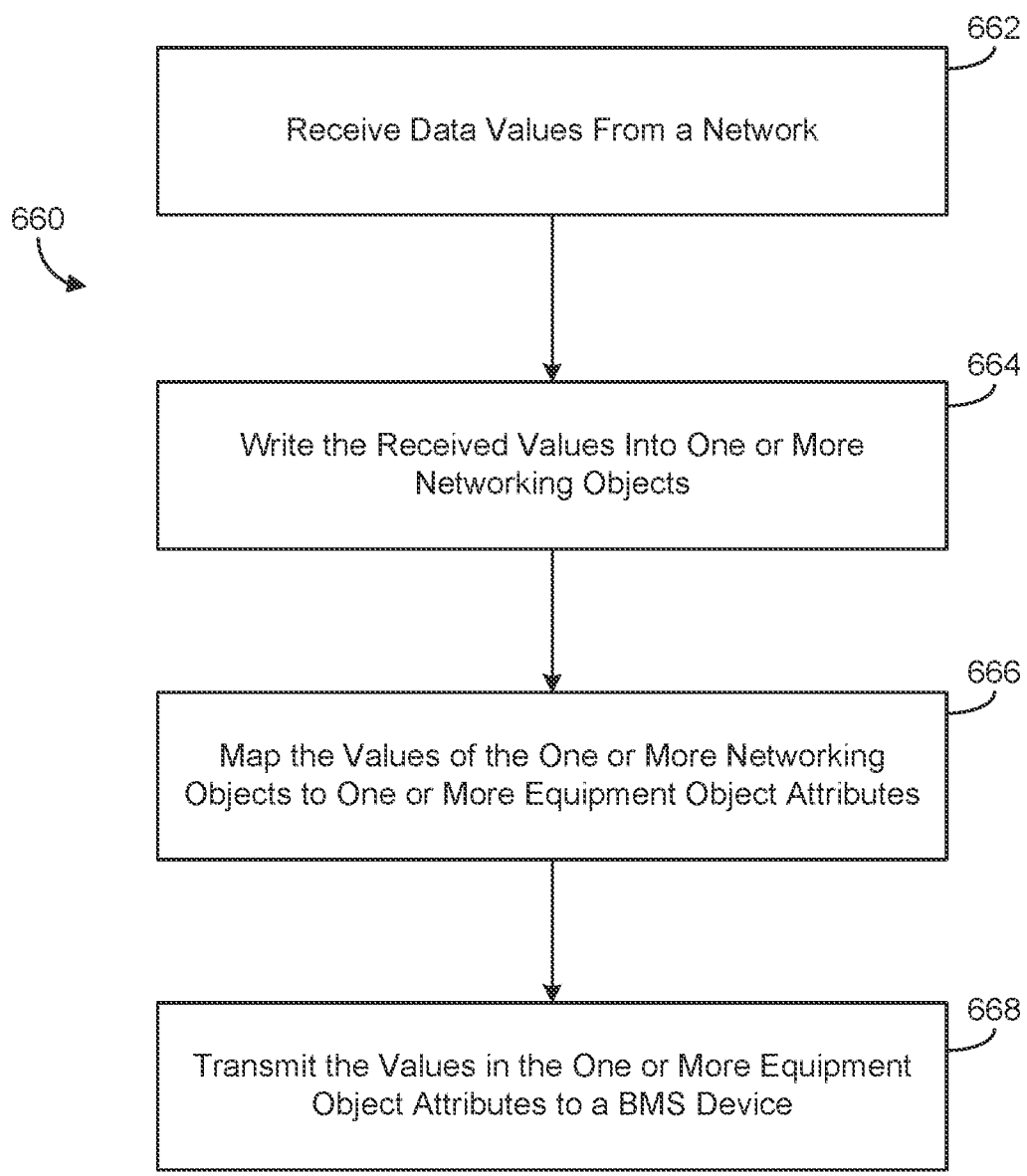
FIG. 6C is a flow chart illustrating a process for communicating data from a network to a BMS device using the communication circuit of FIG. 5A.

Turning now to FIG. 6C, a flow chart illustrating a process 660 for communicating data from a network to a BMS device as described in FIG. 5C using the system of FIG. 5A, is shown, according to some embodiments. At process block 662, one or more data values are received from network 504.

In one embodiment, the data values are data values to be written to the BMS device 503. At process block 664, the received data values are written into one or more networking objects. In one embodiment, the networking objects are the BACnet objects 533 described in FIG. 5A. In a further embodiment, the received data values are written into the one or more networking objects by the network/MSTP layer 544, as described in FIGS. 5A and 5C, above. At process block 666, the values written in the one or more networking objects are mapped to one or more equipment object attributes within the equipment object 520. In one embodiment, the mapping module 534 maps the values written in the one or more networking objects to the one or more equipment object attributes within the equipment object 520 as described in FIGS. 5A and 5C, above. Finally, at process block 668, the values written to the one or more equipment object attributes within the equipment object 520 are transmitted to the host controller 502 of the BMS device 503. In one embodiment, the communication task 522 reads and transmits the values in the equipment object attributes within the equipment object 520 as described in FIGS. 5A and 5C, above. Further, the data values can be transmitted to the host controller 502 via the UART interfaces 524, 526.

Figure 7:
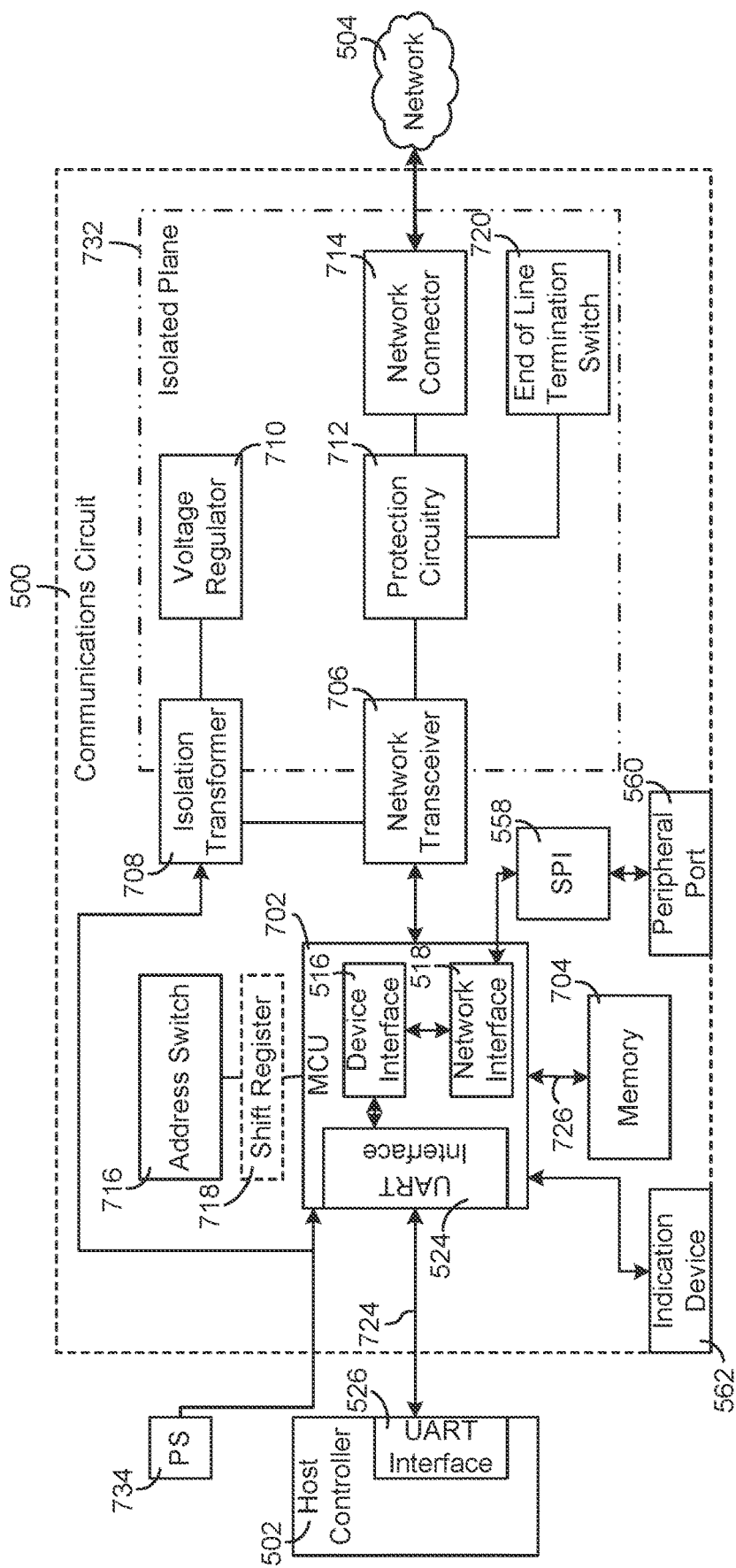
FIG. 7 is a schematic block diagram of the communication circuit of FIG. 5A, according to some embodiments.

Turning now to FIG. 7, a schematic block diagram of the communications circuit 500 is shown, according to some embodiments. The communications circuit 500 may include a microcontroller unit (MCU) 702, a memory 704, a network transceiver 706, an isolation transformer 708, a voltage regulator 710, protection circuitry 712, and a network connector 714. The communications circuit 500 may optionally include an address switch 716, a shift register 718, and an end of line termination switch 720. Similar to above, the communications circuit 500 is in communication with the host controller 502. The host controller 502 can be located in a BMS device, as described above. For example, the host controller can be part of an HVAC device (AHU, RTU, etc.), a sensor (pressure sensor, temperature sensor, etc.), a mechanical device (e.g. valves, actuators, fans, etc.), simple controllers (thermostats, HVAC controllers, etc.), or any other BMS device. The communications circuit 500 is further shown to include one or more indication device 562, as described above. The communications circuit 500 further includes the serial peripheral interface (SPI) driver 558, which may drive the peripheral port 560, as described above.

The MCU 702 may be a general purpose or specific purpose processor, an application specific integrated circuit (ASIC), one or more field programmable gate arrays (FPGAs), a group of processing components, or other suitable processing components. The MCU 702 is configured to execute computer code or instructions stored in the memory 704 or received from other computer readable media (e.g., CDROM, network storage, a remote server, etc.). In one embodiment, the MCU 702 is an RX111 microcontroller from Renesas Electronics America. The MCU 702 can be configured to communicate with the host MCU 722 via the UART interface 524. In some examples, the UART interface 524 may be replaced with a different type of communication interface, such as an I²C interface, an SPI interface, a universal serial bus (USB) interface, etc. As shown in FIG. 7, the UART interface 526 of the host controller 502 can be in communication with the UART interface 524 via a communication line 724. In one example, the communication line 724 may include three communication wires. The three communication wires may include, a first communication wire configured to function as a receiving data wire, a second communication wire configured to be a transmission data wire, and a third communication wire configured to be an external interrupt communication wire. The communication line 724 may be used to facilitate communication between the MCU 702 and the host controller 502. In other examples, different communication lines may be used as required. In one embodiment, the MCU 702 includes custom firmware related to performing BACnet operations, as described above. Further, the MCU 702 may be in communication with a crystal (not shown) to provide a timing system to the MCU 702. In one embodiment, the crystal is a 16 MHz crystal. The MCU may also include the device interface 516 and the network interface 518, as described above.

The MCU 702 may be in communication with the memory 704. The memory 704 may include one or more devices (e.g., memory units, memory devices, storage devices, etc.) for storing data and/or computer code for completing and/or facilitating the various processes described in the present disclosure. The memory 704 may include random access memory (RAM), read-only memory (ROM), hard drive storage, temporary storage, non-volatile memory, flash memory, optical memory, or any other suitable memory for storing software objects and/or computer instructions. In one embodiment, the memory 704 is a serial NOR flash memory. The memory 704 may be communicably connected to the MCU 702 via a communication line 726. In some embodiments, the memory 704 is integrated in the MCU 702. The memory 704 may include computer code for executing, by the MCU 702, one or more processes described herein. In one embodiment, the memory 704 includes software including all data associated with the host controller 502, and/or the BMS device 503. In one embodiment, the memory 704 includes eight gigabytes (GB) of storage. However, the memory 704 may include more than eight gigabytes or less than eight gigabytes, as required by the application. The memory 704 may include software for performing BACnet operations as described above. Further, the memory 704 may include objects, such as equipment objects, and standard BACnet objects. Further, in some examples the memory 704 can include software for performing alarming, trending, scheduling, etc. These additional functions can be performed by the MCU 702. In one example, these functions may exist solely in the communication circuit 700, thereby allowing for additional functionality to be added to a host device.

In one embodiment, the communications circuit 500 is addressed directly by a user via software. For example, a user may access the MCU 702 via the network connector 714 to provide an address for the communications circuit 500. In other examples, the user may access the MCU 702 via the peripheral port 560. The peripheral port 560 may provide for connection to a serial flash device, such as a USB device, an SD or micro SD device, a compact flash (CF) device, etc. In still further embodiments, the host controller 502 is used to address the communication circuit 500, such as via UART interfaces 524, 526. In other embodiments, the communications circuit 500 may include a switch, such as optional address switch 716 to allow a user to manually address the communication circuit. In one embodiment, the address switch 716 includes one or more DIP switches. Alternatively, the address switch 716 may include one or more rotary switches. In one embodiment, the shift register 718 is used to translate the address set on the address switch 716 into serialized data readable by the MCU 702. In some examples, the MCU 702 may be configured by a user to prioritize addressing methods. For example, a user may be able to set a flag within the MCU 702 to indicate that addressing of the communication circuit via the communication interface 724 is prioritized over addressing performed using the address switch 716, or vice versa.

Figure 13:
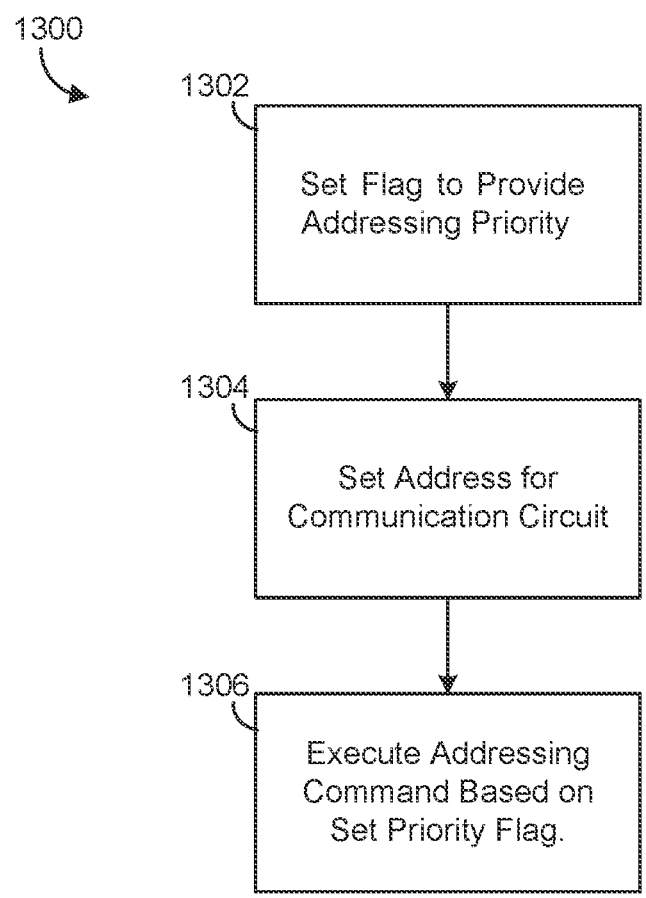
FIG. 13 is a flow chart illustrating a process for addressing the communication circuit, according to some embodiments.

Turning briefly to FIG. 13, a process 1300 for addressing the communication circuit 500 is shown, according to some embodiments. At process block 1302, a flag can be set in the communications circuit 500 to establish which type of addressing has priority for the communications circuit 500. Example addressing types, as described above, may include via the communications circuit 500 itself (e.g. via address switches), or via an external addressing source. External addressing sources may include the network 504, the host controller 502, and/or an external device coupled to the peripheral port 560. Furthermore, the flag may be set via the network 504, via the host controller 502, or via a device coupled to the peripheral port 560. Additionally, in some embodiments, the priority can be a default priority programmed into the communications circuit 500. At process block 1304, the address may be set for the communications circuit 500 using one of the above methods. For example, a user may address the communications circuit 500 using the address switch 716 described in FIG. 7. Finally, at process block 1306, the communications circuit 500 may execute the addressing command set in process block 1304, based on the set priority flag. For example, if the address switch 716 provides one address for the communications circuit 500, and a second address is provided via an external source (e.g. via the network 504, host controller 502, or peripheral port 560), the communications circuit 500 may set the address based on which method of addressing is given priority. Thus, if the flag is set to give priority to external source addressing, the communications circuit 500 (e.g. via MCU 702) may override an address entered via the address switch 716, and set the address provided by the external source.

In one embodiment, the network transceiver 706 is an RS-485 transceiver. In a further embodiment, the network transceiver 706 is an RS-485 transceiver for communicating over a BACnet network. In one example, the network transceiver 706 may be an ISO 1176 transceiver from Texas Instruments. The network transceiver 706 may be electrically isolated from the MCU 702 and the host controller 502. For example, the network transceiver 706 may be located on an isolated plane 732. The isolated plane 732 can reduce the effects of ground loops and noise from the MCU 702. In one embodiment, by positioning the network transceiver 706 on the isolated plane 732, the number of communication devices that can share a common RS-485 bus can be increased due to the reduction of interference from the MCU 702 and/or the host controller 502. The isolation transformer 708 and regulator 710 can further be located on the isolated plane 728 and provide additional isolation for the network transceiver 706. In one embodiment, the isolation transformer 708 and regulator 710 can provide an isolated power supply to the network transceiver 706, by isolating and regulating a power supply 734 provided to the communication circuit 700. The network connector 714 may further be located on the isolated plane 728. In one embodiment, the network connector 714 is a four-pin connector from Phoenix Contact. The network connector 714 may provide a connection to a BACnet network backbone or trunk line. In one embodiment, the network connector 714 may provide a connection to an additional BACnet interface device, such as a wireless communication device, such as Wi-Fi, LoRA RF, Zigbee, Bluetooth, cellular (3G, 4G, LTE, CDMA, etc.) or other applicable wireless communication devices. Where the communications circuit 500 is the last device on a network (e.g. a BACnet network), the end of line (EOL) termination switch 720 can provide the proper termination for the network.

The power supply 734 can be a 3.3 VDC power supply supplied from an external source. In one embodiment, the power supply 734 is supplied by a host device, such as BMS device 503. In a further embodiment, the power supply 734 provides a 100 mA service to the communications circuit 500. However, the power supply 734 can provide more than a 100 mA service or less than a 100 mA service, as applicable.

As described above in FIG. 7, as well as in FIG. 5, the MCU 702 communicates with the host controller via a serial interface over communication line 724. The communications circuit 500 can support multiple standard serial interfaces as described above (e.g. UART, SPI, I²C, USB, etc.). While multiple types of serial interfaces can be used, the messages transmitted across any of the serial interfaces stay the same. For example, regardless of the interface, the exchange between the host controller 502 and the MCU 702 will consist of the host controller 502 sending a request message and the MCU 702 sending a reply message.

Figure 8:
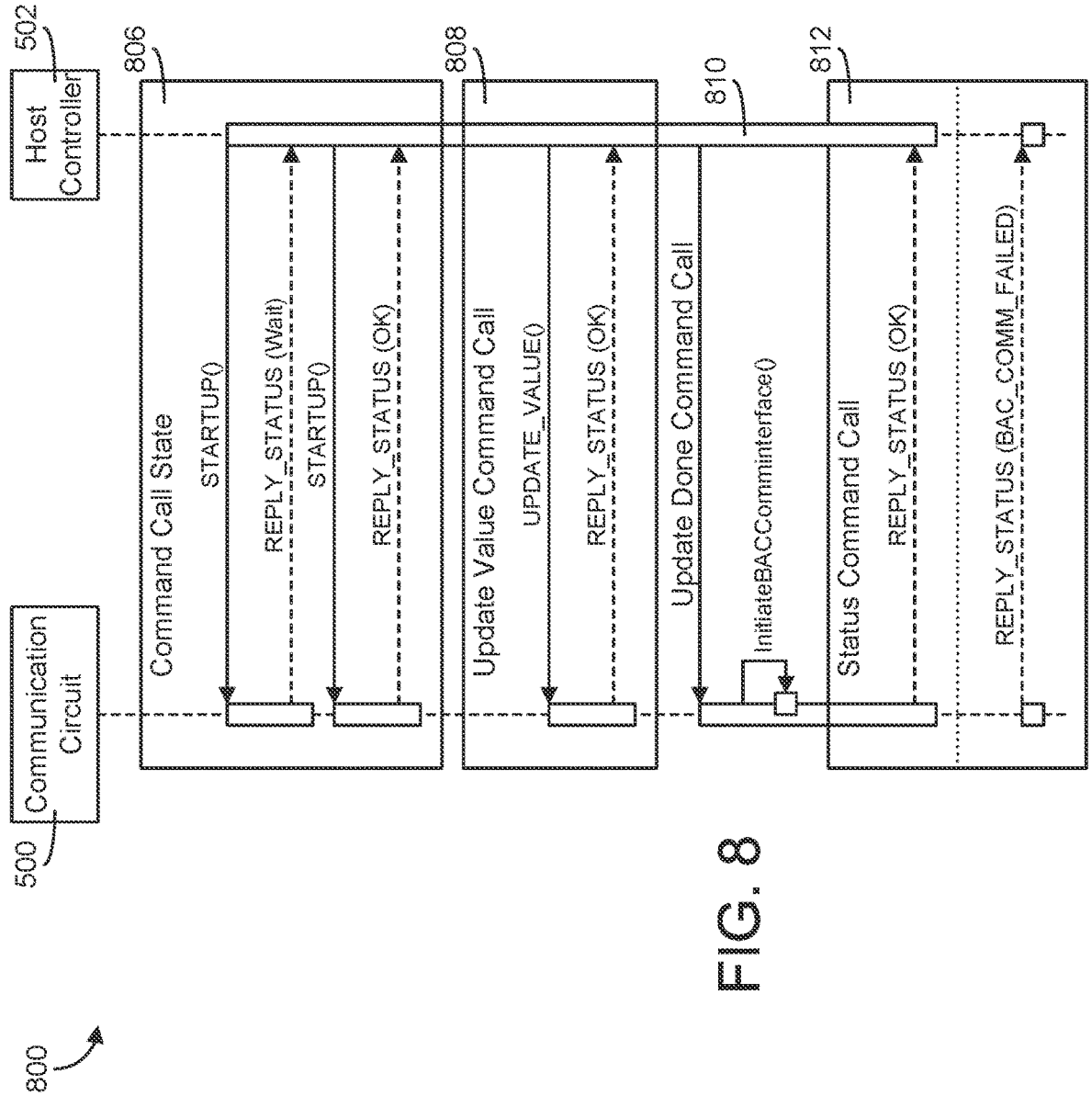
FIG. 8 is a sequence diagram illustrating an exemplary startup sequence, according to some embodiments.

In some embodiments, when the communications circuit 500 is initially powered up or restarted, the communications circuit 500 may require the host controller 502 to execute a startup sequence. The startup sequence may be designed to allow both the communications circuit 500 and the host controller 502 to synchronize data between them. In one embodiment, the host controller 502 is responsible for initiating the startup sequence. However, in some examples the communications circuit 500 may initiate the startup sequence. Turning now to FIG. 8, a sequence diagram showing an example startup sequence 800 is shown, according to some embodiments. The startup sequence 800 is shown to have the host controller 502 initiate the startup sequence 800 with the communications circuit 500. At the startup command call state 806, the host controller 502 may continuously send a startup command until the host controller receives an "OK" reply status from the communications circuit 500. Where the host controller 502 receives a "wait" reply status form the communication circuit, or no reply status at all, the host controller 502 may continuously repeat the startup command. In some embodiments, the host controller 502 will continuously send the startup command to the communications circuit 500 until a predetermined amount of time expires. For example, the predetermined time may be five seconds. However, the predetermined time may be more than five seconds or less than five seconds. Further, the host controller 502 may be configured to continuously send the startup command to the communications circuit 500 for a predetermined number of attempts. For example, the predetermined number of attempts may be twenty. However, more than twenty attempts or less than twenty attempts are contemplated predetermined values as well.

Upon receiving the "OK" status, host controller 502 may then send a number of values to the communications circuit 500 during the Update Value Command Call state 808. The values can represent attributes of an equipment object, as described above. In one embodiment, the communications circuit 500 responds to each update value command with an "OK" reply status. Once the host controller 502 has sent all of the updated values, the host controller 502 may then transmit an "Update Done" command to the communications circuit 500 during the Update Done Command Call state 810. In one embodiment, the communications circuit 500 can begin initiating communication with an external network once the Update Done command has been received. For example, the communications circuit 500 may initiate communication with a BACnet network once the Update Done command has been received. At Status command call 812, the communications circuit 500 can send a reply status OK, indicating communication with the external network is operating correctly. Where the communication between the communications circuit 500 and the external network fails, the communications circuit 500 may send a "comm_failed" reply status to the host controller 502.

In some examples, the host controller 502 may perform the startup sequence 800 more than once. Where the host controller 502 initiates the startup sequence 800 more than once, the communications circuit 500 performs the startup sequence 800 as described above, except that it will only initialize the communications with the external network for the first startup sequence request from the host controller 502, unless the communication with the external network failed during the first attempt. Once the communication between the communications circuit 500 and the external network has been initiated, the communications circuit 500 will send an "OK" reply command to the host controller 502 in response to the "Update Done" command for each subsequent startup sequence 800 request. Further, where the startup sequence 800 is not initiated after a restart of the communications circuit 500, the communications circuit 500 will reply to all requests by the host controller 502 with an error message indicating that the communications circuit 500 has been restarted and is awaiting the startup sequence 800.

As described in FIGS. 5A-5C, a host controller and a communication circuit may perform data exchanges, which will be described in more detail below. These data exchanges utilize data packets to perform the data transfers. Each data packet may use multiple data units of varying sizes. Example data units are illustrated in Table 1, below.

TABLE 1

Data Unit Definitions

| Data Unit Name | Number of Bits |
|---|---|
| UCHAR | 8 |
| USHORT | 16 |
| ULONG | 32 |
| FLOAT32 | 32 |
| Variable | Any (in 8 bit increments) |

The order of the bytes for any of the above data units may follow one or more conventional formats. In one embodiment, the above data types follow the Big Endian format, wherein the most significant byte of a value is transmitted first. As shown above, the FLOAT32 data unit can be formatted according to ANSI/IEEE standard 754-1985 "IEEE Standard for Binary Floating-Point Arithmetic."

Table 2, shown below, depicts an exemplary packet structure which may be used in communication between a communication device and a host device, as described above.

TABLE 2

Basic Packet Structure

| SoT | LENGTH | CMD | DATA | CRC | EoT |
|---|---|---|---|---|---|
| UCHAR | USHORT | UCHAR | VARIABLE | USHORT | UCHAR |

As shown in Table 2, the basic packet structure begins with a Start of Transmission (SoT) character. The SoT character may be defined as a standard 8-bit data character. For example, the SoT character can be defined as a value 0x72h. Similarly, the End of Transmission (EoT) character, which is the last character within the data packet, may be defined as a standard 8-bit data character as well. For example, the EoT character may be defined as a value of 0x73h. The purpose of the SoT character and the EoT character is to allow the receiving device (e.g. a communication circuit or a host device) to detect that a full length message has been sent or received. The SoT character within the packet structure is followed by the LENGTH character. The LENGTH character is defined as a USHORT data type. The LENGTH character is defined as the size of the CMD character and the DATA character, combined. In one embodiment, the LENGTH character can define the size of the combination of the CMD character and the DATA character in the number of Octets. Alternatively, the LENGTH character can define the size of the combination of the CMD character and the DATA character in the number of bytes. The CMD character represents commands that either the host device or the communication device exchange for a given action. The DATA field is only present in certain commands and may vary in size depending on the specific command provided in the CMD character. A cyclic redundancy check (CRC) character then follows the DATA field. The CRC character can be a standard CRC polynomial used as an error-detecting code. For example, the CRC polynomial can be x16+12+x5+1. As stated above, the EoT character ends the basic data packet. The data packet structure may have a minimum and maximum size. In one embodiment, the minimum size is seven Octets and the maximum size is eighteen Octets. However minimum sizes greater than seven Octets or less than seven Octets, and maximum sizes greater than eighteen Octets or less than eighteen Octets are contemplated.

Table 3, below, shows example command codes that may be issued between a host device and a communication circuit, such as those described above. Table 3 further shows possible replies to the given commands. As stated above, each command instructs the receiving device (i.e. the host device or the communication circuit) to execute one or more routines. In one embodiment, the command codes are incorporated within the CMD character of the basic packet structure, described above in Table 2.

TABLE 3

Exemplary List of Commands

| Host Device Command | Communication Circuit (CC) Reply Command | DESCRIPTION | OP CODE |
|---|---|---|---|
| START UP | | The command sent by host device to CC which allows CC to initialize and signal to the host device when ready for normal communication. | 0x01 |

TABLE 3-continued

Exemplary List of Commands

| Host Device Command | Communication Circuit (CC) Reply Command | DESCRIPTION | OP CODE |
|---|---|---|---|
| | REPLY STATUS | Simple command to return Status. Possible Status returned to START UP are OK, WAIT, CRC_ERROR. | 0x06 |
| UPDATE HOST | | The periodic command sent from the host device to the CC requesting if any attribute has changed. Two possible replies from CC. | 0x02 |
| | UPDATE HOST REPLY | A reply command from the CC to the host device UPDATE HOST request, giving the attribute number that has changed. If nothing has changed a Reply Status is sent instead. The host device will then read the value of the attribute specified in this command. | 0x03 |
| | REPLY STATUS | Simple command to return Status. Possible Status values OK, CC_NOT_STARTED, CRC_ERROR | 0x06 |
| UPDATE VALUE | | A command issued by the host device for it to send a new value for the specified attribute. | 0x04 |
| | REPLY STATUS | Possible Status values OK, CC_NOT_STARTED, ATTRIBUTE_ID_NOT_FOUND, INVALID_ENUM_VALUE, CRC_ERROR | 0x06 |
| READ VALUE | | The command issued by the host device to read an attribute value from the CC. The value read will be typically be the value returned in the UPDATE HOST REPLY command. | 0x05 |
| | UPDATE VALUE | The command issued by JBOC to reply with the requested value. | 0x04 |
| | REPLY STATUS | Possible Status values CC_NOT_STARTED, ATTRIBUTE_ID_NOT_FOUND, CRC_ERROR | 0x06 |
| RESTART JBOC | | The command from the HOST to restart the CC. After restarting CC will wait for the START UP command | 0x07 |
| | REPLY STATUS | Possible Status values OK, CRC_ERROR | 0x06 |
| UPDATE DONE | | The command from the host device to the CC. Host device is done sending all his initial updates | 0x08 |
| | REPLY STATUS | Possible Status values OK, JBOC_NOT_STARTED, CRC_ERROR | 0x06 |

Table 4, below, provides an exemplary list of status codes that can accompany a Reply Status command.

TABLE 4

Error Codes

| Reply Status Code | Description | OP Code |
|---|---|---|
| OK | Everything is OK | 0x01 |
| WAIT | Busy | 0x02 |
| CC_NOT_STARTED | Communication Circuit is yet to start, host device should initiate startup sequence | 0x03 |
| ATTRIBUTE_ID_NOT_FOUND | Communication Circuit could not find attribute value requested in the Read request | 0x04 |
| CRC ERROR | CRC validation failed | 0x05 |
| BAC_COMM_FAILED | Failed to initialize the BACCOM interface | 0x06 |
| INVALID_ENUM_VALUE | An enumeration value was sent by the host in the Update Value command that is too large for the set defined. | 0x08 |

In one embodiment, communication and data transfers (such as those described above) are initiated only by a host controller. The associated communication circuit therefore will only respond to a request from the host controller. However, in other examples, the communication circuit may initiate communication with the host controller. Further, standard timing requirements may be used to ensure proper communication between a communication circuit and the host controller. In one embodiment, the maximum delay between characters of a message being transmitted by a host controller or a communication device is fifty milliseconds. However, maximum delays of more than fifty milliseconds or less than fifty milliseconds are considered. In some embodiments, the host device will wait for a predetermined time period for a response from a communication circuit after transmitting a message/request. In one embodiment, the predetermined time period is two seconds. However, predetermined time periods of more than two seconds or less than two seconds are also considered. The host controller, not receiving a response from the communication circuit by the expiration of the predetermined time may cancel the original request and resubmit the message/request to the communication circuit.

In some embodiments, a communication circuit, such as those described in FIGS. 5A-5C, may be configured to persist value, such that the values can be modified via an external network for the host controller. In one example, the external network is a BACnet network. Generally, a host controller may already persist those values identified as being able to be modified via an external network, so the communication circuit is configured to not persist the values that can be written via the external network. Where the host controller persists the values, the host controller is the source of all persisted values, and must synch the persisted values when the host controller is initialized. If the communication circuit is configured to persist the written values, the communication circuit must flag all of the values that are persisted as having changed during a startup process, and send the changed persisted values to the host controller.

Figure 9:
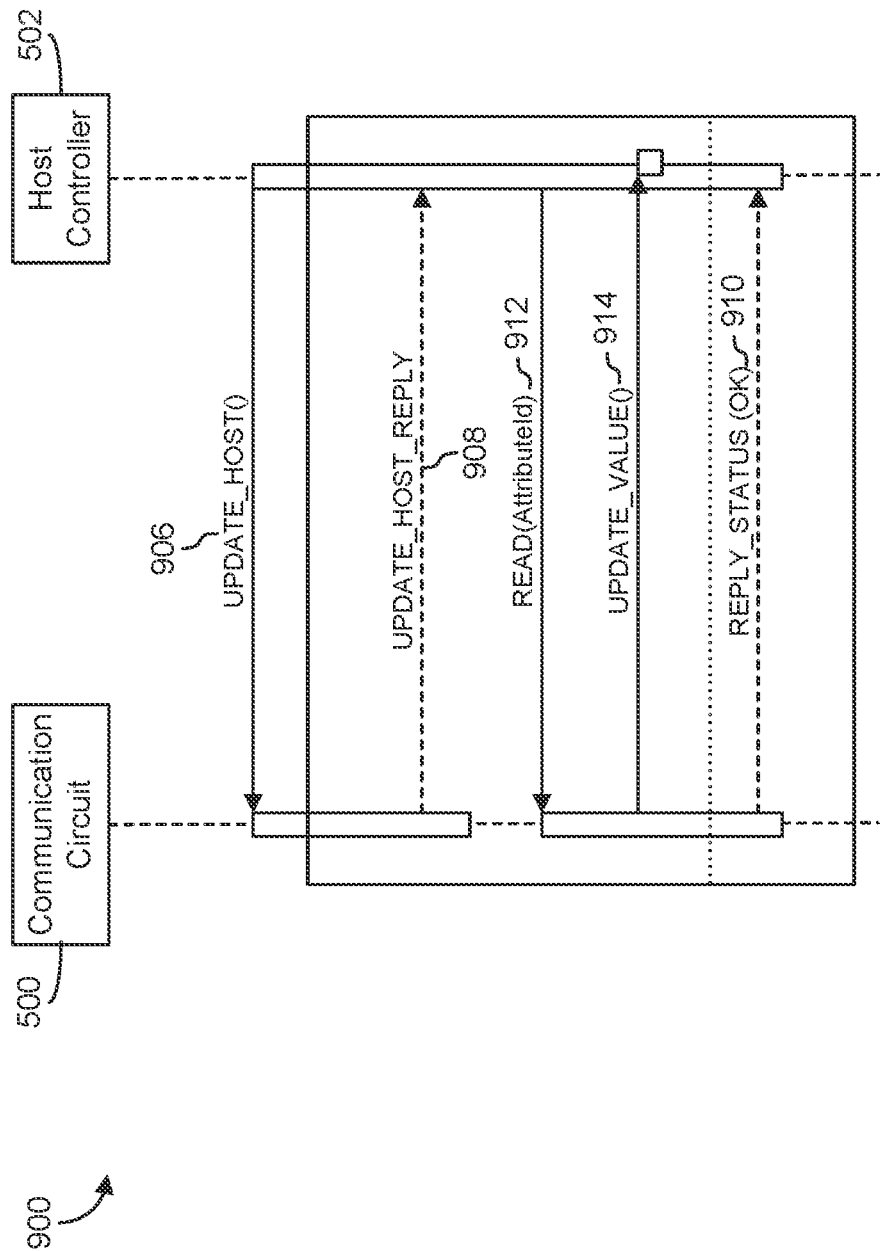
FIG. 9 is a sequence diagram illustrating a process for transferring data between a communication circuit and a host device, according to some embodiments.

Turning now to FIG. 9, a data transfer process 900 for transferring data between a communications circuit 500 and a host controller 502 is shown, according to some embodiments. In one embodiment, the data transfer process 900 is used to write data received by the communications circuit 500 from an external network. For example, the external network may be a BACnet network. However, other external networks are contemplated. In one embodiment, the data transfer process can be initiated after the startup sequence 800 described in FIG. 8 has been completed.

In one embodiment, the host controller 502 periodically initiates an "Update_Host" command 906 to be sent to the communications circuit 500. The Update_Host command 906 can be used to request any updated attributes within the communications circuit 500 be communicated to the host controller 502. In one embodiment, the updated attributes can be updated attributes within an equipment object of the communications circuit 500. In other examples, the updated attributes can be attributes of other data objects, such as the standard BACnet objects discussed above. The communications circuit 500 may reply to the host controller 502 with either an "Update_Host_Reply" command 908 or a "Reply_Status" command 910, which are described in more detail below. In one example, the Update_Host command 906 may act as a heartbeat signal due to its periodic initiation.

The Update_Host_Reply command 908 can be transmitted to the host controller 502 along with one or more attributes that have changed. In one embodiment, the Update_Host_Reply command 908 includes an attribute ID of the attribute that has changed. The host device 904, receiving an Update_Host_Reply command 908 with a changed attribute may respond with a "Read_Value" command 912 to the communications circuit 500 to request the new attribute data. In response, the communications circuit 500 may respond to the Read_Value command 912 with either an "Update_Value" command 914 containing the new data value for the attribute, or the Reply_Status command 910. In one embodiment, the Reply_Status command 910 is transmitted to the host controller 502 from the communications circuit 500 where the changed attribute value is unable to be provided to the host controller 502. The Reply_Status command 910, in response to the Read_Value command 912 may reply with one or more status values. In one example, the status value can be a CRC_ERROR value. The CRC_ERROR value can indicate that there was a problem with the Read_Value command 912, and instruct the host controller 502 to repeat the Read_Value command 912. Other example status values returned in the Reply_Status command 910 can include an "Attribute_ID_Not_Found" value. The Attribute_ID_Not_Found value may signal to the host controller 502 that there is a software problem preventing the host controller 502 from being read. In one embodiment, if the host controller 502 does not issue the Read_Value command 912, the communications circuit 500 will resend the Update_Host_Reply 908 containing the unread attribute value in response to a subsequent Update_Host command 906. In a further embodiment, the host controller 502 will continue to transmit the Read_Value command 912 to the communications circuit 500 to request a read of the specified attribute. For example, the host controller 502 may re-transmit the Read_Value command 912 if a response is not received from the communications circuit 500 after a pre-determined time. In one embodiment, the predetermined time is two seconds. However, predetermined times of more than two seconds or less than two seconds are also considered. In one embodiment, the communications circuit 500 will not send any data again to the host controller 502 until it is requested again by the host controller 502.

Where the communications circuit 500 replies to the Update_Host command 906 with the Reply_Status command 910, the Reply_Status command 910 may include one or more status values within the command. For example, the Reply_Status command 910 may include one or more of the reply status messages listed in Table 4, above.

Figure 10:
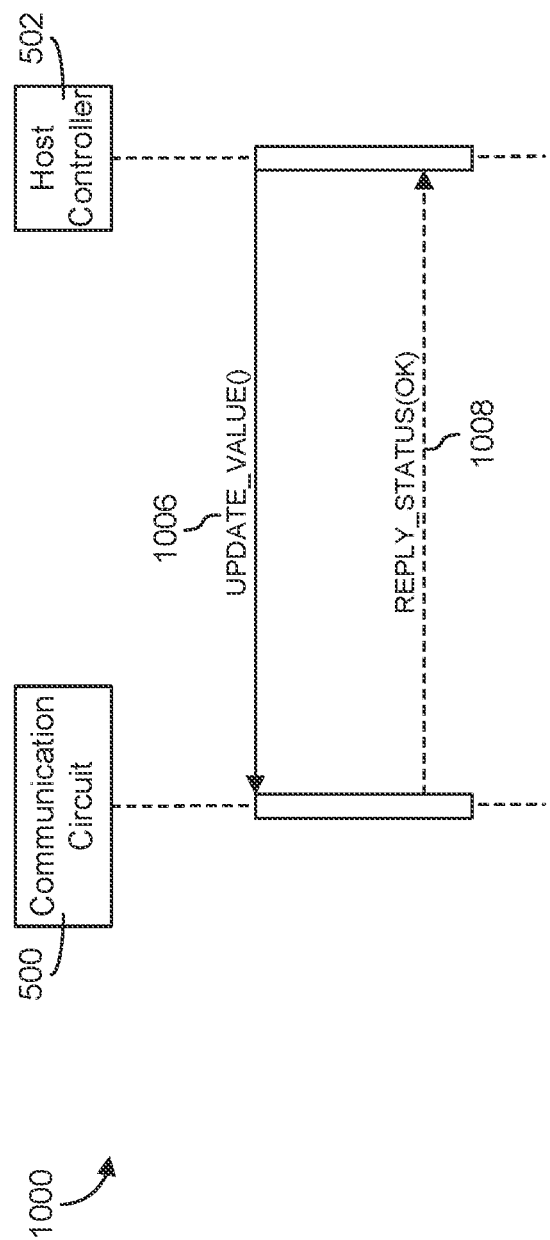
FIG. 10 is a sequence diagram illustrating a communication update process, according to some embodiments.

Turning now to FIG. 10, a host to communication circuit update process 1000 is shown, according to some embodiments. A host controller 502 may require an updated value from a communications circuit 500, as shown in FIG. 10. The host controller 502 may send an "UPDATE_VALUE" command 1006 to send the new value to the communications circuit 500. In reply to the UPDATE_VALUE command 1006, the communications circuit 500 may return a REPLY_STATUS command 1008. The REPLY_STATUS command 1008 can include reply status messages, such as those listed in Table 4, above.

Figure 11:
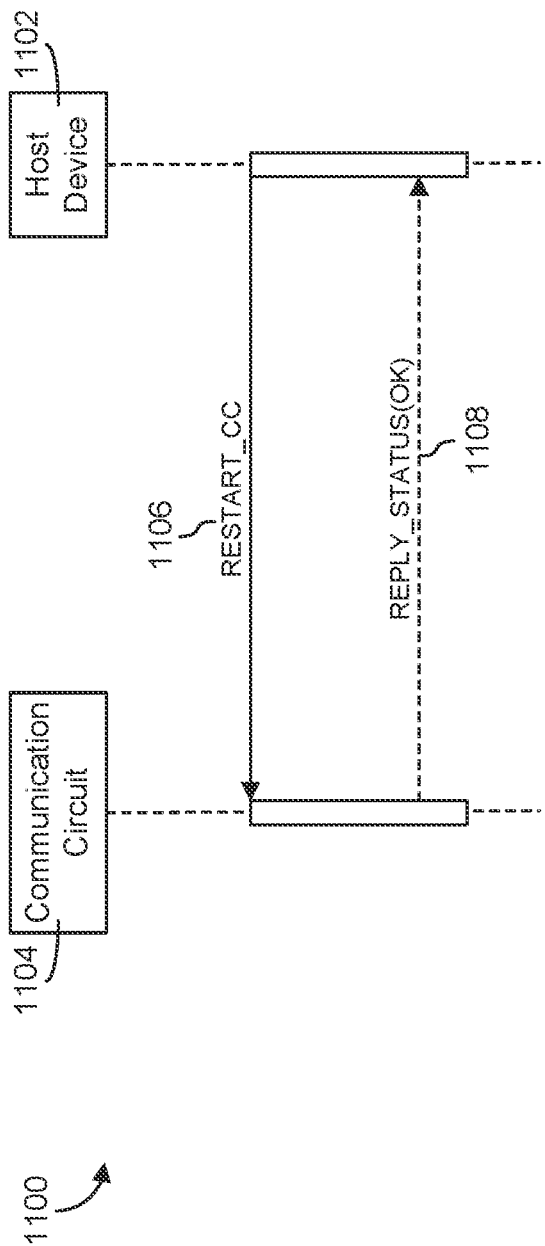
FIG. 11 is a sequence diagram illustrating a communication circuit restart process, according to some embodiments.

Turning now to FIG. 11, a communication circuit restart process 1100 is shown, according to some embodiments. The communication circuit restart process 1100 may be initiated by a host controller 502 and processed by a communications circuit 500. In one embodiment, the process 1100 is initiated when the host controller 502 is restarting itself. Alternatively, the process 1100 can be initiated when an error in the communication between the host controller 502 and the communications circuit 500 is detected. The host controller 502 may shut off a communication interface to the communications circuit 500 prior to restarting. In one embodiment, the host controller 502 issues a "RESTART_CC" command 1106 to the communications circuit 500. The communications circuit 500 may respond with a REPLY_STATUS command 1108 including a reply status message, such as those listed in Table 4, above. Where the communications circuit 500 responds with an "OK" reply status message, the communications circuit 500 has received the command, and will restart after a predetermined delay. In one embodiment, the predetermined delay is five seconds. However, predetermined delays of more than five seconds, or less than five seconds are contemplated.

Figure 12:
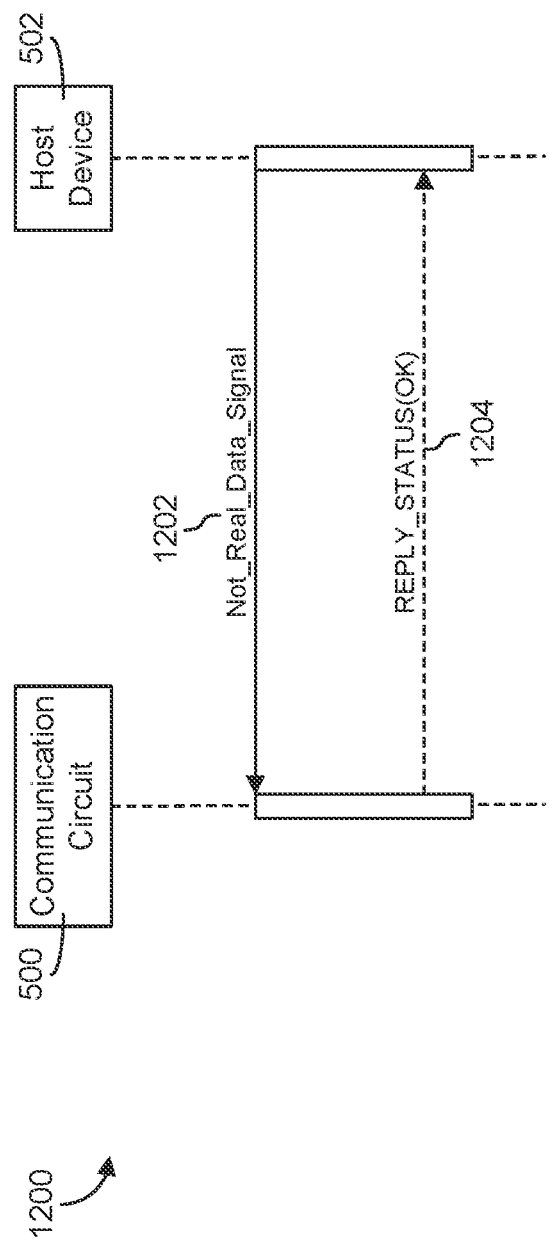
FIG. 12 is a sequence diagram illustrating a static_data process, according to some embodiments.

Turning now to FIG. 12, a static data communication process 1200 is shown, according to some embodiments. The static data communication process 1200 may be initiated by the host controller 502, and processed by the communications circuit 500. In one embodiment, the process 1200 is initiated when the host controller 502 transmits data to the communication controller that is static or "not real" data. Example, static data may include data packets transmitted by the host controller that do not include any data related to the host controller 502, such as various headers, status checks, heartbeats, etc., which are used by the native host controller 502 applications, but are not desired or interpretable by the communication circuit 500. In one embodiment, the host controller 502 is configured to transmit a "Static_Data_Signal" 1202 to the communication circuit to indicate that static data is about to be transmitted. In alternate embodiments, the Static_Data_Signal 1202 can be sent after the static data has been transmitted to the communications circuit 500. The Static_Data_Signal 1202 may be interpreted by the communications circuit 500 to ensure that the communications circuit 500 does not try to process the static data, which could result in an error being generated. In some embodiments, the Static_Data_Signal 1202 may include information, such as the duration and/or length of the static data being transmitted by the host controller 502. The communications circuit 500, receiving the Static_Data_Signal 1202 may respond with a REPLY_STATUS command 1204 including a reply status message, such as those listed in Table 4, above. In still further embodiments, the Static_Data_Signal 1202 may be one or more data headers that can be interpreted by the communication task module 522 as indicating static data. The communication task module 522 may then prohibit any data following the interpreted Static_Data_Signal 1202 from being written into the equipment object model. The communication task module 522 may continue to prohibit data received from the host controller 502 from being written to the communication circuit 500 until a subsequent signal indicating actual data is received, such as those described in Tables 2-4, and FIGS. 8-11, described above. Where the Static_Data_Signal 1202 is comprised of one or more data headers that can be interpreted by the communication task module 522 as indicating static data, the communication circuit 500 may not provide a REPLY_Status command 1204. However, in some embodiments, the REPLY_STATUS command 1204 may be provided to the host controller 502 to indicate that the transmitted data was received by the communications circuit 500.

In some embodiments the host controller 502 may execute a static data determination process 1206 as shown in FIG. 12. The host controller 502 may first read the data at process block 1208 that is being transmitted to the communications circuit to determine what the data is associated with. The host controller 502 may then determine if the data is static data at process block 1210. If the data is determined to be static data, the Static_Data_Signal 1202 may be transmitted to the communication circuit 500 at process block 1212. Where the host controller 502 determines that the data is not static data, the data is transmitted to the communication circuit at process block 1214, allowing the communication circuit 500 to expose the associated attribute in the equipment object 520 to the BACnet objects 533. In some embodiments, the process 1206 is performed for all data points during initial setup to prevent unnecessary static data from being provided to a user via the BACnet objects 533.

The following non-limiting examples described possible determinations of static data that may be performed by the host controller 502. In the first example, the BMS device 503 may have a one or more optional sensors that may be coupled to the BMS device 503. Where the optional sensors are not present on the BMS device 503, an error message, and/or a default value associated with the sensor inputs (e.g. a default data point, or binary state) may constantly be provided to the host controller 502. The host controller 502, determining that the optional sensors have never been installed on the BMS device 503, may then determine that the data associated with the optional sensors is static data, and transmit the Static_Data_Signal 1202 to the communication circuit 500 to prevent the static data from being exposed to the BACnet objects.

In a further example, a setting may exist on the BMS device 503. When the setting is activated, additional data, (e.g., two additional data points) may be required to be provided with the setting. Thus, when the setting is activated, the additional data points are not static data, and may be provided to the communication circuit 500 by the host device 502 for exposure to the BACnet objects 533. However, where the setting is not activated, the data is not required, and therefore static. Accordingly, the host controller 502 can determine that the data is static when the setting is not activated and provide a Static_Data_Signal 1202 associated with the additional data points, so that the data points are not exposed to the BACnet objects. In a still further example, the BMS device 503 may be a system, such as an RTU. In some instances, portions of the system may not be active, or even installed, based on the specific configuration needed for an application. Thus, the host controller 502 may determine that all of the data associated with the inactive, or uninstalled, portions of the system are static, and provide the Static_Data_Signal 1202 along with all data associated with the inactive and/or uninstalled portions of the system. The above examples are for illustrative purposes only, and should not be construed as limiting.

Example Implementation—Actuator

Figure 14:
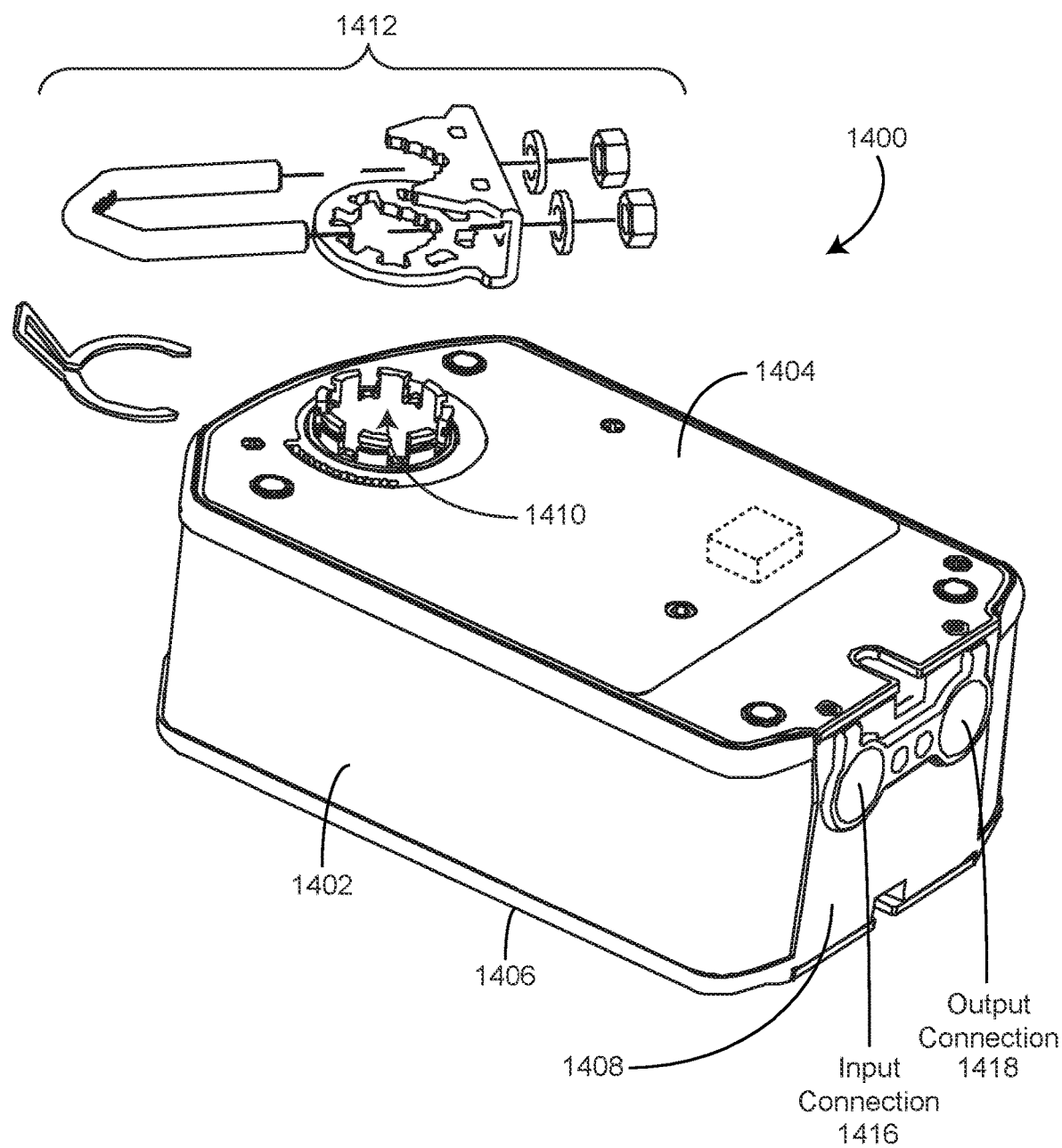
FIG. 14 is a drawing of an actuator for use in an HVAC system to control an HVAC component, according to some embodiments.

Turning now to FIG. 14, an actuator 1400 for use in an HVAC systems is shown, according to some embodiments. In some implementations, actuator 1400 can be used in an HVAC system 100, waterside system 200, airside system 300, or BMS 400, as described with reference to FIGS. 1-4. For example, actuator 1400 may be a damper actuator, a valve actuator, a fan actuator, a pump actuator, or any other type of actuator that can be used in an HVAC system or BMS. In various embodiments, actuator 1400 can be a linear actuator, or a non-spring return actuator.

Actuator 1400 is shown to include a housing 1402 having a front side 1404 (i.e. side A), a rear side 1406 (i.e. side B) opposite front side 1404, and a bottom 1408. The housing 1402 may contain the mechanical and processing components of actuator 1400. In one embodiment, the housing 1402 contains a host controller and a communication circuit, such as those described above in regard to at least FIG. 5A. In further embodiments, the housing 1402 contains a brushless direct current (BLDC) motor and a processing circuit configured to provide a pulse width modulated (PWM) DC output to control the speed of the BLDC motor. The processing circuit can be configured to compare a representation of the electric current output to the BLDC motor to a threshold and may hold the PWM DC output in an off state when the current exceeds the threshold. The processing circuit may also be configured to set the PWM DC output to zero and then ramp up the PWM DC output when actuator 1400 approaches an end stop.

The actuator 1400 is shown to include a drive device 1410. The drive device 1410 can be a drive mechanism, a hub, or other device configured to drive or effectuate movement of an HVAC system component. For example, the drive device 1410 can be configured to receive a shaft of a damper, a valve, or any other movable HVAC system component in order to drive (e.g., rotate) the shaft. In some embodiments, the actuator 1400 includes a coupling device 1412 configured to aid in coupling the drive device 1410 to the movable HVAC system component. For example, the coupling device 1412 may facilitate attaching the drive device 1410 to a valve or damper shaft.

The actuator 1400 is shown to include an input connection 1416 and an output connection 1418. In some embodiments, the input connection 1416 and the output connection 1418 are located along the bottom 1408 of the actuator 1400. In other embodiments, the input connection 1416 and the output connection 1418 can be located along one or more other surfaces of housing 1402. The input connection 1416 can be configured to receive a control signal (e.g., a voltage input signal) from an external system or device. The actuator 1400 may use the control signal to determine an appropriate PWM DC output for the BLDC motor. In some embodiments, the control signal is received from a controller such as an AHU controller (e.g., AHU controller 330), an economizer controller, a supervisory controller (e.g., BMS controller 366), a zone controller, a field controller, an enterprise level controller, a motor controller, an equipment-level controller (e.g., an actuator controller) or any other type of controller that can be used in a HVAC system or BMS.

In some embodiments, the control signal is a DC voltage signal. The actuator 1400 can be a linear proportional actuator configured to control the position of the drive device 1410 according to the value of the DC voltage received at input connection 1416. For example, a minimum input voltage (e.g., 0.0 VDC) may correspond to a minimum rotational position of drive device 1410 (e.g., 0 degrees, −5 degrees, etc.), whereas a maximum input voltage (e.g., 10.0 VDC) may correspond to a maximum rotational position of the drive device 1410 (e.g., 90 degrees, 95 degrees, etc.). Input voltages between the minimum and maximum input voltages may cause the actuator 1400 to move the drive device 1410 into an intermediate position between the minimum rotational position and the maximum rotational position. In other embodiments, the actuator 1400 can be a non-linear actuator or may use different input voltage ranges or a different type of input signal (e.g., AC voltage or current) to control the position and/or rotational speed of the drive device 1410.

In some embodiments, the control signal is an AC voltage signal. The input connection 1416 can be configured to receive an AC voltage signal having a standard power line voltage (e.g., 120 VAC or 230 VAC at 50/60 Hz). The frequency of the voltage signal can be modulated (e.g., by a controller for actuator 1400) to adjust the rotational position and/or speed of the drive device 1410. In some embodiments, the actuator 1400 uses the voltage signal to power various components of actuator 1400. The actuator 1400 may use the AC voltage signal received via the input connection 1416 as a control signal, a source of electric power, or both. In some embodiments, the voltage signal is received at the input connection 1416 from a power supply line that provides the actuator 1400 with an AC voltage having a constant or substantially constant frequency (e.g., 120 VAC or 230 VAC at 50 Hz or 60 Hz). The input connection 1420 may include one or more data connections (separate from the power supply line) through which the actuator 1400 receives control signals from a controller or another actuator (e.g., 0-10 VDC control signals).

In some embodiments, the control signal is received at the input connection 1416 from another actuator. For example, if multiple actuators are interconnected in a tandem arrangement, the input connection 1416 can be connected (e.g., via a communications bus) to the output data connection of another actuator. One of the actuators can be arranged as a master actuator with its input connection 1416 connected to a controller, whereas the other actuators can be arranged as slave actuators with their respective input connections connected to the output connection 1418 of the master actuator.

The output connection 1418 can be configured to provide a feedback signal to a controller of the HVAC system or BMS, in which the actuator 1400 is implemented (e.g., an AHU controller, an economizer controller, a supervisory controller, a zone controller, a field controller, an enterprise level controller, etc.). The feedback signal may indicate the rotational position and/or speed of actuator 1400. In some embodiments, the output connection 1418 can be configured to provide a control signal to another actuator (e.g., a slave actuator) arranged in tandem with the actuator 1400. The input connection 1416 and the output connection 1418 can be connected to the controller or the other actuator via a communications bus.

Figure 15:
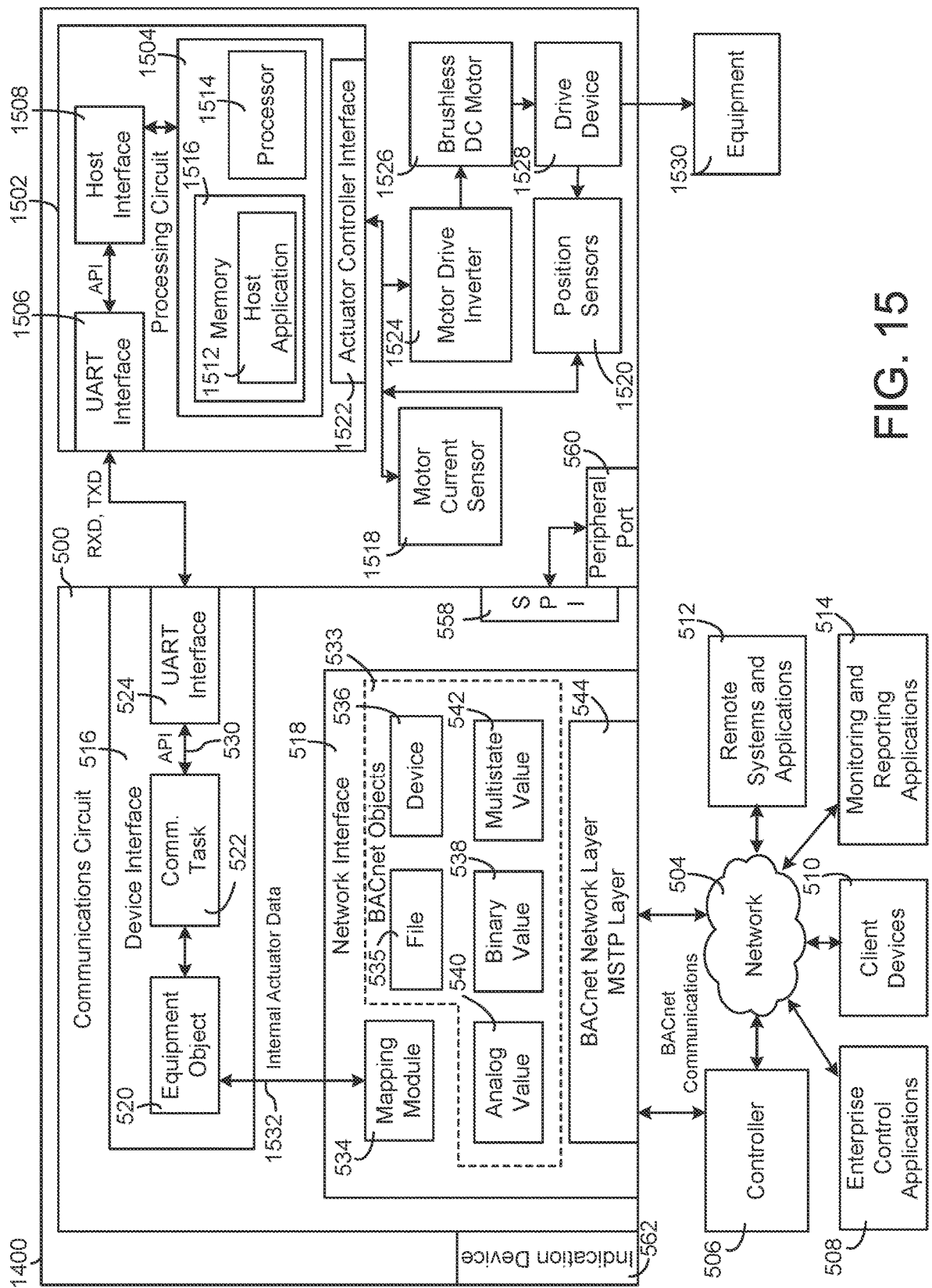
FIG. 15 is a block diagram illustrating a communication circuit in communication with the actuator of FIG. 14, according to some embodiments.

In some embodiments, the input connection 1416 and the output connection 1418 can be replaced or supplemented by a communications circuit, such as communications circuit 500 described above in FIG. 5A. The communications circuit 500 may be configured to support a variety of data communications between the actuator 1400 and external systems or devices. Turning now to FIG. 15, a block diagram illustrating the communications circuit 500 for use with the actuator 1400 is shown, according to some embodiments. More specifically, the communications circuit 500 is used to support a variety of data communication between a controller 1502 of the actuator 1400, and one or more external systems or device. As described above, the communications circuit 500 can be a wired or wireless communications link and may use any of a variety of disparate communications protocols (e.g., BACnet, LON, WiFi, Bluetooth, NFC, TCP/IP, etc.). In some embodiments, the communications circuit 500 is an integrated circuit, chip, or microcontroller unit (MCU) configured to bridge communications between the actuator 1400 and external systems or devices. As shown in FIG. 15, the communications circuit 500 is shown as integrated with the actuator 1400. However, in some embodiments, the communications circuit 500 may be a separate device from the actuator 1400.

As described above, the communications circuit 500 can be configured to support a variety of data communications between the controller 1502 of the actuator 1400 and external systems or devices (e.g., the network 504, the controller 506, one or more enterprise control applications 508, one or more client devices 510, one or more remote systems and/or applications 512, and/or one or more monitoring and reporting applications 514). The communication link 546 of the communications circuit 500 can be a wired or wireless communications link and may use any of a variety of disparate communications protocols as described above (e.g., BACnet, LON, WiFi, Bluetooth, NFC, TCP/IP, etc.). In some embodiments, the communications circuit 500 is an integrated circuit, chip, or microcontroller unit (MCU) separate from a processing circuit 1504 of the actuator 1400 and configured to bridge communications between the controller 1502 and the one or more external systems or devices described above.

In some embodiments, the communications circuit 500 is the Johnson Controls BACnet on a Chip (JBOC) product, as described above. For example, the communications circuit 500 can be a pre-certified BACnet communication circuit capable of communicating on a building automation and controls network (BACnet) using a master/slave token passing (MSTP) protocol. In other words, the communications circuit 500 provides a network interface 518 for the actuator 1400.

As described above, the communications circuit 500 includes a device interface 516 and a network interface 518. In one embodiment, the network interface 518 is a BACnet interface for providing a BACnet interface for the actuator 1400. The device interface 516 is shown to include an equipment object 520, a communications task module 522 (e.g., a JBOC task), and a universal asynchronous receiver/transmitter (UART) interface 524. The UART interface 524 may be configured to communicate with a corresponding UART interface 1506 of the actuator controller 1502 using a UART protocol. In other embodiments, UART interfaces 524, 1506 can be replaced with serial peripheral interfaces (SPI) or inter-integrated circuit (I2C) interfaces.

The communication task module 522 can be connected to the UART interface 524 via an application-program interface (API) 530 and can be configured to populate equipment object 520 with values received from the processing circuit 1504 via the UART interfaces 524, 1506. The communication task module 522 can also read values of the equipment object 520 set by the network interface 518, and can provide the values to processing circuit 1504. Similarly, the UART interface 1506 can be connected to a host interface 1508 via an API 1510 and can be configured to communicate with a host application 1512 within the processing circuit 1504.

The processing circuit 1504 may include a processor 1514 and a memory 1516. The processor 1514 may be a general purpose or specific purpose processor, an application specific integrated circuit (ASIC), one or more field programmable gate arrays (FPGAs), a group of processing components, or other suitable processing components. The processor 1514 is configured to execute computer code or instructions stored in the memory 1516 or received from other computer readable media (e.g., CDROM, network storage, a remote server, etc.).

The memory 1516 may include one or more devices (e.g., memory units, memory devices, storage devices, etc.) for storing data and/or computer code for completing and/or facilitating the various processes described in the present disclosure. The memory 1516 may include random access memory (RAM), read-only memory (ROM), hard drive storage, temporary storage, non-volatile memory, flash memory, optical memory, or any other suitable memory for storing software objects and/or computer instructions. The memory 1516 may include database components, object code components, script components, or any other type of information structure for supporting the various activities and information structures described in the present disclosure. The memory 1516 may be communicably connected to the processor 1514 via the processing circuit 1504 and may include computer code for executing (e.g., by the processor) one or more processes described herein. When the processor 1514 executes instructions stored in the memory 1516, the processor 1514 generally configures the actuator controller 1502 (and more particularly the processing circuit 1504) to complete such activities.

In one embodiment, the memory 1516 stores the host application 1512. The host application 1512 can include the required application for operating the actuator 1400. In one embodiment, the host application 1512 can generate updated values for the attributes of the equipment object 520, which can be communicated to the device interface 516 via the UART interfaces 524, 1506, as described above. The host application 1512 can include software to read and store data received by the actuator controller 1502. For example, the actuator controller 1502 may include sensors for detecting various attributes of the actuator 1400. Example sensors can include a motor current sensor 1518, one or more position sensors 1520, as well as other sensors such as temperature sensors, voltage sensors, etc. The host application 1512 may read the data via an actuator controller interface 1522, and subsequently store the data from these sensors within the memory 1516. Further, the host controller 1502 may include other data such as setpoints, position commands, diagnostic data, etc., which the host application 1512 can further read and store in the memory 1516. In a further embodiment, the host application 1512 can control the actuator 1400 by outputting values to the individual components of the actuator 1400. For example, the host application 1512 can send a command signal to a motor drive inverter 1524 via the actuator controller interface 1522. In one embodiment, the command signal provides a direction to command a brushless DC motor 1526. The brushless DC motor can then drive a drive device 1528, as described above, which in turn actuates one or more pieces of equipment 1530. In one example, the equipment 1530 may be a valve. In some embodiments, the position sensor 1520 can determine a position of the drive device 1528 and provide the position information to the host application 1512 via the actuator controller interface 1522. In some embodiments, the position sensor 1520 may detect a position of the equipment 1530, and provide the position information to the host application 1512 via the actuator controller interface 1522.

The host application 1512 can further receive data and/or commands for controlling the actuator controller 1502. In one embodiment, the host interface 1508 may receive data via the UART interface 1506, and communicate the data to the host application 1512. For example, the actuator controller 1502 may communicate with the communications circuit 500 and change a setpoint within the analog value BACnet object 540. The network interface 518 can then modify the corresponding attribute in the equipment object 520, which can then be communicated to the host device via the UART interfaces 524, 1506. The host interface 1508 can then receive the data via the host API 1510. The host interface 1508 may be configured to convert the received data (e.g. the setpoint change) into a format compatible with the host application 1512. The host application 1512, receiving the data (setpoint change) can then implement the setpoint change on the actuator controller 1502. In one embodiment, the host application 1512 can control components of the actuator 1400, such as the motor drive inverter 1524, via the actuator controller interface 1522. In some embodiments, the host application 1512 may receive inputs or commands directly from a user interface (not shown) of the actuator controller 1502. The host application 1512 can then update any changes provided via the user interface in the equipment object 520 by communicating the changes to the host interface 1508. The host interface 1508 may then communicate the changes to the equipment object 520 via the UART interfaces 524, 1506.

As described above, the equipment object 520 can be a proprietary equipment object configured to expose internal actuator data 1532 to the network interface 518. Attributes of equipment object 520 can be defined by a user (e.g., using a data definition tool) to expose any type of internal actuator data 1532 to the network interface 518. For example, attributes of equipment object 520 can include the sensed motor current, end stop locations, actuator status, stroke length, actuator position, setpoints, and/or any other type of variable or parameter used or stored internally by actuator 1400.

The host application 1512 can generate updated values for the attributes of the equipment object 520, which can be communicated to the device interface 516 via the UART interfaces 524, 1506. The attributes of the equipment object 520 can be read by the network interface 518 and communicated to the actuator controller 1502 as standard BACnet objects 533. As described above, the BACnet objects may include the file object 535, the device object 536, the analog value object 540, the binary value object 538, and the multistate value object 542. The BACnet objects 533 can be mapped to corresponding attributes of the equipment object 520 by the mapping module 534 to expose such attributes as standard BACnet objects, as described above, and further illustrated in FIGS. 16-18, below.

Still referring to FIG. 15, the network interface 518 is shown to include the BACnet/MSTP layer 544. The BACnet/MSTP layer 544 can be configured to interface with BACnet objects 533 and the external communications network 504 (e.g., a BACnet network). In some embodiments, the BACnet/MSTP layer 544 communicates directly with the controller 506. the BACnet/MSTP layer 544 can be configured to facilitate BACnet communications using the MSTP Master protocol. For example, the BACnet/MSTP layer 544 can be configured to transmit and receive segmented messages and automatically determine a baud rate. The BACnet/MSTP layer 544 may support duplicate address avoidance by keeping a second device with a duplicate address from interfering with existing traffic. In other embodiments, the BACnet/MSTP layer 544 may use other types of communications protocols such as TCP/IP, Ethernet, WiFi, Zigbee, NFC, etc.

The BACnet/MSTP layer 544 can be configured to read and write values to the BACnet objects 533. For example, the BACnet/MSTP layer 544 may receive a position setpoint from the controller 506 and update an instance of the analog value object 540 with the position setpoint. The network interface 1604 can be configured to write the values of BACnet objects 533 to attributes of equipment object 520, as will be shown in more detail below. The attribute values of equipment object 520 can be communicated to the processing circuit 1504 via the UART interfaces 524, 1506 and used by the processing circuit 1504 to operate the actuator 1500. Similarly, the internal actuator data 1532 generated by the processing circuit 1504 can be written to the equipment object 520, mapped to BACnet objects 533, and read by the BACnet/MSTP layer 544. The BACnet/MSTP layer 544 can send the values of BACnet objects 533 to the controller 506, the network 504, the one or more client devices 510, the remote systems and applications 512, the enterprise control applications 508, and/or the monitoring and reporting applications 514.

Figure 16:
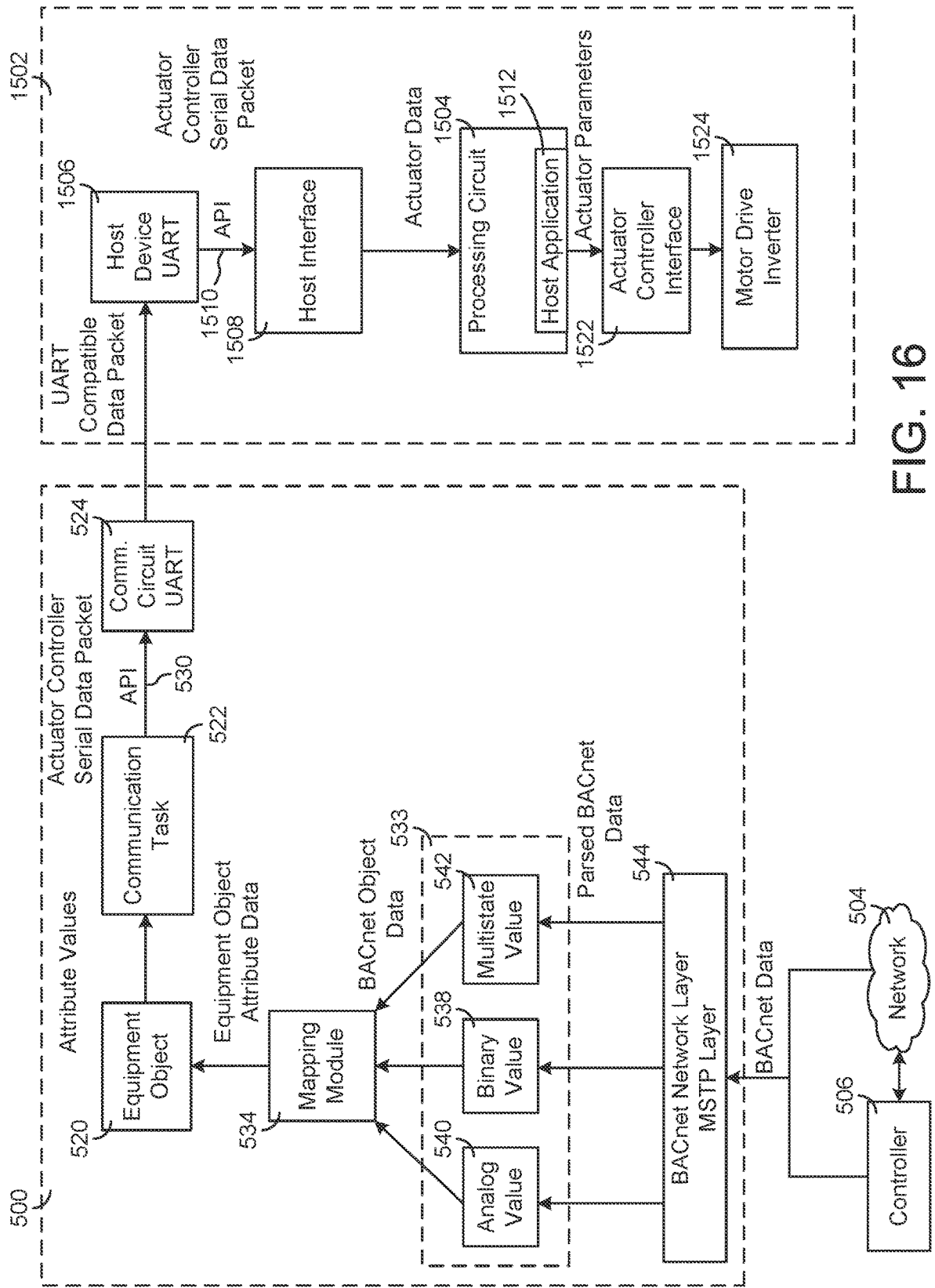
FIG. 16 is a block diagram illustrating the flow of data from an external network to the communication circuit of FIG. 15, according to some embodiments.

Referring now to FIG. 16, a block diagram illustrating the flow of data from the network 504 and/or the controller 506 to the actuator controller 1502 is shown, according to some embodiments. As shown in FIG. 16, network 504 is a BACnet network; however, other networks are contemplated. The network 504 and/or the controller 506 may provide BACnet data to the communications circuit 500. The BACnet data may be received by the BACnet/MSTP layer 544. The BACnet/MSTP layer 544 may parse the received BACnet data. In one example, the BACnet/MSTP layer 544 may parse the received BACnet data to isolated data associated with one or more BACnet Objects 533. For example, the BACnet/MSTP layer 544 may first parse the data based on data type (analog, binary, multistate, etc.). The BACnet/MSTP layer 544 may then evaluate an ID associated with the BACnet data to determine what BACnet object is associated with the received BACnet data. The BACnet/MSTP layer 544 may then transmit the parsed BACnet data to one or more BACnet objects 533 via the network interface. For example, the BACnet/MSTP layer 544 may transmit parsed analog BACnet data to the analog BACnet object 540, parsed binary BACnet data to the binary BACnet object 538, and parsed multistate BACnet data to the multistate BACnet object 542. This is exemplary only, as there may be more BACnet object types available as described above. Further, multiples of each BACnet object type may further be provided. In one embodiment, the BACnet/MSTP layer 544 can instruct the network interface to generate new BACnet objects when BACnet data is received that is not associated with an existing BACnet object 533. The BACnet objects 533 may then provide the associated BACnet Object data to the mapping module 534. The mapping module 534 may then receive the BACnet Object data by querying each of the BACnet objects to determine if a value had been updated. Alternatively, the BACnet objects may provide an interrupt, or other signal, to the mapping module 534 to instruct the mapping module 534 to read a new BACnet object 533 value. The mapping module 534 may then evaluate the received BACnet object data to determine which attribute of the equipment object 520 the received BACnet object data is associated with and transmit the data to the equipment object 520 as equipment object attribute data via the network interface 518. In one embodiment, the mapping module 534 transmits equipment object attribute data for each of the one or more BACnet objects 533 to the equipment object 520 where the equipment object attributes associated with the one or more BACnet objects are exposed to the network interface 518. Similarly, the mapping module 534 may only transmit equipment object attribute data to the equipment object 520 where the associated equipment object attribute is a writeable attribute. As will be described later, a user, via a configuration tool, can configure equipment object attributes that are exposed and/or writable.

The equipment object 520 may then transmit attribute values to the communication task module 522. The attribute values may contain the attribute ID, as well as the data type and value. Alternatively, the attribute values may only contain the value associated with the attribute. In some embodiment, the communication task module 522 reads the attribute values for the equipment object attributes, and determines if any values have been changed. The communication task module 522, receiving the equipment object attribute values, may then convert the attribute values into one or more actuator controller serial data packets. The actuator controller serial data packets may be configured such that the data packets are readable by the actuator 1400. The actuator controller data packets may then be read by the UART 524 and converted into a UART compatible serial data packet. In one example, the API 530, as described above, may be used to convert the host control serial data packets into UART compatible serial data packets. In other examples, the UART 524 may convert the attribute values into UART compatible serial data packets itself. The UART 524 may then transmit the UART compatible serial data packet containing the attribute values to the actuator 1400. The UART 1506 can receive the UART compatible serial data packet and convert the data back into actuator controller serial data packets, readable by the actuator 1500 controller. In one embodiment, the UART 1506 can perform the conversion. In other embodiments, the API 1510 may convert the UART compatible serial data packet into an actuator controller serial data packet. The actuator controller serial data packet may then be received by the host interface 1508. The host interface 1508 may then convert the host controller serial data packet into actuator data to be processed by the processing circuit 1504. The actuator data may be a proprietary data format used by the processing circuit 1504 of the actuator 1400. In other examples, the actuator data may be a standard data type used by the particular processing circuit 1504.

The processing circuit 1504 can then read the actuator data via the host application 1512. The host application 1512 allows the data to be parsed and executed. The host application 1512 may then output device parameters to the actuator controller interface 1522. The actuator controller interface 1522 can then communicate one or more device parameters to one or more actuator components. For example, the actuator controller interface 1522 can provide the device parameters to the motor drive inverter 1524. In one example, the device parameter may be a desired speed and/or direction for driving a motor coupled to the motor drive inverter 1524. Thus, a command or request may be generated by the network 504 and/or the controller 506 and executed at a component level of the actuator 1400 using the above embodiment.

Figure 17:
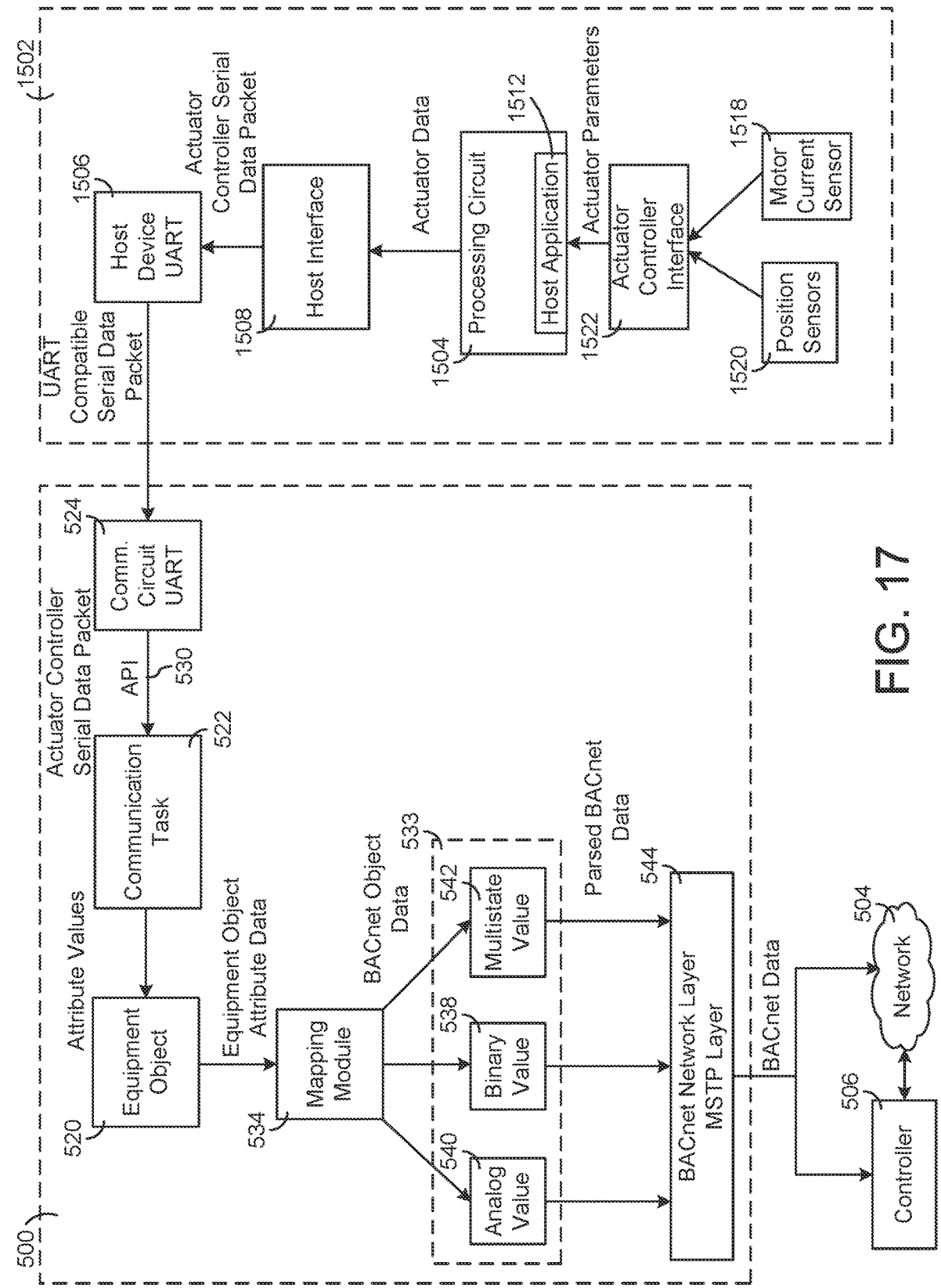
FIG. 17 is a block diagram illustrating the flow of data from the communication circuit of FIG. 15 to an external network, according to some embodiments.

Turning now to FIG. 17 a block diagram illustrating the flow of data from the actuator controller 1502 to the network 504 and/or the controller 506 is shown, according to some embodiments. Within the actuator 1400, one or more of the components may provide device parameters associated with one or more parameters of the components of the actuator 1400 to the processing circuit 1504 via the actuator controller interface 1522. Example components of the actuator 1400 may include the motor current sensor 1518 and the one or more position sensors 1520, as described above. However, additional components are contemplated. The device parameters can include parameters related to motor current, positions of the drive device 1528, or any other device parameters associated with the actuator 1400. The device parameters can be provided to the host application 1512 via the actuator controller interface 1522. The device parameters can be processed by the host application 1512 within the processing circuit 1504. In some embodiments the processing circuit 1504 may determine that the received device parameters may need to be provided to the network 504 and/or the controller 506. For example, the processing circuit 1504 may be configured to provide all updated parameters to the network 504 and/or the controller 506. In other examples, the processing circuit 1504 may be configured to provide device parameters to the network 504 and/or the controller 506 when the device parameters exceed a certain value. In still further examples, the processing circuit 1504 may provide the device parameters to the network 504 and/or the controller 506 at predetermined intervals or at predetermined times of the day. For example, the processing circuit 1504 may be configured to provide the device parameters to the network 504 and/or the controller 506 at 6 A.M., Noon, 6 P.M. and Midnight. However, the predetermined intervals or times may be any predetermined intervals or times provided by a user. Additionally, the processing circuit 1504 may be configured to provide the device parameters to the network 504 and/or controller 506 upon receiving an instruction to do so from the network 504 and/or the controller 506. This may be in conjunction with any of the other configurations described above. Further, the processing circuit 1504 may also provide additional data associated with the processing circuit 1504 itself, such as alarms, data logs, etc.

The processing circuit 1504 may provide actuator data containing data relating to the actuator 1400 (e.g. data associated with the processing circuit 1504 and/or the host device components 1518, 1520) to the host interface 1508. The host interface 1508 may be configured to receive the actuator data and convert the host device data received from the processing circuit 1504 into one or more actuator controller serial data packets for transmission to the communications circuit 500. The actuator controller serial data packets may then be provided to the actuator controller UART 1506, which may convert the actuator controller serial data packets into a UART compatible serial data packet. In one embodiment, UART 1506 may convert the actuator controller serial data packet into the UART compatible serial data packet. Alternatively, the API 1510 may be used to convert the actuator controller serial data packet into the UART compatible serial data packet. The UART serial data packet may then be transmitted to the UART 524 of the communications circuit 500. The UART 524 may then convert the UART serial data packet back into the actuator controller serial data packet. In one embodiment the UART 524 converts the UART serial data packet into the actuator controller serial data packet. In other embodiments, the API 530 converts the UART serial data packet into the actuator controller serial data packet.

The actuator controller serial data packet may then be received by the communication task module 522. The communication task module can read the actuator controller serial data packet and parse the actuator controller serial data packet to extract one or more attribute values. In one embodiment, the attribute values are values associated with the actuator 1400, such as the device parameters of the actuator components 1518, 1520, or values associated with the processing circuit 1504. The communication task module 522 may then output the attribute values to the respective attributes within the equipment object 520. In one embodiment, the communication task module 522 may determine which parsed values are associated with a given attribute of the equipment object 520 by reading an identifier associated with each portion of the received data, and map that to a corresponding attribute within the attribute value. In one example, a user can configure the equipment object attributes to relate to data received from the actuator 1400 by assigning certain data identifiers contained within the actuator controller serial data packet to a given equipment object attribute. As will be discussed in more detail below, the equipment object 520 can be configured using a configuration device.

The attribute values stored within the attributes of the equipment object 520 can be read by the mapping module 534. The mapping module 534 may determine if an attribute value has changed by constantly monitoring the equipment object 520. In other embodiments, the equipment object 520 may provide an interrupt signal to the mapping module 534, indicating that an attribute value has been updated. The mapping module 534 may then read the equipment object attribute data from the equipment object 520 and convert the equipment object attribute data in to BACnet object data. The mapping module 534 may further be configured to then transmit the updated BACnet Object Data to the appropriate BACnet object 533. In some instances, a BACnet object may not currently exist that is associated with a particular equipment object attribute. The mapping module 534 may then generate a new BACnet object via the network interface 518. In one embodiment, the mapping module 534 may already be configured to associate a given BACnet object 533 with an equipment object 520 attribute. In one embodiment, the mapping module 534 may read an attribute ID for each received equipment object attribute data to determine which BACnet object to map the received data to. In some embodiments, the equipment object 520 may be configured to not expose certain attributes to the mapping module 534. In those instances, the received attribute values are stored in the equipment object 520, but are not provided to the mapping module 534.

Once the BACnet objects 533 receive the BACnet object data, the BACnet/MSTP layer 544 can read the BACnet objects 533 to determine if any values have been modified. In one embodiment, the BACnet/MSTP layer 544 may constantly read all of the BACnet objects 533 to determine if any values have been changed. In other embodiment, one or more of the BACnet objects 533 may provide an interrupt signal to the BACnet/MSTP layer 544 to indicate a value has changed. The BACnet/MSTP layer 544 may then read one or more of the BACnet objects 533 to receive parsed BACnet object data from the BACnet objects 533. For example, if binary BACnet object 538 contained updated information, the BACnet/MSTP layer 544 may request and receive data only from the Binary BACnet object 538. The BACnet/MSTP layer 544 receiving the parsed BACnet object data may then convert the parsed BACnet object data into standard BACnet data, and transmit the BACnet data containing the data from the BMS device 503 to the network 504 and/or the controller 506.

Figure 18:
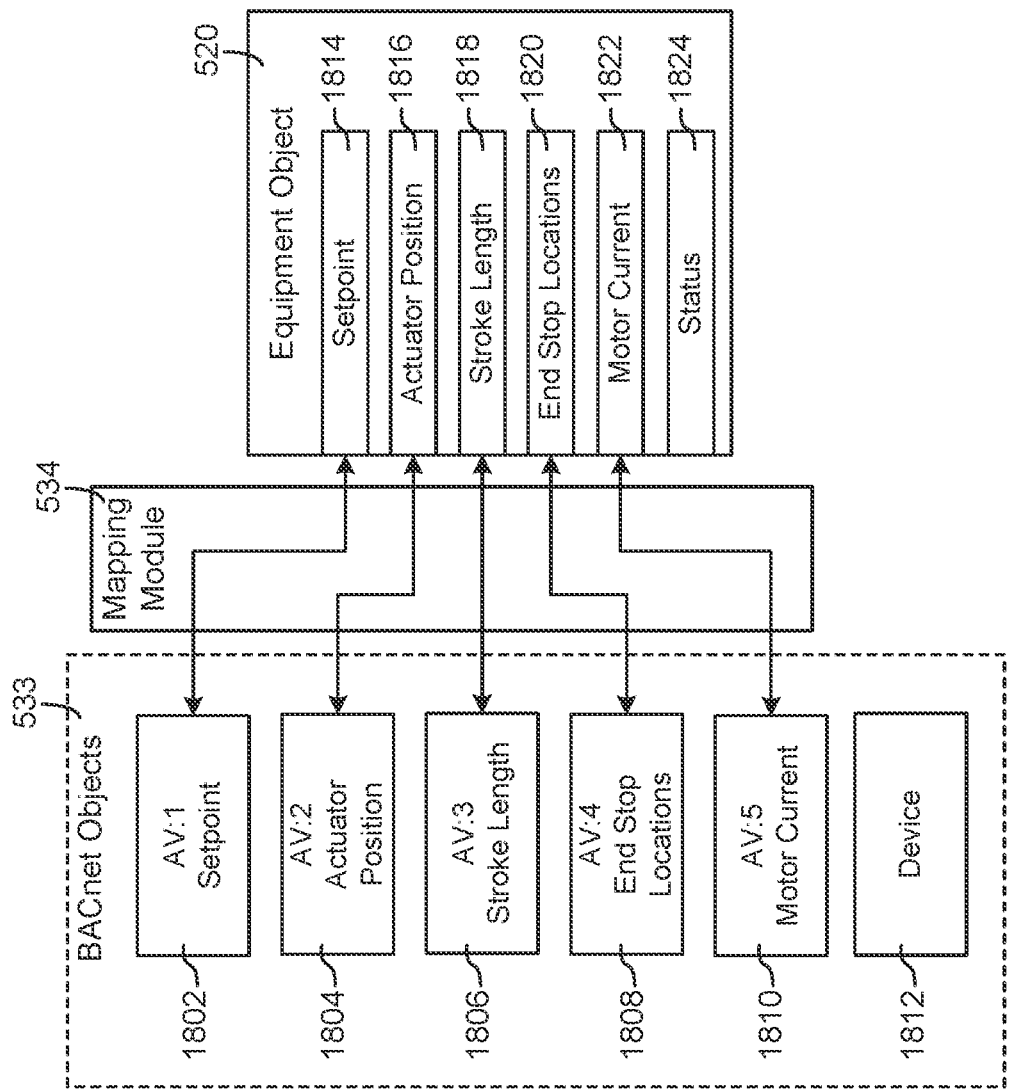
FIG. 18 is a block diagram illustrating a mapping between attributes of an equipment object associated with the actuator of FIG. 15 and a number of standard BACnet point objects, according to some embodiments.

Turning now to FIG. 18, a block diagram illustrating a mapping between attributes of equipment object 520 and standard BACnet point objects 533 is shown, according to some embodiments. The attributes of equipment object 520 can be defined by a user (e.g., using a data definition tool, or configuration tool as described below) and mapped to various types of internal actuator data 1532. For example, equipment object 520 is shown to include a setpoint attribute 1814, an actuator position attribute 1816, a stroke length attribute 1818, an end stop locations attribute 1820, a motor current attribute 1822, and a status attribute 1824. The processing circuit 1504 of the actuator 1400 can be configured to interface with the attributes of equipment object 520 in a more concise fashion than the standard BACnet point objects 533. For example, the processing circuit 550 can read and write various items of internal actuator data 1532 to equipment object 520 as values of attributes 1814, 1816, 1818, 1820, 1822, 1824. The equipment object 520 may expose the values of attributes 1814, 1816, 1818, 1820, 1822, 1824 to the network interface 518. The mapping module 534 may then map the exposed equipment object attributes 1814, 1816, 1818, 1820, 1822, 1824 to the respective BACnet objects 533.

As shown in FIG. 18, the standard BACnet objects are shown to include an analog value (AV) setpoint object 1802 mapped to setpoint attribute 1814, an AV actuator position object 1804 mapped to actuator position attribute 1816, an AV stroke length object 1806 mapped to stroke length attribute 1818, an AV end stop locations object 1808 mapped to end stop locations attribute 1820, an AV motor current object 1810 mapped to motor current attribute 1822, and a device object 1812. The status attribute 1824 is not shown mapped to a BACnet object. A user can choose to expose all or a subset of the attributes 1814, 1816, 1818, 1820, 1822, 1824 as standard BACnet point objects 533 by selectively mapping all or some of attributes 1814, 1816, 1818, 1820, 1822, 1824 to the BACnet objects 533. The BACnet/MSTP layer 544 can read the one or more BACnet objects 533 and provide the values of the BACnet objects 533 to the controller 506 and/or the network 504.

Example Implementation—Chiller

Figure 19:
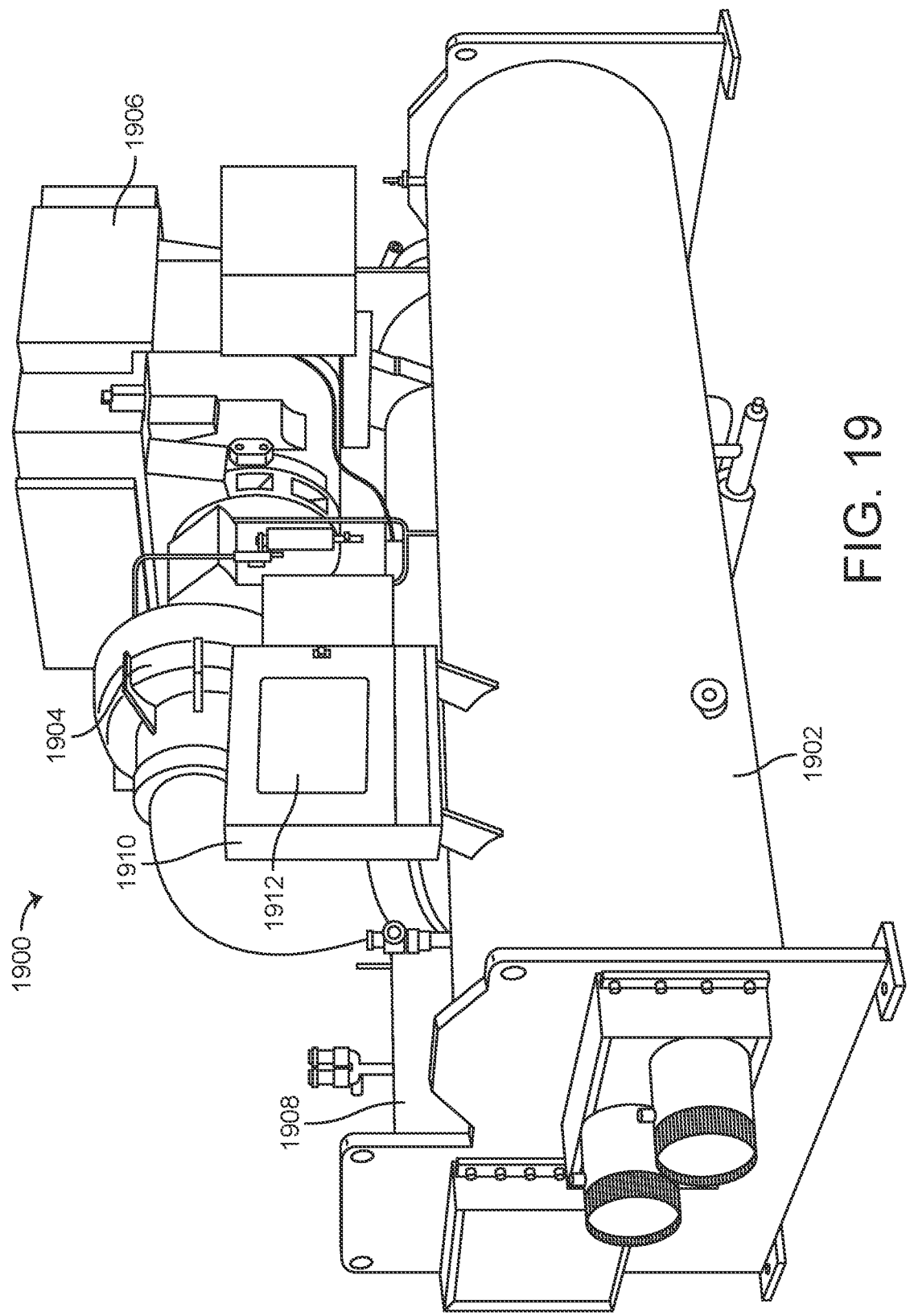
FIGS. 19-20 are drawings of a chiller for use in an HVAC system, according to some embodiments.
Figure 20:
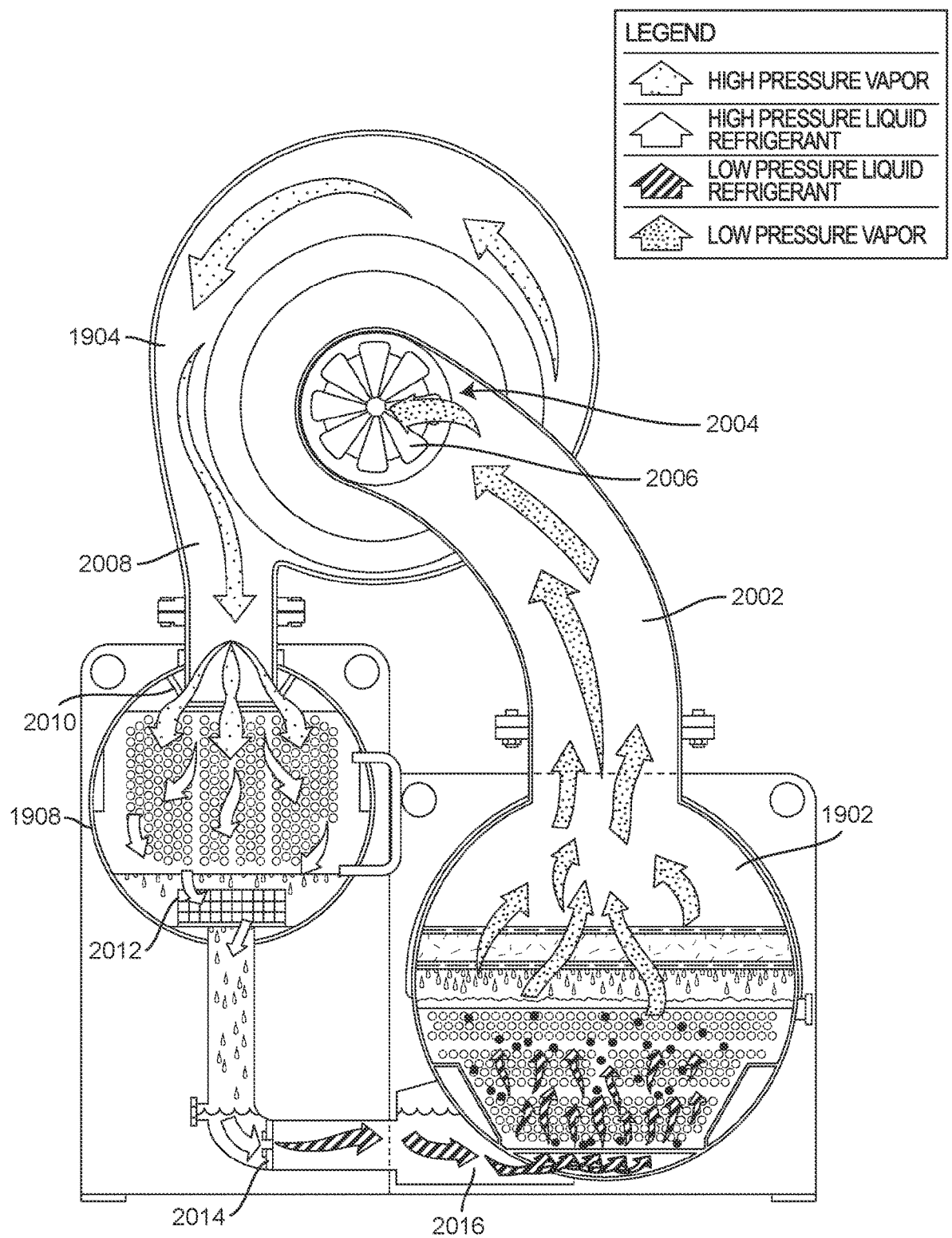

Referring now to FIGS. 19 and 20, an illustration of an exemplary chiller 1900 and its operation are shown, according to some embodiments. The chiller 1900 is shown to include an evaporator 1902, which provides a heat exchange between the fluid returned from the HVAC system and another fluid, such as a refrigerant. The refrigerant in the evaporator 1902 of the chiller 1900 removes heat from the chilled fluid during the evaporation process, thereby cooling the chilled fluid. The refrigerant absorbs heat from the chilled fluid and changes from a boiling liquid and vapor state to vapor inside the evaporator 1902. The chilled fluid is then circulated back to an air handling unit via piping, as illustrated in FIG. 1, for subsequent heat exchange with the load.

As shown in FIG. 20, suction at portion 2002 causes the refrigerant vapor to flow into compressor 1904 of chiller 1900 where the compressor 1904 has a rotating impeller 2004 (or another compressor mechanism such as a screw compressor, scroll compressor, reciprocating compressor, centrifugal compressor, etc.) that increases the pressure and temperature of the refrigerant vapor and discharges it into condenser 1908. The impeller 2004 is driven by motor 1906, which may have a variable speed drive (e.g. variable frequency drive). The variable speed drive can control the speed of the motor 1906 by varying the AC waveform provided to the motor. The impeller 2004 may further include, or be coupled to, an actuator that controls the position of pre-rotation vanes 2006 at the entrance to the impeller of compressor 1904.

Discharge at portion 2008 from compressor 1904 passes through the discharge baffle 2010 into condenser 1908 and through a sub-cooler 2012, controllably reducing the discharge back into liquid form. The liquid then passes through a flow control orifice 2014 and through oil cooler 2016 to return to evaporator 1902 to complete the cycle.

In the embodiment shown in FIG. 19, the chiller 1900 includes a controller 1910 coupled to an electronic display 1912 such as a touch screen at which settings for the chiller 1900 may be adjusted by a user. The controller 1910 can further include a processing circuit configured to adjust components of the chiller to meet, for example, pressure and temperature setpoints for the chilled fluid or refrigerant systems. For example, as a building's heating load changes, chiller components such as the pre-rotation vanes 2006 and the variable speed drive of motor 1906 may be adjusted to hold the building's temperature constant. If the building's heating load decreases (e.g., the building cools) and/or a desired temperature setpoint for the building increases (e.g., the building occupants are calling for less cooling), the variable speed drive can be slowed and/or the pre-rotation vanes 2006 are adjusted to decrease the flow of refrigerant though the compressor 1904.

Figure 21:
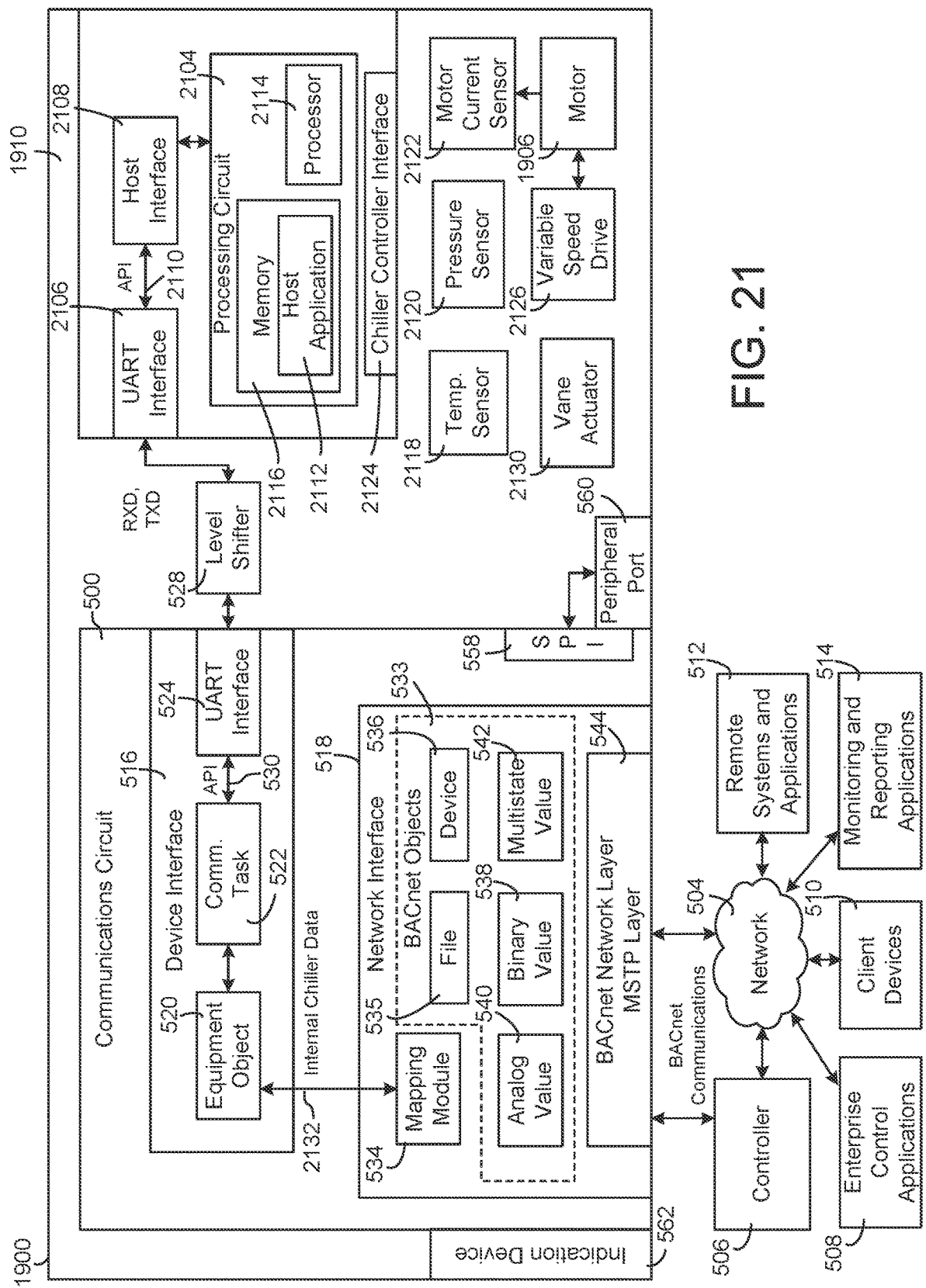
FIG. 21 is a block diagram illustrating a communication circuit in communication with the chiller of FIGS. 19-20, according to some embodiments.

Turning now to FIG. 21, a block diagram illustrating the communications circuit 500 for use with the chiller 1900 is shown, according to some embodiments. More specifically, the communications circuit 500 is used to support a variety of data communication between a controller 1910 of the chiller 1900, and one or more external systems or device. As described above, the communications circuit 500 can be a wired or wireless communications link and may use any of a variety of disparate communications protocols (e.g., BACnet, LON, WiFi, Bluetooth, NFC, TCP/IP, etc.). In some embodiments, the communications circuit 500 is an integrated circuit, chip, or microcontroller unit (MCU) configured to bridge communications between the chiller 1900 and other external systems or devices. As shown in FIG. 21, the communications circuit 500 is shown as integrated with the chiller 1900. However, in some embodiments, the communications circuit 500 may be a separate device from the chiller 1900.

As described above, the communications circuit 500 can be configured to support a variety of data communications between the controller 1910 of the chiller 1900 and other external systems or devices (e.g., the network 504, the controller 506, one or more enterprise control applications 508, one or more client devices 510, one or more remote systems and/or applications 512, and/or one or more monitoring and reporting applications 514). The communication link 546 of the communications circuit 500 can be a wired or wireless communications link and may use any of a variety of disparate communications protocols as described above (e.g., BACnet, LON, WiFi, Bluetooth, NFC, TCP/IP, etc.). In some embodiments, the communications circuit 500 is an integrated circuit, chip, or microcontroller unit (MCU) separate from a processing circuit 2104 of the chiller 1900 and configured to bridge communications between the controller 1910 and the one or more external systems or devices described above. In some embodiments, the communications circuit 500 is the Johnson Controls BACnet on a Chip (JBOC) product, as described above.

As described above, the communications circuit 500 includes a device interface 516 and a network interface 518. In one embodiment, the network interface 518 is a BACnet interface for providing a BACnet interface for the actuator 1400. The device interface 516 is shown to include an equipment object 520, a communications task module 522 (e.g., a JBOC task), and a universal asynchronous receiver/transmitter (UART) interface 524. The UART interface 524 may be configured to communicate with a corresponding UART interface 2106 of the processing circuit 2104 using a UART protocol. In other embodiments, UART interfaces 524, 2106 can be replaced with serial peripheral interfaces (SPI) or inter-integrated circuit (I2C) interfaces. In one example, the level shifter 528 may be positioned between the UART interface 524 and the UART interface 2106 to modify the signal levels transmitted between the UART interfaces 524, 2106 to ensure the signals are at a proper level to be received by both the communications circuit 500 and the chiller controller 1910.

The communication task module 522 can be connected to the UART interface 524 via an application-program interface (API) 530 and can be configured to populate equipment object 520 with values received from the processing circuit 2104 via the UART interfaces 524, 2106. The communication task module 522 can also read values of the equipment object 520 set by the network interface 518, and can provide the values to processing circuit 2104. Similarly, the UART interface 2106 can be connected to a host interface 2108 via an API 2110 and can be configured to communicate with a host application 2112 within the processing circuit 2104.

The processing circuit 2104 may include a processor 2114 and a memory 2116. The processor 2114 may be a general purpose or specific purpose processor, an application specific integrated circuit (ASIC), one or more field programmable gate arrays (FPGAs), a group of processing components, or other suitable processing components. The processor 2114 is configured to execute computer code or instructions stored in the memory 2116 or received from other computer readable media (e.g., CDROM, network storage, a remote server, etc.).

The memory 2116 may include one or more devices (e.g., memory units, memory devices, storage devices, etc.) for storing data and/or computer code for completing and/or facilitating the various processes described in the present disclosure. The memory 2116 may include random access memory (RAM), read-only memory (ROM), hard drive storage, temporary storage, non-volatile memory, flash memory, optical memory, or any other suitable memory for storing software objects and/or computer instructions. The memory 2116 may include database components, object code components, script components, or any other type of information structure for supporting the various activities and information structures described in the present disclosure. The memory 2116 may be communicably connected to the processor 2114 via the processing circuit 2104 and may include computer code for executing (e.g., by the processor) one or more processes described herein. When the processor 2114 executes instructions stored in the memory 2116, the processor 2114 generally configures the chiller controller 1910 (and more particularly the processing circuit 2104) to complete such activities.

In one embodiment, the memory 2116 stores the host application 2112. The host application 2112 can include the required application for operating the chiller 1900. In one embodiment, the host application 2112 can generate updated values for the attributes of the equipment object 520, which can be communicated to the device interface 516 via the UART interfaces 524, 2106, as described above. The host application 2112 can include software to read and store data received by the chiller controller 1910. For example, the chiller controller 1910 may include sensors for detecting various attributes of the chiller 1900. Example sensors can include one or more temperature sensors 2118, one or more pressure sensors 2120, one or more motor current sensors 2122, as well as other sensors such as, voltage sensors, flow sensors, etc. The host application 2112 may read the data via a chiller controller interface 2124, and subsequently store the data from these sensors within the memory 2116. Further, the chiller controller 1910 may include other data such as setpoints, position commands, diagnostic data, etc., which the host application 2112 can further read and store in the memory 2116. In a further embodiment, the host application 2112 can control the chiller 1900 by outputting values to the individual components of the chiller 1900. For example, the host application 2112 can send a command signal to a variable speed drive 2126 via the chiller controller interface 2124. In one embodiment, the command signal provides a speed command to the variable speed drive 2126. The variable speed drive 2126 can then output an AC voltage at a frequency associated with the provided speed command to the motor 1906. In further embodiments, the host application 2112 controls the chiller 1900 by sending a command signal to a vane actuator 2130. The command signal may provide a desired position of one or more pre-rotation vanes 2006. The vane actuator 2130 may receive the command signal and drive an output device to control a position of the one or more pre-rotation vanes 2006.

The host application 2112 can further receive data and/or commands for controlling the chiller controller 1910. In one embodiment, the host interface 2108 may receive data via the UART interface 2106, and communicate the data to the host application 2112. For example, the chiller controller 1910 may communicate with the communications circuit 500 and change a setpoint within the analog value BACnet object 540. The network interface 518 can then modify the corresponding attribute in the equipment object 520, which can then be communicated to the host device via the UART interfaces 524, 2106. The host interface 2108 can then receive the data via the host API 2110. The host interface 2108 may be configured to convert the received data (e.g. the setpoint change) into a format compatible with the host application 2112. The host application 2112, receiving the data (setpoint change) can then implement the setpoint change on the chiller controller 1910. In one embodiment, the host application 2112 can control components of the chiller 1900, such as the motor 1906 via the variable speed driver 2126, and the pre-rotation vanes 2006 via the vane actuators 2130. In some embodiments, the host application 2112 may receive inputs or commands directly from the user interface 1912 of the chiller controller 1910. The host application 2112 can then update any changes provided via the user interface in the equipment object 520 by communicating the changes to the host interface 2108. The host interface 2108 may then communicate the changes to the equipment object 520 via the UART interfaces 524, 2106.

As described above, the equipment object 520 can be a proprietary equipment object configured to expose internal chiller data 2132 to the network interface 518. Attributes of equipment object 520 can be defined by a user (e.g., using a data definition tool) to expose any type of internal chiller data 2132 to the network interface 518. For example, attributes of equipment object 520 can include the sensed motor current, end stop locations, actuator status, stroke length, actuator position, setpoints, and/or any other type of variable or parameter used or stored internally by chiller 1900.

The host application 2112 can generate updated values for the attributes of the equipment object 520, which can be communicated to the device interface 516 via the UART interfaces 524, 2106. The attributes of the equipment object 520 can be read by the network interface 518 and communicated to the network 504 as standard BACnet objects 533. As described above, the BACnet objects 533 may include the file object 535, the device object 536, the analog value object 540, the binary value object 538, and the multistate value object 542. The BACnet objects 533 can be mapped to corresponding attributes of the equipment object 520 by the mapping module 534 to expose such attributes as standard BACnet objects, as described above, and further illustrated in FIGS. 22-24, below.

Still referring to FIG. 21, the network interface 518 is shown to include the BACnet/MSTP layer 544. The BACnet/MSTP layer 544 can be configured to interface with BACnet objects 533 and the external communications network 504 (e.g., a BACnet network). In some embodiments, the BACnet/MSTP layer 544 communicates directly with the controller 506. The BACnet/MSTP layer 544 can be configured to facilitate BACnet communications using the MSTP Master protocol. For example, the BACnet/MSTP layer 544 can be configured to transmit and receive segmented messages and automatically determine a baud rate. The BACnet/MSTP layer 544 may support duplicate address avoidance by keeping a second device with a duplicate address from interfering with existing traffic. In other embodiments, the BACnet/MSTP layer 544 may use other types of communications protocols such as TCP/IP, Ethernet, WiFi, Zigbee, NFC, etc.

The BACnet/MSTP layer 544 can be configured to read and write values to the BACnet objects 533. For example, the BACnet/MSTP layer 544 may receive a position setpoint from the controller 506 and update an instance of the analog value object 540 with the position setpoint. The network interface 518 can be configured to write the values of BACnet objects 533 to attributes of equipment object 520, as will be shown in more detail below. The attribute values of equipment object 520 can be communicated to the processing circuit 2104 via the UART interfaces 524, 2106 and used by the processing circuit 2104 to operate the chiller 1900. Similarly, the internal chiller data 2132 generated by the processing circuit 2104 can be written to the equipment object 520, mapped to BACnet objects 533, and read by the BACnet/MSTP layer 544. The BACnet/MSTP layer 544 can send the values of BACnet objects 533 to the controller 506, the network 504, the one or more client devices 510, the remote systems and applications 512, the enterprise control applications 508, and/or the monitoring and reporting applications 514.

Figure 22:
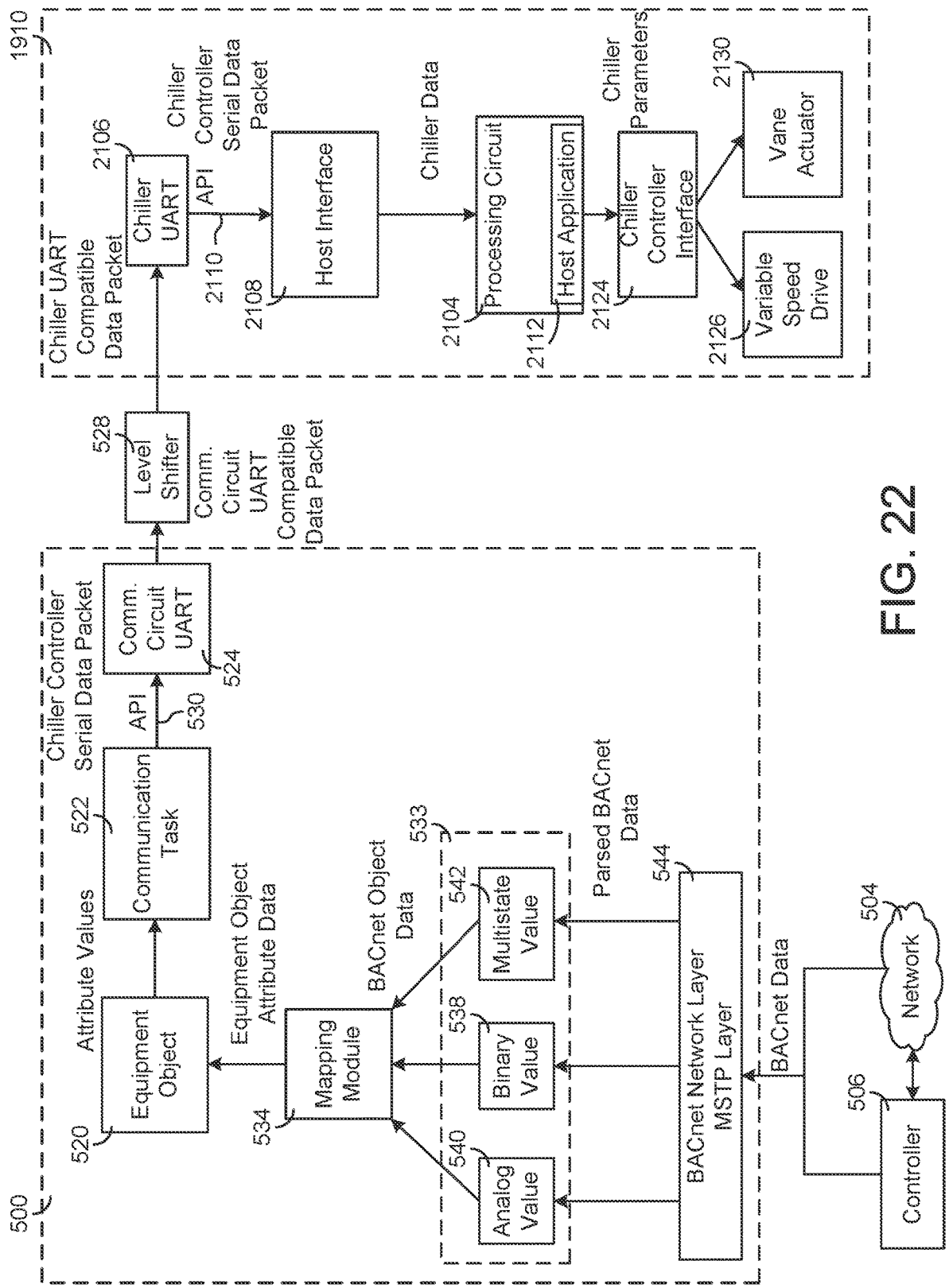
FIG. 22 is a block diagram illustrating the flow of data from an external network to the communication circuit of FIG. 21, according to some embodiments.

Referring now to FIG. 22, a block diagram illustrating the flow of data from the network 504 and/or the controller 506 to the chiller 1900 is shown, according to some embodiments. As shown in FIG. 22, network 504 is a BACnet network; however, other networks are contemplated. The network 504 and/or the controller 506 may provide BACnet data to the communications circuit 500. The BACnet data may be received by the BACnet/MSTP layer 544. The BACnet/MSTP layer 544 may parse the received BACnet data. In one example, the BACnet/MSTP layer 544 may parse the received BACnet data to isolated data associated with one or more BACnet Objects 533. For example, the BACnet/MSTP layer 544 may first parse the data based on data type (analog, binary, multistate, etc.). The BACnet/MSTP layer 544 may then evaluate an ID associated with the BACnet data to determine what BACnet object is associated with the received BACnet data. The BACnet/MSTP layer 544 may then transmit the parsed BACnet data to one or more BACnet objects 533 via the network interface. For example, the BACnet/MSTP layer 544 may transmit parsed analog BACnet data to the analog BACnet object 540, parsed binary BACnet data to the binary BACnet object 538, and parsed multistate BACnet data to the multistate BACnet object 542. This is exemplary only, as there may be more BACnet object types available as described above. Further, multiples of each BACnet object type may further be provided. In one embodiment, the BACnet/MSTP layer 544 can instruct the network interface to generate new BACnet objects when BACnet data is received that is not associated with an existing BACnet object 533. The BACnet objects 533 may then provide the associated BACnet Object data to the mapping module 534. The mapping module 534 may then receive the BACnet Object data by querying each of the BACnet objects to determine if a value had been updated. Alternatively, the BACnet objects may provide an interrupt, or other signal, to the mapping module 534 to instruct the mapping module 534 to read a new BACnet object 533 value. The mapping module 534 may then evaluate the received BACnet object data to determine which attribute of the equipment object 520 the received BACnet object data is associated with and transmit the data to the equipment object 520 as equipment object attribute data via the network interface 518. In one embodiment, the mapping module 534 transmits equipment object attribute data for each of the one or more BACnet objects 533 to the equipment object 520 where the equipment object attributes associated with the one or more BACnet objects are exposed to the network interface 518. Similarly, the mapping module 534 may only transmit equipment object attribute data to the equipment object 520 where the associated equipment object attribute is a writeable attribute. As will be described later, a user, via a configuration tool, can configure equipment object attributes that are exposed and/or writable.

The equipment object 520 may then transmit attribute values to the communication task module 522. The attribute values may contain the attribute ID, as well as the data type and value. Alternatively, the attribute values may only contain the value associated with the attribute. In some embodiment, the communication task module 522 reads the attribute values for the equipment object attributes, and determines if any values have been changed. The communication task module 522, receiving the equipment object attribute values, may then convert the attribute values into one or more chiller controller serial data packets. The chiller controller serial data packets may be configured such that the data packets are readable by the chiller 1900. The actuator controller data packets may then be read by the UART 524 and converted into a communication circuit UART compatible serial data packet. In one example, the API 530, as described above, may be used to convert the host control serial data packets into communication circuit UART compatible serial data packets. In other examples, the UART 524 may convert the attribute values into UART compatible serial data packets itself. The UART 524 may then transmit the communication circuit UART compatible serial data packet containing the attribute values to the chiller UART 2106 via the level shifter 528. The level shifter 528 can convert the communications circuit UART compatible serial data packet into a chiller UART compatible serial data packet, which can be received by the chiller UART 2106. In some examples, the communications circuit UART can transmit the communications circuit UART compatible serial data packet directly to the chiller UART 2106 where the communication circuit UART 524 and the chiller UART 2106 use the same serial data packet signal levels. The chiller UART 2106 can receive the chiller UART compatible serial data packet and convert the data back into chiller controller serial data packets, readable by the chiller controller 1910. In one embodiment, the UART 2106 can perform the conversion. In other embodiments, the API 2110 may convert the UART compatible serial data packet into an actuator controller serial data packet. The actuator controller serial data packet may then be received by the host interface 2108. The host interface 2108 may then convert the chiller controller serial data packet into chiller data to be processed by the processing circuit 2104. The chiller data may be a proprietary data format used by the processing circuit 2104 of the chiller 1900. In other examples, the chiller data may be a standard data type used by the particular processing circuit 2104.

The processing circuit 2104 can then read the chiller data via the host application 2112. The host application 2112 allows the data to be parsed and executed. The host application 2112 may then output device parameters to the chiller controller interface 2124. The chiller controller interface 2124 can then communicate one or more device parameters to one or more chiller components. For example, the chiller controller interface 2124 can provide the device parameters to the variable speed drive 2126 and/or the vane actuator 2130. In one example, the device parameter may be a desired speed and/or direction for driving the motor 1906 coupled to the variable speed drive 2126. In another example, the device parameter may be a desired position of a pre-rotation vane 2006 coupled to the vane actuator 2130. Thus, a command or request may be generated by the network 504 and/or the controller 506 and executed at a component level of the chiller 1900 using the above embodiment.

Figure 23:
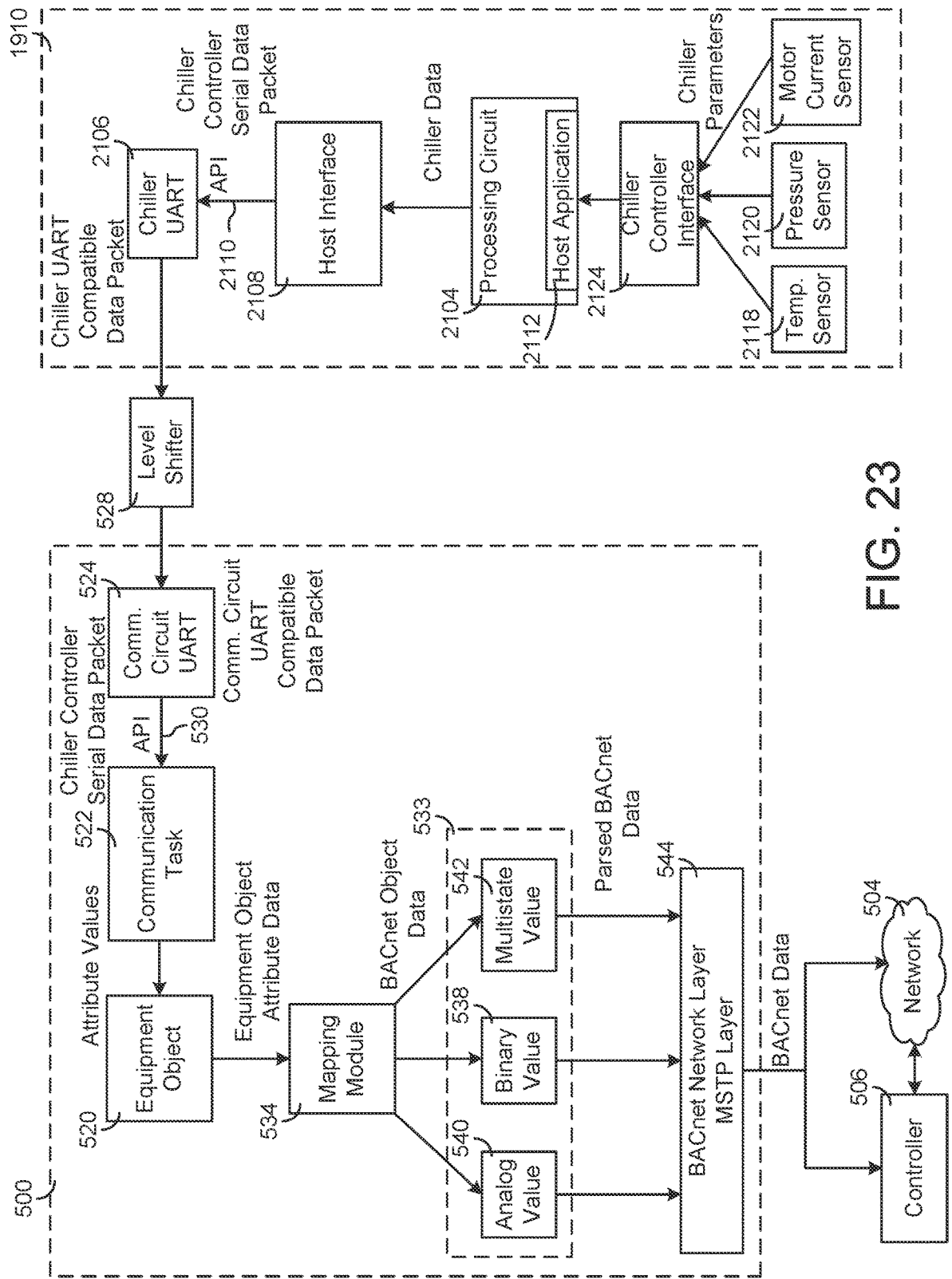
FIG. 23 is a block diagram illustrating the flow of data from the communication circuit of FIG. 21 to an external network, according to some embodiments.

Turning now to FIG. 23, a block diagram illustrating the flow of data from the chiller controller 1910 to the network 504 and/or the controller 506 is shown, according to some embodiments. Within the chiller 1900, one or more of the components may provide device parameters associated with one or more parameters of the components of the chiller 1900. The device parameters may be provided to the processing circuit 2104 via the chiller controller interface 2124. Example components of the chiller 1900 may include the motor current sensor 2122, the pressure sensor 2120, and the temp sensors 2118, as described above. However, additional components are contemplated. The device parameters can include parameters related to motor current, pressure within the chiller, water temperature, or any other device parameters associated with the chiller 1900. The device parameters can be provided to the host application 2112 via the chiller controller interface 2124. The device parameters can be processed by the host application 2112 within the processing circuit 2104. In some embodiments the processing circuit 2104 may determine that the received device parameters may need to be provided to the network 504 and/or the controller 506. For example, the processing circuit 2104 may be configured to provide all updated parameters to the network 504 and/or the controller 506. In other examples, the processing circuit 2104 may be configured to provide device parameters to the network 504 and/or the controller 506 when the device parameters exceed a certain value. In still further examples, the processing circuit 2104 may provide the device parameters to the network 504 and/or the controller 506 at predetermined intervals or at predetermined times of the day. For example, the processing circuit 2104 may be configured to provide the device parameters to the network 504 and/or the controller 506 at 6 A.M., Noon, 6 P.M. and Midnight. However, the predetermined intervals or times may be any predetermined intervals or times provided by a user. Additionally, the processing circuit 2104 may be configured to provide the device parameters to the network 504 and/or controller 506 upon receiving an instruction to do so from the network 504 and/or the controller 506. This may be in conjunction with any of the other configurations described above. Further, the processing circuit 2104 may also provide additional data associated with the processing circuit 2104 itself, such as alarms, data logs, etc.

The processing circuit 2104 may provide chiller data containing data relating to the chiller 1900 (e.g. data associated with the processing circuit 2104 and/or the chiller components 2118, 2120, 2122) to the host interface 2108. The host interface 2108 may be configured to receive the actuator data and convert the host device data received from the processing circuit 2104 into one or more chiller controller serial data packets for transmission to the communications circuit 500. The chiller controller serial data packets may then be provided to the chiller controller UART 2106, which may convert the chiller controller serial data packets into a chiller UART compatible serial data packet. In one embodiment, UART 2106 may convert the chiller controller serial data packet into the chiller UART compatible serial data packet. Alternatively, the API 2110 may be used to convert the chiller controller serial data packet into the chiller UART compatible serial data packet. The chiller UART compatible serial data packet may then be transmitted to the UART 524 of the communications circuit 500. In one embodiment, the level shifter 528 converts the chiller UART compatible serial data packet into a communications circuit UART compatible serial data packet. In other embodiments, the chiller UART 2106 can transmit the chiller UART compatible serial data packet directly to the communications circuit UART 524 where the communication circuit UART 524 and the chiller UART 2106 use the same serial data packet signal levels. The communication circuit UART 524 may then convert the communication circuit UART compatible serial data packet back into the chiller controller serial data packet. In one embodiment the communications circuit UART 524 converts the communication circuit UART compatible serial data packet into the chiller controller serial data packet. In other embodiments, the API 530 converts the communications circuit UART compatible serial data packet into the chiller controller serial data packet.

The chiller controller serial data packet may then be received by the communication task module 522. The communication task module 522 can read the chiller controller serial data packet and parse the chiller controller serial data packet to extract one or more attribute values. In one embodiment, the attribute values are values associated with the chiller 1900, such as the device parameters of the chiller components 2118, 2120, 2122, or values associated with the processing circuit 2104. The communication task module 522 may then output the attribute values to the respective attributes within the equipment object 520. In one embodiment, the communication task module 522 may determine which parsed values are associated with a given attribute of the equipment object 520 by reading an identifier associated with each portion of the received data, and map that to a corresponding attribute within the attribute value. In one example, a user can configure the equipment object attributes to relate to data received from the chiller 1900 by assigning certain data identifiers contained within the actuator controller serial data packet to a given equipment object attribute. As will be discussed in more detail below, the equipment object 520 can be configured using a configuration device and/or tool.

The attribute values stored within the attributes of the equipment object 520 can be read by the mapping module 534. The mapping module 534 may determine if an attribute value has changed by constantly monitoring the equipment object 520. In other embodiments, the equipment object 520 may provide an interrupt signal to the mapping module 534, indicating that an attribute value has been updated. The mapping module 534 may then read the equipment object attribute data from the equipment object 520 and convert the equipment object attribute data in to BACnet object data. The mapping module 534 may further be configured to then transmit the updated BACnet Object Data to the appropriate BACnet object 533. In some instances, an BACnet object may not current exist that is associated with a particular equipment object attribute. The mapping module 534 may then generate a new BACnet object via the network interface 518. In one embodiment, the mapping module 534 may already be configured to associate a given BACnet object 533 with an equipment object 520 attribute. In one embodiment, the mapping module 534 may read an attribute ID for each received equipment object attribute data to determine which BACnet object to map the received data to. In some embodiments, the equipment object 520 may be configured to not expose certain attributes to the mapping module 534. In those instances, the received attribute values are stored in the equipment object 520, but are not provided to the mapping module 534.

Once the BACnet objects 533 receive the BACnet object data, the BACnet/MSTP layer 544 can read the BACnet objects 533 to determine if any values have been modified. In one embodiment, the BACnet/MSTP layer 544 may constantly read all of the BACnet objects 533 to determine if any values have been changed. In other embodiment, one or more of the BACnet objects 533 may provide an interrupt signal to the BACnet/MSTP layer 544 to indicate a value has changed. The BACnet/MSTP layer 544 may then read one or more of the BACnet objects 533 to receive parsed BACnet object data from the BACnet objects 533. For example, if binary BACnet object 538 contained updated information, the BACnet/MSTP layer 544 may request and receive data only from the Binary BACnet object 538. The BACnet/MSTP layer 544 receiving the parsed BACnet object data may then convert the parsed BACnet object data into standard BACnet data, and transmit the BACnet data containing the data from the BMS device 503 to the network 504 and/or the controller 506.

Figure 24:
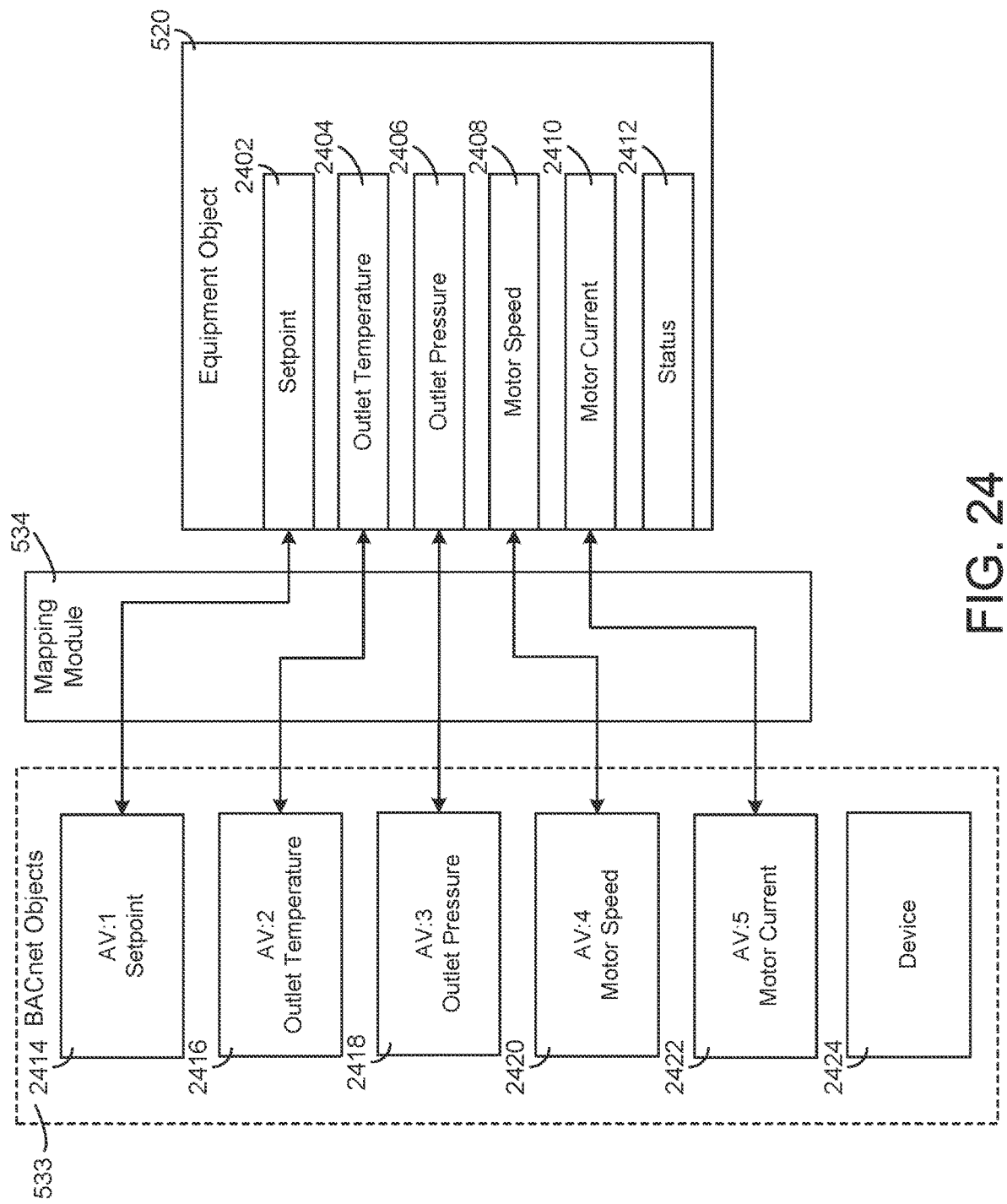
FIG. 24 is a block diagram illustrating a mapping between attributes of an equipment object associated with the chiller of FIGS. 19-20 and a number of standard BACnet point objects, according to some embodiments.

Turning now to FIG. 24, a block diagram illustrating a mapping between attributes of equipment object 520 and one or more BACnet objects 533 is shown, according to some embodiments. The attributes of equipment object 520 can be defined by a user (e.g., using a data definition tool, or configuration tool as described below) and mapped to various types of internal chiller data 2132. For example, equipment object 520 is shown to include a setpoint attribute 2402, an outlet temperature attribute 2404, an outlet pressure attribute 2406, a motor speed attribute 2408, a motor current attribute 2410, and a status attribute 2412. The processing circuit 2104 of the chiller 1900 can be configured to interface with the attributes of equipment object 520 in a more concise fashion than the standard BACnet point objects 533. For example, the processing circuit 550 can read and write various items of internal chiller data 2132 to equipment object 520 as values of attributes 2402, 2404, 2406, 2408, 2410, 2412. The equipment object 520 may expose the values of attributes 2402, 2404, 2406, 2408, 2410, 2412 to the network interface 518. The mapping module 534 may then map the exposed equipment object attributes 2402, 2404, 2406, 2408, 2410, 2412 to the respective BACnet objects 533.

As shown in FIG. 24, the standard BACnet objects are shown to include an analog value (AV) setpoint object 2414 mapped to setpoint attribute 2402, an AV outlet temperature object 2416 mapped to outlet temperature attribute 2404, an AV outlet pressure object 2418 mapped to outlet pressure attribute 2406, an AV motor speed object 2420 mapped to motor speed attribute 2408, an AV motor current object 2422 mapped to motor current attribute 2410, and a device object 2424. The status attribute 2412 is not shown mapped to a BACnet object. A user can choose to expose all or a subset of the attributes 2402, 2404, 2406, 2408, 2410, 2412 as standard BACnet point objects 533 by selectively mapping all or some of attributes 2402, 2404, 2406, 2408, 2410, 2412 to BACnet objects 533. The BACnet/MSTP layer 544 can read the one or more BACnet objects 533 and provide the values of the BACnet objects 533 to the controller 506 and/or the network 504.

Communication Circuit Programming Tools

Figure 25:
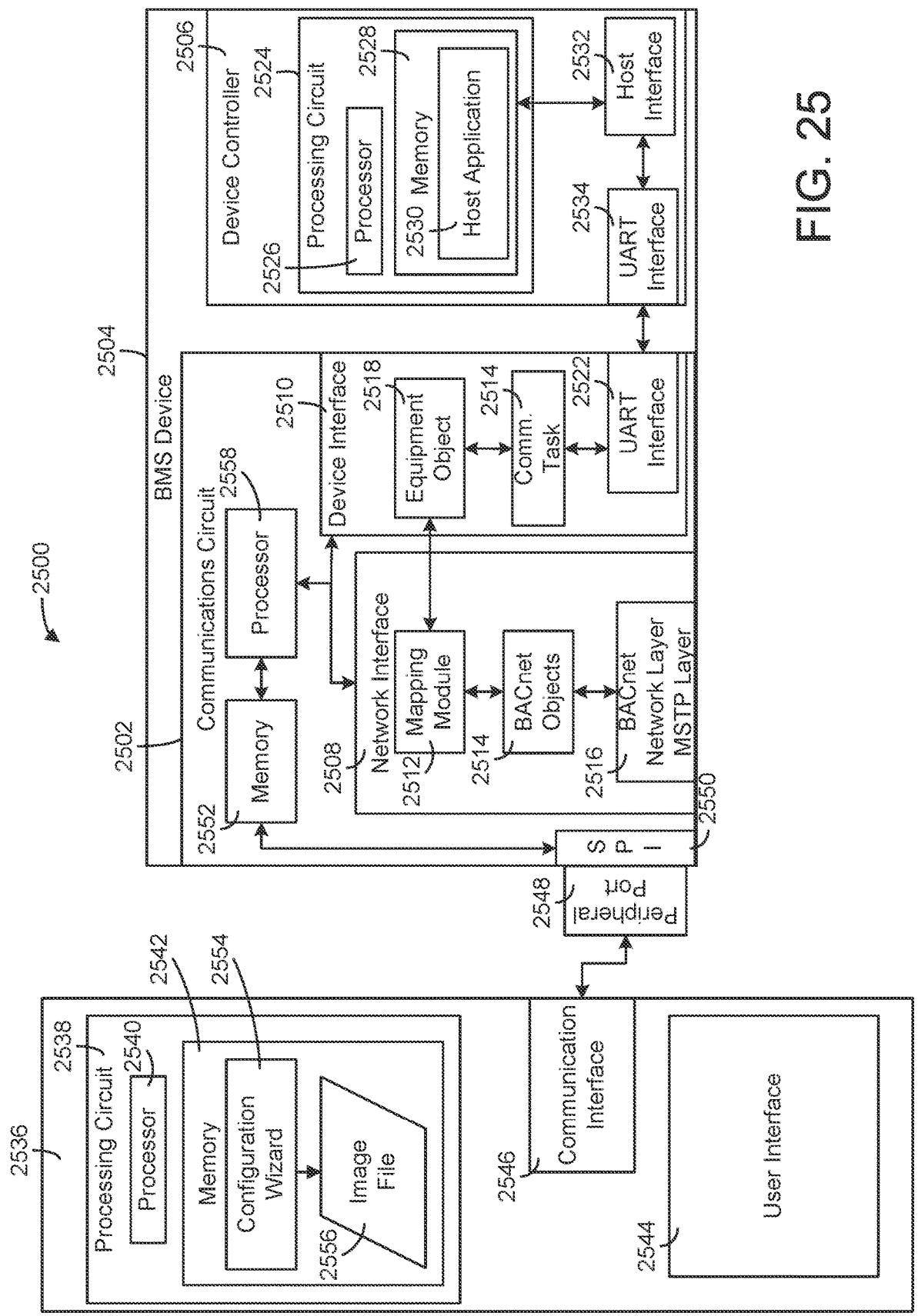
FIG. 25 is a block diagram illustrating a configuration system for configuring a communication circuit, according to some embodiments.

In some applications, tools may be used to program the communication circuit. For example, a tool may be used to program an equipment object of a communication circuit, such as that described in FIGS. 5 and 7. In FIG. 25, a block diagram of a programming system 2500 used to program a communication circuit 2502 within a BMS device 2504 is shown, according to some embodiments. In one embodiment, the BMS device 2504 is an HVAC device, such as a chiller, an actuator, a valve, an AHU, an RTU, a boiler, etc. In one example, the communication circuit 2502 is integrated into the BMS device 2504. In some embodiments, the communication circuit 2502 is integrated with a device controller 2506 of the BMS device 2504. In further embodiments, the communication circuit 2502 is a separate device from the BMS device 2504, and configured to couple to the BMS device 2504. The communications circuit 2502 is shown in a simplified form from communications circuit 500, described above. Therefore, it is contemplated that communication circuit 2502 includes the same components, and has the same functionality as communications circuit 500 described above.

The communication circuit 2502 is shown to include a network interface 2508 and a device interface 2510. The network interface 2508 is shown to include a mapping module 2512, one or more BACnet objects 2514, and a BACnet/MSTP layer 2516. The mapping module 2512, the BACnet objects 2514 and the BACnet/MSTP layer 2516 may have similar functionality to the mapping module 534, the BACnet objects 533 and the BACnet/MSTP layer 544 described above. The device interface 2510 may include an equipment object 2518, a communication task module 2520 and a UART interface 2522. Again, the equipment object 2518, the communication task 2520 and the UART interface 2522 may have similar functionality to the equipment object 520, the communication task module 522, and the UART interface 524 described above.

The BMS device controller 2506 may include a processing circuit 2524, the processing circuit 2524 may include a processor 2526 and a memory 2528. The processor 2526 may be a general purpose or specific purpose processor, an application specific integrated circuit (ASIC), one or more field programmable gate arrays (FPGAs), a group of processing components, or other suitable processing components. The processor 2526 is configured to execute computer code or instructions stored in the memory 2528 or received from other computer readable media (e.g., CDROM, network storage, a remote server, etc.).

The memory 2528 may include one or more devices (e.g., memory units, memory devices, storage devices, etc.) for storing data and/or computer code for completing and/or facilitating the various processes described in the present disclosure. The memory 2528 may include random access memory (RAM), read-only memory (ROM), hard drive storage, temporary storage, non-volatile memory, flash memory, optical memory, or any other suitable memory for storing software objects and/or computer instructions. The memory 2528 may include database components, object code components, script components, or any other type of information structure for supporting the various activities and information structures described in the present disclosure. The memory 2528 may be communicably connected to the processor 2528 via the processing circuit 2524 and may include computer code for executing (e.g., by the processor) one or more processes described herein. When the processor 2526 executes instructions stored in the memory 2528, the processor 2526 generally configures the BMS device controller 2506 (and more particularly the processing circuit 2524) to complete such activities. In one embodiment, the memory 2526 stores a host application 2530. The host application 2530 can include the required application for operating the BMS device 2504.

The BMS device controller 2506 is further shown to include a host interface 2532 and a UART interface 2534. The host interface 2532 may have similar functionality to host interface 532 described above in FIGS. 5A-5C. Specifically, the host interface 2532 may provide communication between the processing circuit 2524 and the UART interface 2534. The UART interface 2534 is configured to interface with the UART interface 2522 on the communications circuit 2502.

The system 2500 is shown to include a configuration device 2536. It is contemplated that the configuration device 2536 can be used to program the communication circuit 2502 regardless of the relationship of the communication circuit 2502 to the BMS device 2504. The configuration device 2536 is configured to setup and configure the equipment object 2518 of the communication circuit 2502 for communication with the BMS device 2504 automatically. For example, and as described in more detail below, the configuration device 2536 can allow a user to configure the communication circuit 2502 to work with the BMS device 2504, without any specialized knowledge of how to interface with the external network (e.g. BACnet). The configuration device may be a general purpose computer (PC), a laptop, a mobile device, such as a tablet computer (iPad, Android Tablet, Microsoft Surface), or a smartphone (iPhone, Android phone, Windows Phone, etc.). In some embodiments, the configuration device 2536 is a dedicated device.

As shown in FIG. 25, the configuration device 2536 is shown to include a processing circuit 2538. The processing circuit 2538 includes a processor 2540 and a memory 2542. In one embodiment, the processor 2540 and the memory 2542 may be the same as the MCU 702 and the memory 704 described in FIG. 7, above. The processor 2540 may be a general purpose or specific purpose processor, an application specific integrated circuit (ASIC), one or more field programmable gate arrays (FPGAs), a group of processing components, or other suitable processing components. The processor 2540 is configured to execute computer code or instructions stored in the memory 2542 or received from other computer readable media (e.g., CDROM, network storage, a remote server, etc.).

The memory 2542 may include one or more devices (e.g., memory units, memory devices, storage devices, etc.) for storing data and/or computer code for completing and/or facilitating the various processes described in the present disclosure. The memory 2542 may include random access memory (RAM), read-only memory (ROM), hard drive storage, temporary storage, non-volatile memory, flash memory, optical memory, or any other suitable memory for storing software objects and/or computer instructions. The memory 2542 may include database components, object code components, script components, or any other type of information structure for supporting the various activities and information structures described in the present disclosure. The memory 2542 may be communicably connected to the processor 2540 via the processing circuit 2538 and may include computer code for executing (e.g., by the processor) one or more processes described herein. When the processor 2540 executes instructions stored in the memory 2542, the processor 2540 generally configures the configuration device 2536 to complete such activities. The communication tool 2536 may further include a user interface 2544 and a communication interface 2546. The user interface 2544 may be a keyboard, a touchscreen, a display and keypad combination, a microphone, a mouse, or any other interface device allowing a user to interface with the configuration tool 2536. The communication interface 2546 may be a serial data port, such as RS-232, RS-485, etc. In other embodiments, the communication interface 2546 may be an external device, such as a Cheetah SPI flash programming tool. In one embodiment, the communication interface 2546 is configured to interface with a peripheral port 2548 of the communications circuit 2502. The peripheral port 2548 may couple to an SPI driver 2550 to allow a user to interface with the network interface 2508, the device interface 2510, or a memory 2552 of the communications circuit 2502. In one embodiment, the memory 2552 is a serial flash type memory.

In one embodiment, the configuration device 2536 is a tool used to define configuration data which may be stored on the memory 2552 of the communication circuit 2502. In one embodiment, the processing circuit 2538 can be configured to execute a configuration wizard 2554 stored in the memory 2542. In one embodiment, the configuration wizard 2554 is a JBOC configuration wizard from Johnson Controls. The configuration wizard 2554 may present a user, via the user interface 2544, with multiple sections to be completed by a user to configure the communication circuit 2502. For example, the configuration wizard 2554 may require a list of all of the data the BMS device 2504 wishes to expose to an external network, such as a BACnet network. In one embodiment, this data is primary information required for configuration of the communication circuit 2502.

The configuration wizard 2554 may further require a user to select setting that configure how the communication circuit 2502 will interact with the BMS device 2504. Example settings can include baud rate, timing, data types associated with various attributes; etc. The configuration wizard 2554 may further require a user to provide data that describes views of the data that can be utilized by other user interface devices, such as a commissioning tool. Additionally, the views may further be provided for future BACnet Structure view objects that may organize the data.

Once the configuration wizard 2554 has received the required input from the user, the configuration wizard 2554 can generate an image file 2556 that includes a desired configuration for the communication circuit 2502. For example, the image file 2556 may include equipment object attributes associated with BMS device 2504, mapping of the equipment object attributes to associated BACnet objects, required BACnet objects, equipment attribute data types, equipment attribute names and/or identification information, read/write permissions for the equipment object attributes, exposure permissions of the equipment object attributes, etc. The image file 2556 may further include configuration data relating to alarming, scheduling, communications (UART, WiFi, TCP/IP, etc.), trending, and scheduling, as it relates to the BMS device 2504. The image file 2556 may be transmitted to the communication circuit 2502 via the communication interface 2546. The communications circuit 2502, receiving the image file via the peripheral port 2548, may store the image file in the memory 2552. The image file 2556 may then be accessed by a processor 2558 of the communications circuit. The processor 2558 may be configured to interface with the device interface 2510 and the network interface 2508, and can read/write data to the modules contained therein. For example, the processor 2558 may write attribute data stored within the image file 2556 to the equipment object 2518. The processor 2558 may be a general purpose or specific purpose processor, an application specific integrated circuit (ASIC), one or more field programmable gate arrays (FPGAs), a group of processing components, or other suitable processing components. The processor 2558 is configured to execute computer code or instructions stored in the memory 2552 or received from other computer readable media (e.g., CDROM, network storage, a remote server, etc.).

Figure 26:
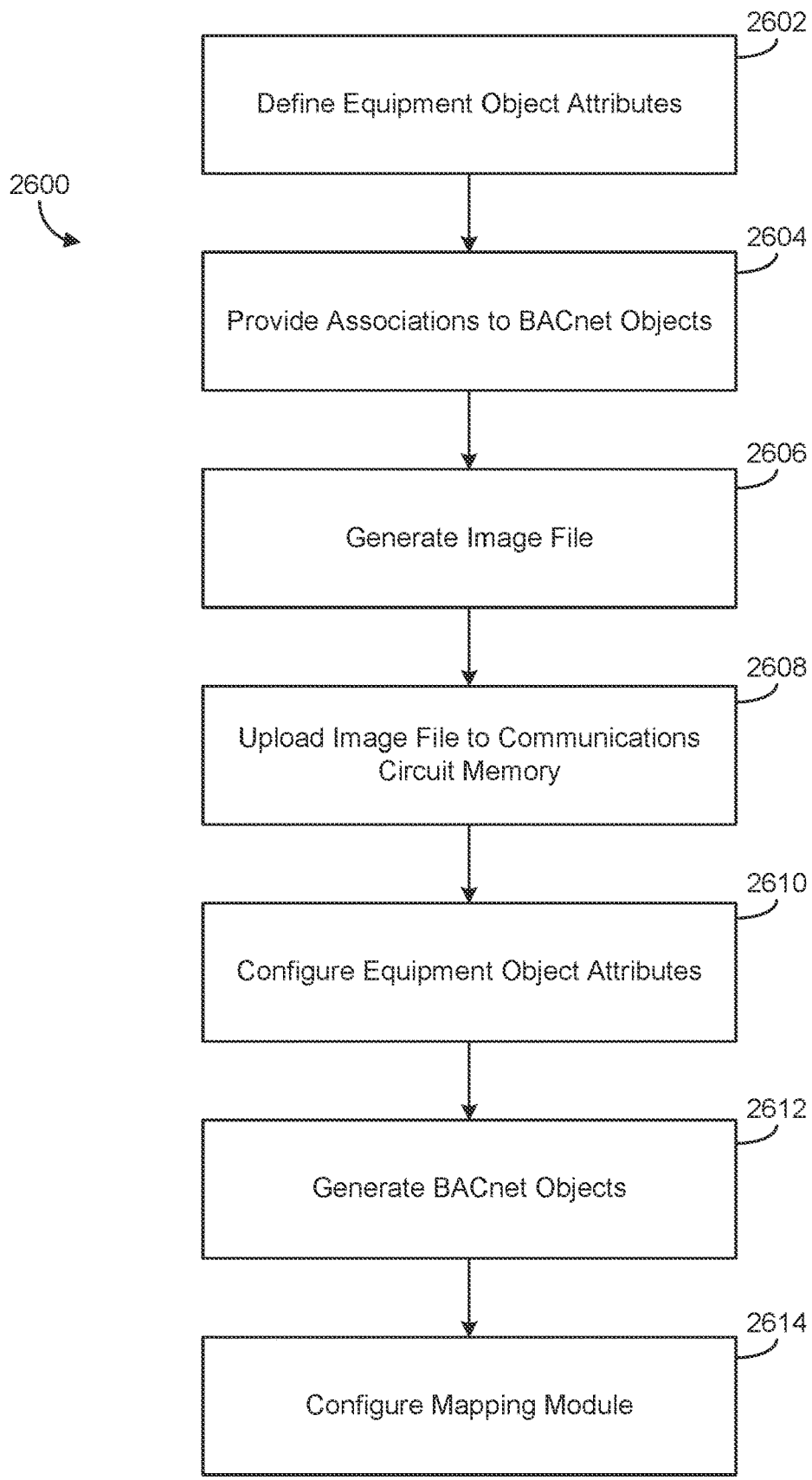
FIG. 26 is a flow chart illustrating a process for configuring a communications circuit using the communication system of FIG. 25, according to some embodiments.

Turning now to FIG. 26 a process 2600 for configuring a communication circuit is shown, according to some embodiments. At process block 2602, a user can define equipment object attributes of a communication circuit. In one embodiment, the user defines the equipment object attributes using a configuration wizard, such as configuration wizard 2554 described above. Defining the equipment object attributes may include equating the attributes with one or more data points associated with a BMS device coupled to the communication circuit. The BMS device may be any BMS device, as described above. Defining the equipment object attributes may further include defining parameters associated with the data from the BMS device, including data type, data names, value ranges, data format, etc. Defining the equipment object attributes may further include defining which equipment object attributes are to be exposed to an external network, such as a BACnet network, by the communications circuit. Additionally, defining the equipment object attributes may further include defining which attributes are writable.

At process block 2604, associations of the equipment object attributes to one or more BACnet objects can be defined. In one embodiment, defining the associations can include defining what type of BACnet objects are needed to be associated with the equipment attributes. For example, the BACnet objects may need to be first defined as analog data objects, binary data objects, multistate data objects, file objects, device objects, etc. In one embodiment, the associations are defined in the configuration wizard 2554. In some embodiment, the configuration wizard may automatically define the associations between equipment object attributes and BACnet objects, including defining the BACnet objects generally. In other examples, a user may define the associations manually, using the configuration device 2536. At process block 2606, the configuration wizard 2554 generates an image file including the defined equipment object attributes and defined associations of the equipment object attributes to the BACnet objects. The image file may also include general configuration parameters associated with configuring the communications circuit, as described above.

At process block 2608, the image file is uploaded to a memory of the communications circuit, such as the memory 2552 described above. At process block 2610, the equipment object attributes are configured based on the definitions stored within the image file. In one embodiment, a processor of the communications circuit may configure the equipment objects based on the image file. In other embodiments, a device interface of the communications circuit may configure the equipment objects based on the image file. At process block 2612, BACnet objects are generated based on the received image file. In one embodiment, a processor of the communications circuit may generate the BACnet objects based on the received image file. Alternatively, a network interface of the communications circuit may generate the BACnet objects based on the received image file. In still further examples, a mapping module, or other module of the communications circuit may generate the BACnet objects based on the received image file. In process block 2614, a mapping module of the communications circuit is configured based on the received image file. For example, the mapping module may be configured to map the defined equipment object attributes to the associated BACnet objects. The mapping module may further be configured to map defined BACnet objects to the associated equipment object attributes, where the equipment object attributes are writable. Further, the mapping module may further be configured to monitor and update the equipment object attributes and/or the BACnet objects, as described in FIGS. 5A-5C, above.

Figure 27:

Turning now to FIG. 27, an example user interface 2700 for configuring the communications circuit 2502 using the configuration wizard 2554 is shown, according to some embodiments. In one embodiment, the user can select an attribute ID for the desired equipment object attribute to be exposed to an external network using input box 2702. The attribute ID may be a property ID of the value in the equipment object attribute. In one embodiment, the equipment object attribute ID must be a value between 7000-8999. The attribute ID may also be the ID used to interface with the BMS device controller 2506. The user can then select a data type in the data type dropdown menu 2704. Example data types can include Boolean, float, Enum (i.e. true or false), or long. However, other data types are contemplated. The user can then select whether the equipment object attribute will be writeable using the modify checkbox 2706. In one example, the equipment object attribute may be writeable via a BACnet write property service. The user may then enter an object long name into input box 2708. In one embodiment, the object long name is a description property of a data object mapped to the equipment object attribute. The user may further enter an object short name into input box 2710. In one embodiment, the object short name is a string that represents the Object Name property of a data object mapped to the equipment object attribute. In some embodiments, the object short name is also the label that will be given to the corresponding equipment object.

The user interface 2700 may further allow a user to optionally input a class associated with a BACoid into input box 2712. The class may be a proprietary data class associated with a particular data object type. The user may further set a unique value for the BACoid class, which identifies the particular BACoid object using input box 2714. Once the user has input the BACoid class and value, a standard data object may be created automatically to also store the data on the communications circuit 2502. In one embodiment, the standard data objects are standard BACnet data objects. The user may then input a default value in the default value input box 2714. In one embodiment, the default value is automatically set to zero.

Figures 28, 29:
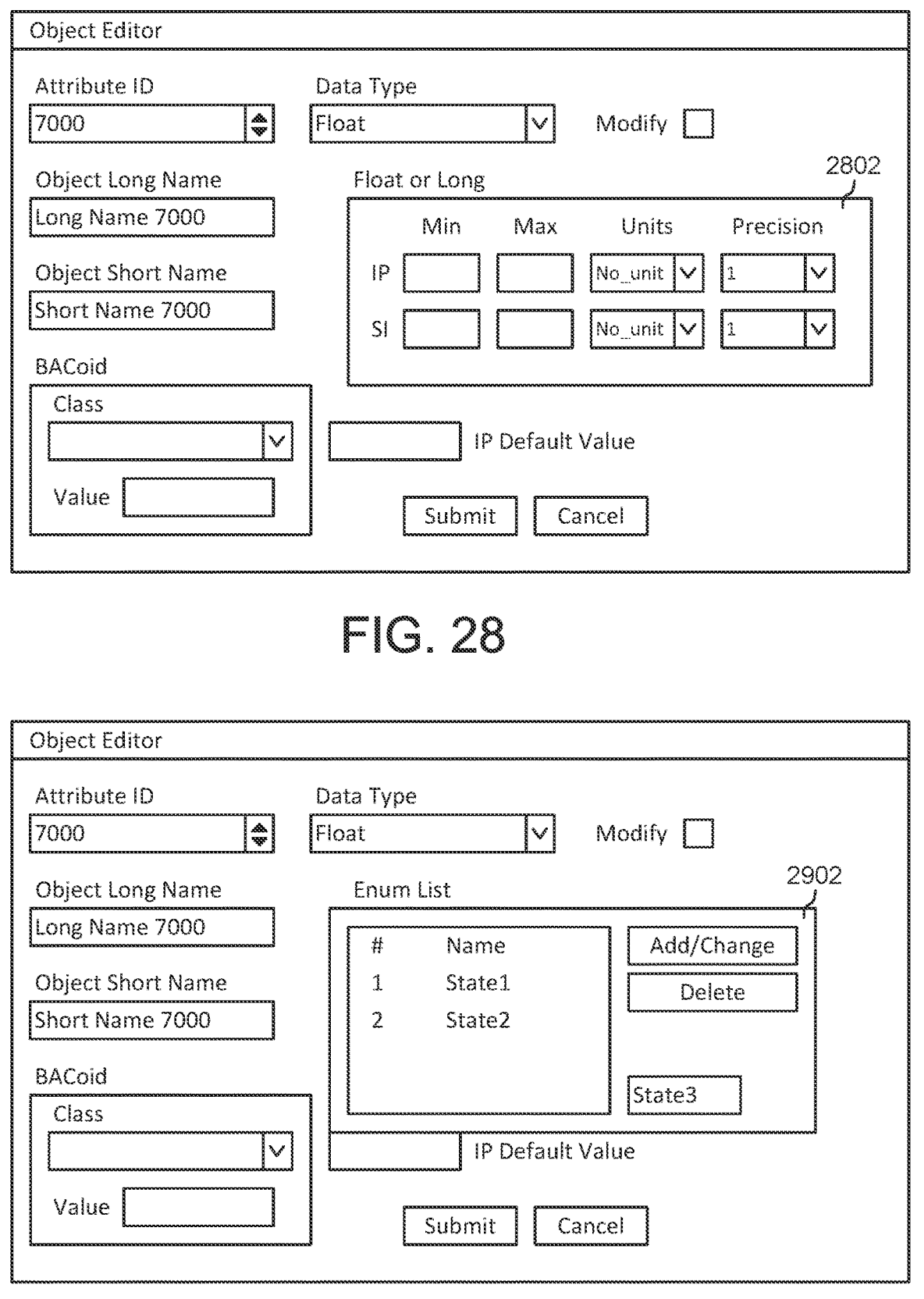

FIGS. 28 and 29 illustrate further user interface screens for use where other data types are selected. For example, in FIG. 28 the data type was set to Float by a user. A "float or long" input dialog box 2802 is generated by the configuration wizard 2554 to allow a user to define the Float data object in more detail. For example, the user can select minimum and maximum values that can be written to the equipment object attribute, unit types, and a precision value (e.g. number of decimal places allowed) using the input dialog box 2802. In FIG. 29, the data type was set to Enum by the user. An Enum dialog box 2902 can be provided to allow a user to add, change or delete desired states associated with the attribute. Further, other user interfaces are contemplated to account for other required data needed to program the communications circuit 2502.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building device located within a building, the building device comprising:
one or more circuits and an enclosure structured to enclose the one or more circuits, wherein the one or more circuits are configured to:
implement one or more device control functions, the one or more device control functions controlling or measuring one or more environmental conditions of the building; and
receive an integration configuration from an external device, the integration configuration causing the one or more circuits to:
implement the one or more device control functions via one or more communication protocols of an internal network, causing the one or more device control functions to retrieve and store sensor data on an equipment object stored in the one or more circuits, the sensor data indicating the one or more environmental conditions of the building and retrieved from one or more devices of the building;
implement an external communication configuration to map a subset of the sensor data from the equipment object to at least one network object stored in the one or more circuits and facilitate communication of the at least one network object from the one or more circuits to an external system via an external communication protocol, wherein mapping the subset of the sensor data from the equipment object to the at least one network object is based on attributes of the one or more devices of the building and the external communication configuration which defines the subset of the sensor data to expose to the external system;
receive, via the external communication protocol, a command to modify a device parameter of the one or more devices, the command comprising a modified value of a network object of the at least one network object stored in the one or more circuits;
identify, from the external communication configuration, a mapping between the network object stored in the one or more circuits and an attribute of the equipment object stored in the one or more circuits;
determine that the mapping defines the attribute of the equipment object as a writeable attribute; and
responsive to determining that the mapping defines the equipment object as the writeable attribute, write the modified value to the attribute of the equipment object based on the command and transmit the modified value of the attribute from the equipment object to the one or more devices via the one or more communication protocols of the internal network to modify the device parameter.

2. The building device of claim 1, wherein the one or more environmental conditions include temperature, pressure, or airflow attributes.

3. The building device of claim 1, wherein the one or more circuits are further configured to control the one or more environmental conditions by performing operations comprising adjusting a respective set point for one or more of a heater, a chiller, or an air handler unit.

4. The building device of claim 1, wherein the one or more circuits are further configured to initiate a control action responsive to detecting a change in the one or more environmental conditions.

5. The building device of claim 1, wherein mapping the subset of the sensor data to the at least one network object comprises determining attributes of the one or more devices of the building that provided the sensor data.

6. The building device of claim 1, wherein the external system comprises a cloud system and the external communication protocol comprises internet communications.

7. The building device of claim 1, wherein the external communication configuration facilitates the communication responsive to detecting a change in the sensor data.

8. The building device of claim 1, wherein the integration configuration comprises settings to facilitate communication of the sensor data to the external system.

9. The building device of claim 1, wherein the integration configuration is generated for the building device based on attributes of the building device.

10. A method, comprising:
implementing, by one or more circuits of a building device of a building, one or more device control functions, the one or more device control functions controlling or measuring one or more environmental conditions of the building; and
receiving, by the one or more circuits, an integration configuration from an external device, the integration configuration causing the one or more circuits to:
implement the one or more device control functions via one or more communication protocols of an internal network, causing the one or more device control functions to retrieve and store sensor data on an equipment object stored in the one or more circuits, the sensor data indicating the one or more environmental conditions of the building from one or more devices of the building;
implement an external communication configuration to map a subset of the sensor data from the equipment object to at least one network object stored in the one or more circuits and facilitate communication of the at least one network object to an external system via an external communication protocol, wherein mapping the subset of the sensor data from the equipment object to the at least one network object is based on attributes of the one or more devices of the building and the external communication configuration which defines the subset of the sensor data to expose to the external system;
receive, via the external communication protocol, a command to modify a device parameter of the one or more devices, the command comprising a modified value of a network object of the at least one network object stored in the one or more circuits;
identify, from the external communication configuration, a mapping between the network object stored in the one or more circuits and an attribute of the equipment object stored in the one or more circuits;
determine that the mapping defines the attribute of the equipment object as a writeable attribute; and
responsive to determining that the mapping defines the equipment object as the writeable attribute, write the modified value to the attribute of the equipment object based on the command and transmit the modified value of the attribute from the equipment object to the one or more devices via the one or more communication protocols of the internal network to modify the device parameter.

11. The method of claim 10, wherein the one or more environmental conditions include temperature, pressure, or airflow attributes.

12. The method of claim 10, wherein controlling the one or more environmental conditions comprises adjusting, by the one or more circuits, a respective set point for one or more of a heater, a chiller, or an air handler unit.

13. The method of claim 10, further comprising initiating, by the one or more circuits, a control action responsive to detecting a change in the one or more environmental conditions.

14. The method of claim 10, wherein mapping the subset of the sensor data to the at least one network object comprises determining, by the one or more circuits, attributes of the one or more devices of the building that provided the sensor data.

15. The method of claim 10, wherein the external system comprises a cloud system and the external communication protocol comprises internet communications.

16. The method of claim 10, wherein the external communication configuration facilitates the communication responsive to detecting a change in the sensor data.

17. The method of claim 10, wherein the integration configuration comprises settings to facilitate communication of sensor data to the external system.

18. The method of claim 10, wherein the integration configuration is generated for the building device based on attributes of the building device.

* * * * *